US006333515B1

(12) United States Patent
Kubota et al.

(10) Patent No.: US 6,333,515 B1
(45) Date of Patent: *Dec. 25, 2001

(54) ARRANGEMENT AND CONSTRUCTION OF CREW PROTECTIVE DEVICE FOR AUTOMOBILE

(75) Inventors: Yasushi Kubota, Toyota; Masamichi Aono, Nishikamo-gun; Goro Takahashi, Owariasahi; Takuya Ohtsuka, Numazu; Minoru Shibata, Inazawa; Yutaka Nagai, Ichinomiya; Hiroyuki Tajima, Chiryu; Fumitake Kobayashi, Inazawa; Hiroki Nakajima, Nagoya; Chiharu Totani, Gifu; Tadao Tanaka, Nagoya; Katsunori Noto, Toyota, all of (JP)

(73) Assignees: Toyota Jidosha Kabushiki Kaisha, Toyota; Toyoda Gosei Co., Ltd., Nishikasugai, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,716
(22) PCT Filed: Nov. 4, 1997
(86) PCT No.: PCT/JP97/04006
   § 371 Date: Jul. 31, 1998
   § 102(e) Date: Jul. 31, 1998
(87) PCT Pub. No.: WO98/19893
   PCT Pub. Date: May 14, 1998

(30) Foreign Application Priority Data

Nov. 7, 1996 (JP) .................................. 8-295550
Apr. 28, 1997 (JP) .................................. 9-111507
May 20, 1997 (JP) .................................. 9-129617
Jun. 2, 1997 (JP) .................................. 9-144370
Jun. 24, 1997 (JP) .................................. 9-167732

(51) Int. Cl.$^7$ .................................................. B60R 21/82
(52) U.S. Cl. .................. 250/730.2; 280/743; 280/743.1; 280/748; 280/728.1
(58) Field of Search .............................. 280/730.2, 730.1, 280/743.1, 728.1, 748, 736

(56) References Cited

U.S. PATENT DOCUMENTS 3,731,949  5/1973  Radke .

(List continued on next page.)

FOREIGN PATENT DOCUMENTS 2222 621  5/1972  (DE) .

(List continued on next page.)

OTHER PUBLICATIONS

Technical Review Published by Japan Patent Information Organization; No. 96–6711, Published May 15, 1996, Title: GARNISH.

*Primary Examiner*—Lanna Mai
*Assistant Examiner*—Toan C To
(74) *Attorney, Agent, or Firm*—Pillsbury Winthrop LLP

(57) ABSTRACT

A structure of arranging an vehicle occupant protecting apparatus for an automotive vehicle, which can prevent a pillar garnish from scattering when an air bag installed in a front pillar portion is expanded, is provided. An air bag 16 is housed within a space formed by a front pillar main body 38 and a pillar garnish 40 in a front pillar portion 20. When the air bag 16 expands, the pillar garnish 40 is pressed by an expanding pressure of the air bag 16, so that an opening for expanding the air bag 16 is formed between the front pillar main body 38 and the pillar garnish 40, and the air bag 16 expands into a vehicle cabin through the opening. since a non-expanding portion is formed at the air bag 16 and a hinge portion 46 is formed at the pillar garnish 40, the expanding pressure applied to the pillar garnish 40 when the air bag 16 expand is low, so that the pillar garnish 40 can be easily opened through the hinge portion 46.

30 Claims, 54 Drawing Sheets

U.S. PATENT DOCUMENTS

| | | | |
|---|---|---|---|
| 5,265,903 | * 11/1993 | Kuretake et al. | 280/730.1 |
| 5,322,322 | * 6/1994 | Bark et al. | 280/748 X |
| 5,333,898 | * 8/1994 | Stutz | 280/730 |
| 5,456,490 | 10/1995 | Carter et al. | |
| 5,462,308 | * 10/1995 | Seki et al. | 280/748 X |
| 5,470,103 | 11/1995 | Vaillancourt et al. | |
| 5,490,691 | * 2/1996 | Sinnhuber et al. | 280/730.2 |
| 5,540,459 | * 7/1996 | Daniel | 280/730.2 X |
| 5,570,900 | 11/1996 | Brown . | |
| 5,588,672 | * 12/1996 | Karlow et al. | 280/730.2 X |
| 5,605,346 | 2/1997 | Cheung et al. . | |

FOREIGN PATENT DOCUMENTS

| | | |
|---|---|---|
| 43 07 175 A1 | 3/1993 | (DE) . |
| 29605897 U1 | 5/1996 | (DE) . |
| 29603316 | 8/1996 | (DE) . |
| 29603316 U1 | 8/1996 | (DE) . |
| 29605896 | 9/1996 | (DE) . |
| 29605896 U1 | 9/1996 | (DE) . |
| 29605897 | 9/1996 | (DE) . |
| 584 781 A1 | 8/1993 | (EP) . |
| 0694444A2 | 1/1995 | (EP) . |
| 0694444 | 7/1995 | (EP) . |
| 0 705 738 | 4/1996 | (EP) . |
| 2191450 | 12/1987 | (GB) . |
| 2 261 636 | 5/1993 | (GB) . |
| 45-008586 | 4/1970 | (JP) . |
| 45-8586 | 4/1970 | (JP) . |
| 63-251352 | 10/1988 | (JP) . |
| 1-202550 | 8/1989 | (JP) . |
| 2-249743 | 10/1990 | (JP) . |
| 2-45077 | 11/1990 | (JP) . |
| 3-276844 | 12/1991 | (JP) . |
| 5-104547 | 4/1993 | (JP) . |
| 5-193430 | 8/1993 | (JP) . |
| 5-338513 | 12/1993 | (JP) . |
| 6-166362 | 6/1994 | (JP) . |
| 6-227340 | 8/1994 | (JP) . |
| 6-344841 | 12/1994 | (JP) . |
| 7-009933 | 1/1995 | (JP) . |
| 7-047904 | 2/1995 | (JP) . |
| 7-164986 | 6/1995 | (JP) . |
| 7-285406 | 10/1995 | (JP) . |
| 7-300058 | 11/1995 | (JP) . |
| 8-175311 * | 7/1996 | (JP) . |
| 9-207701 | 8/1997 | (JP) . |
| 9-249089 | 9/1997 | (JP) . |
| 96/26087 | 8/1996 | (WO) . |

* cited by examiner

F I G. 1
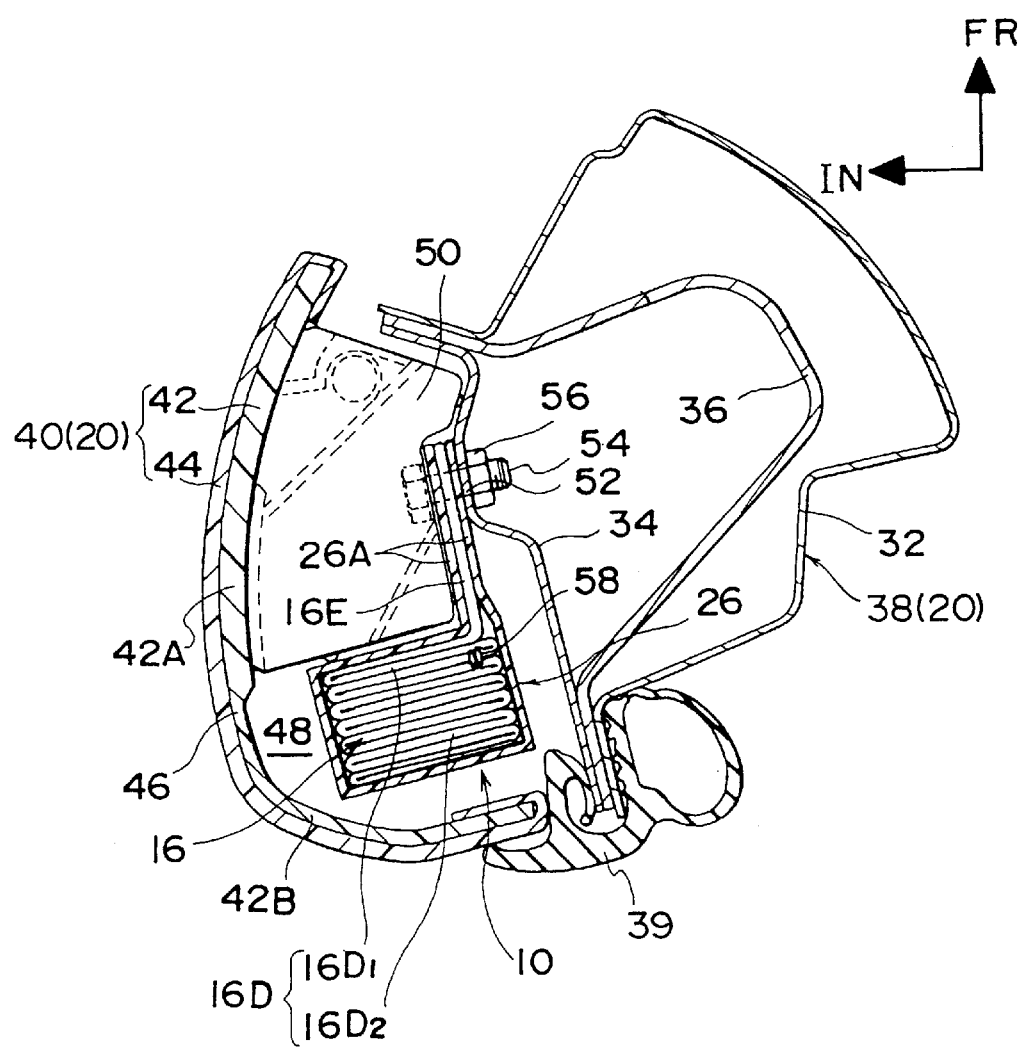

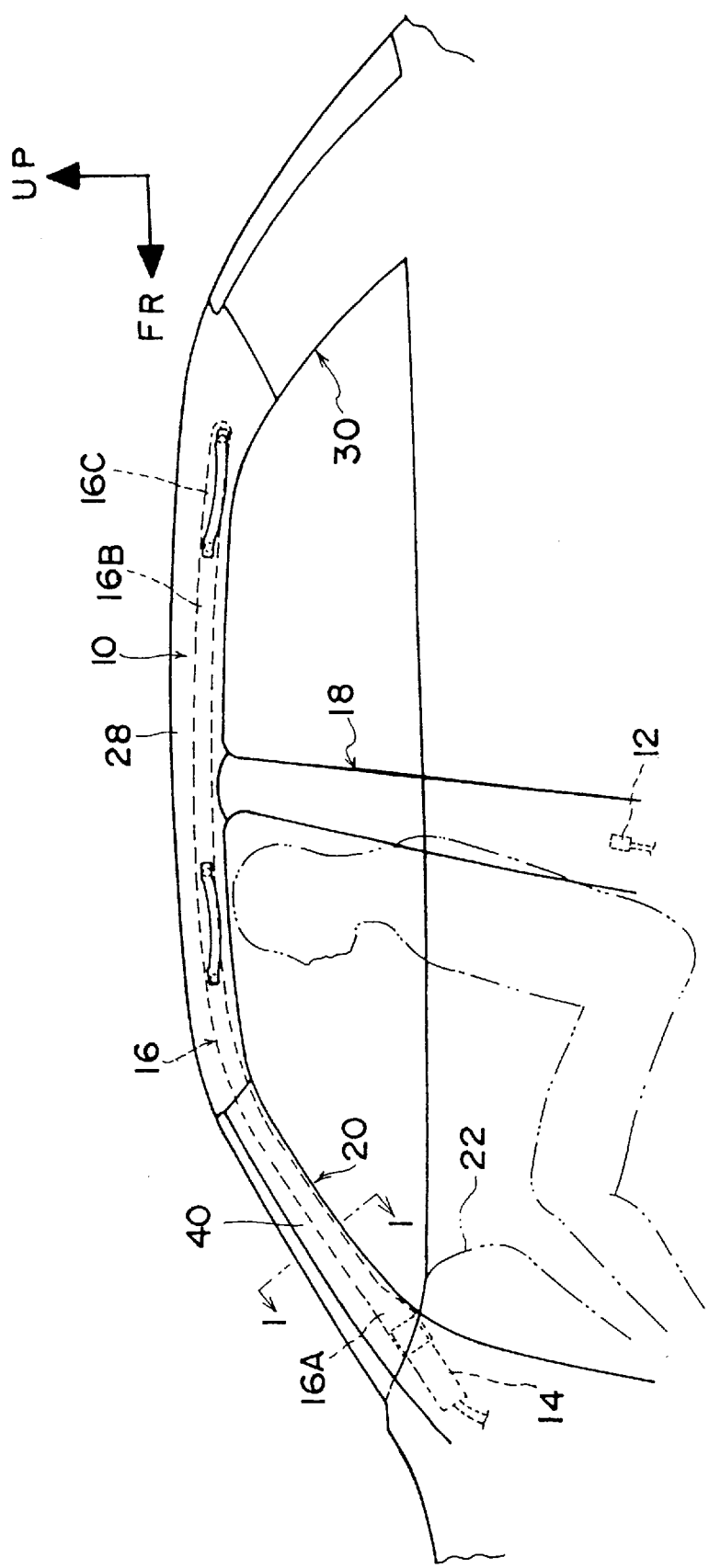

F I G. 2 5
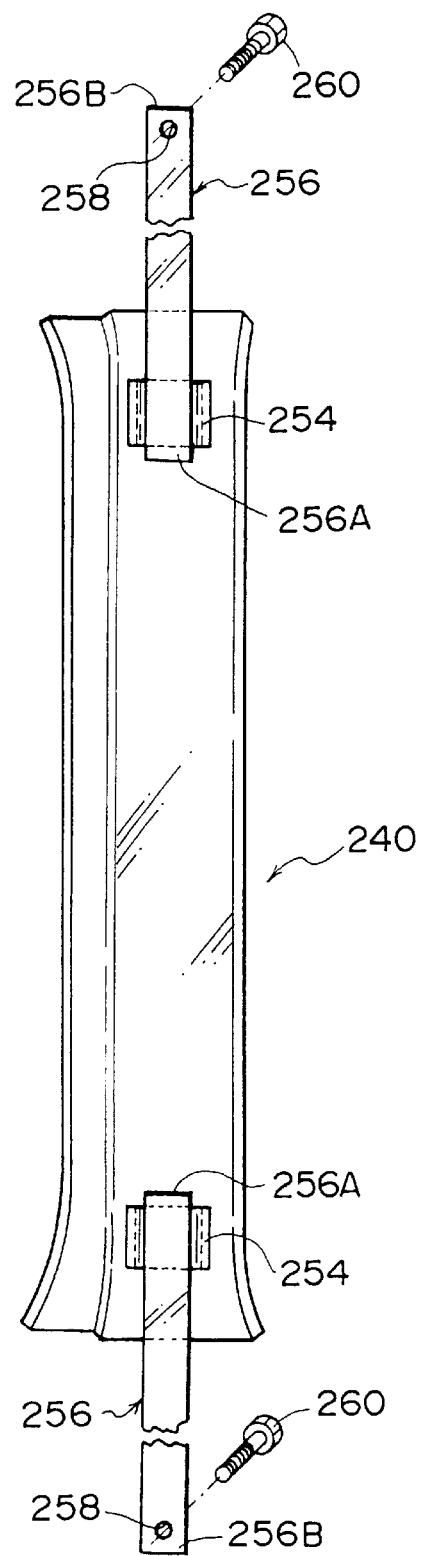

F I G. 2 6
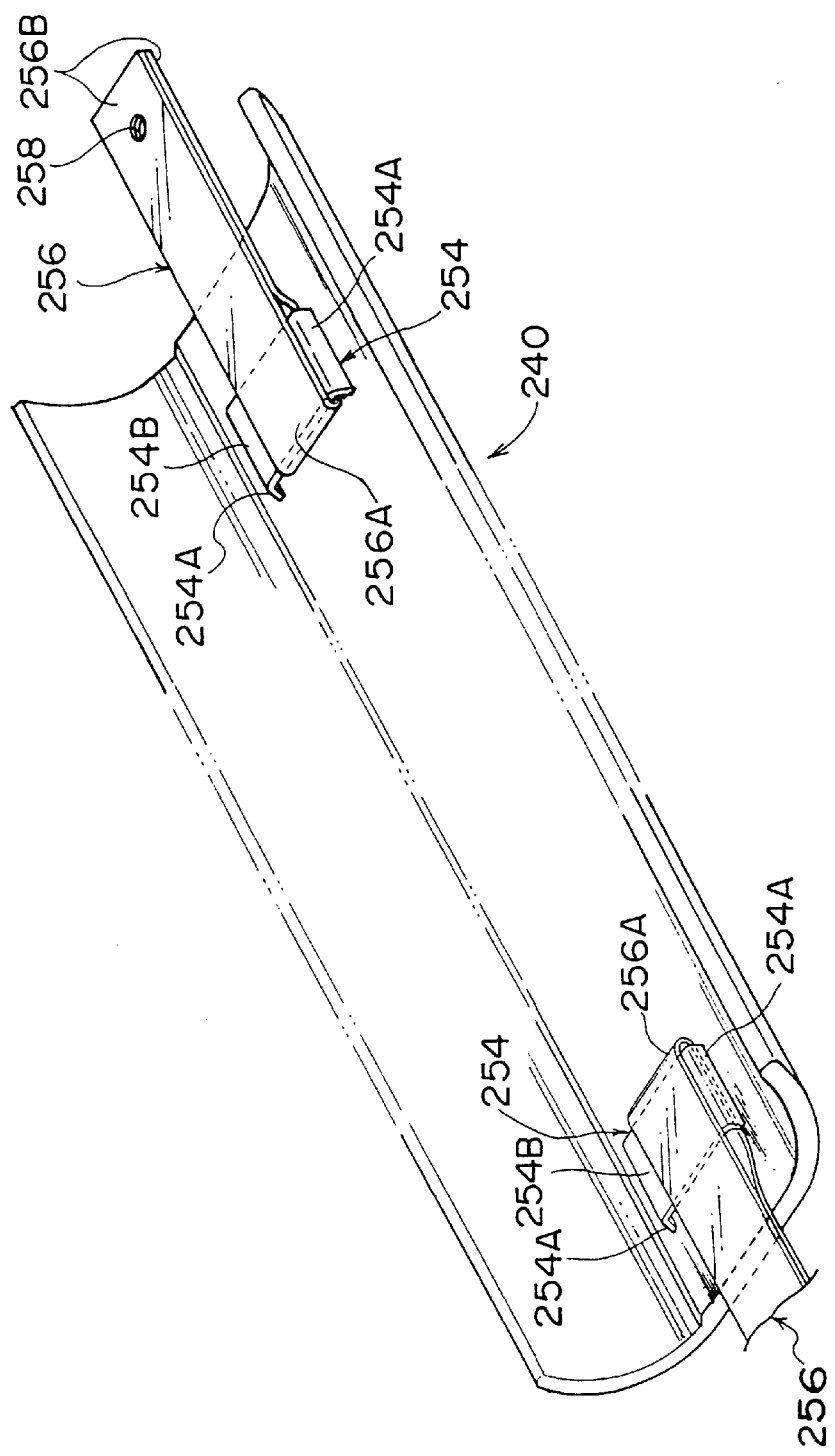

F I G. 2 7
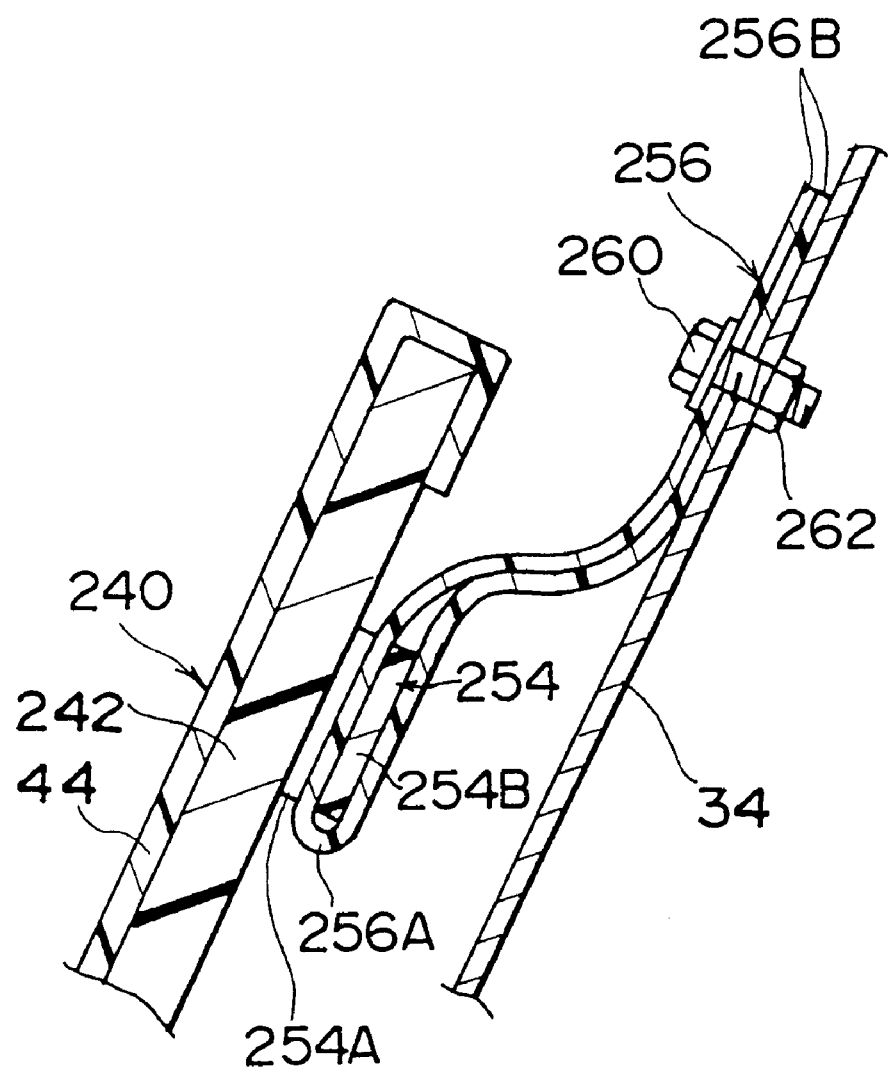

F I G. 28
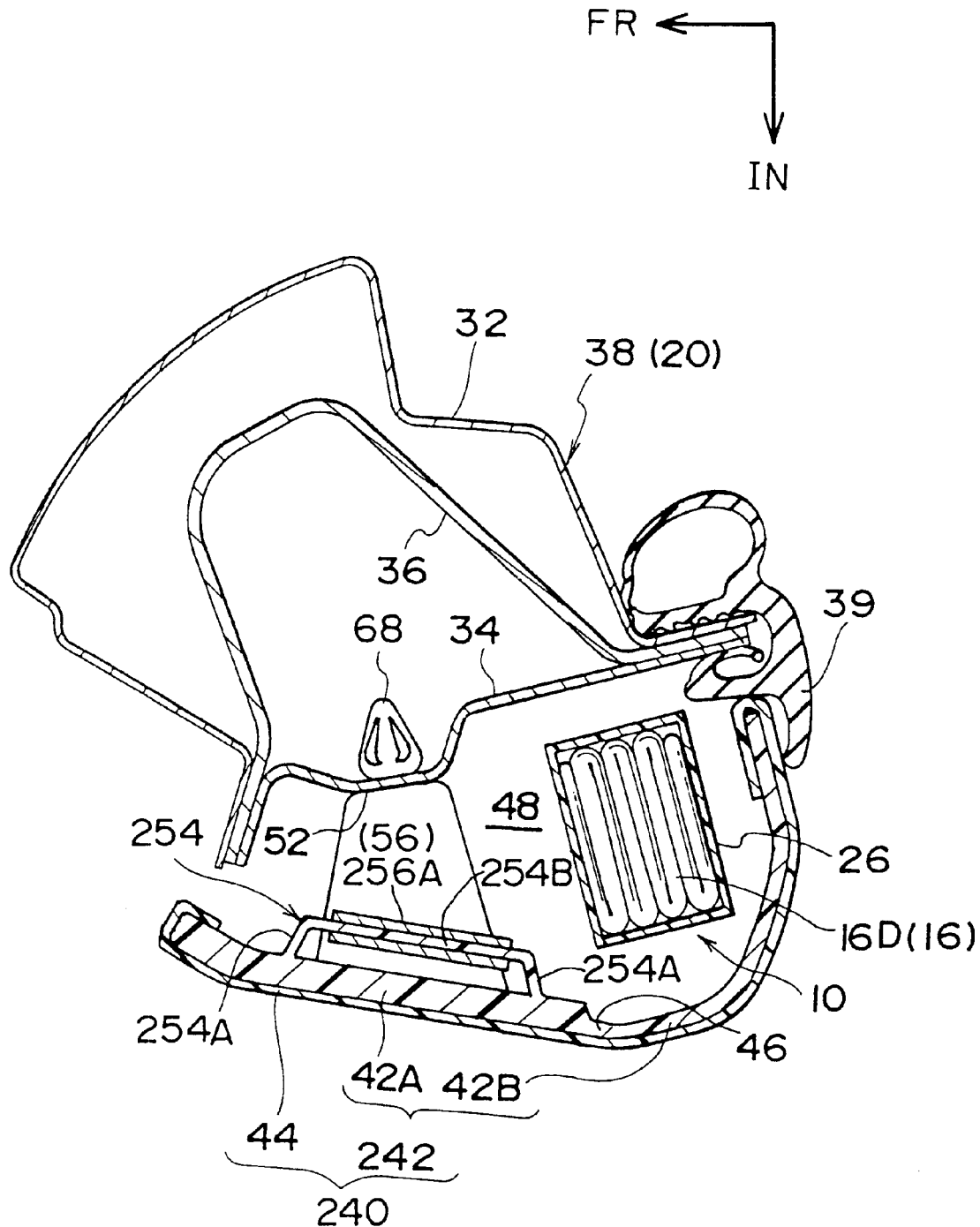

F I G. 3 9
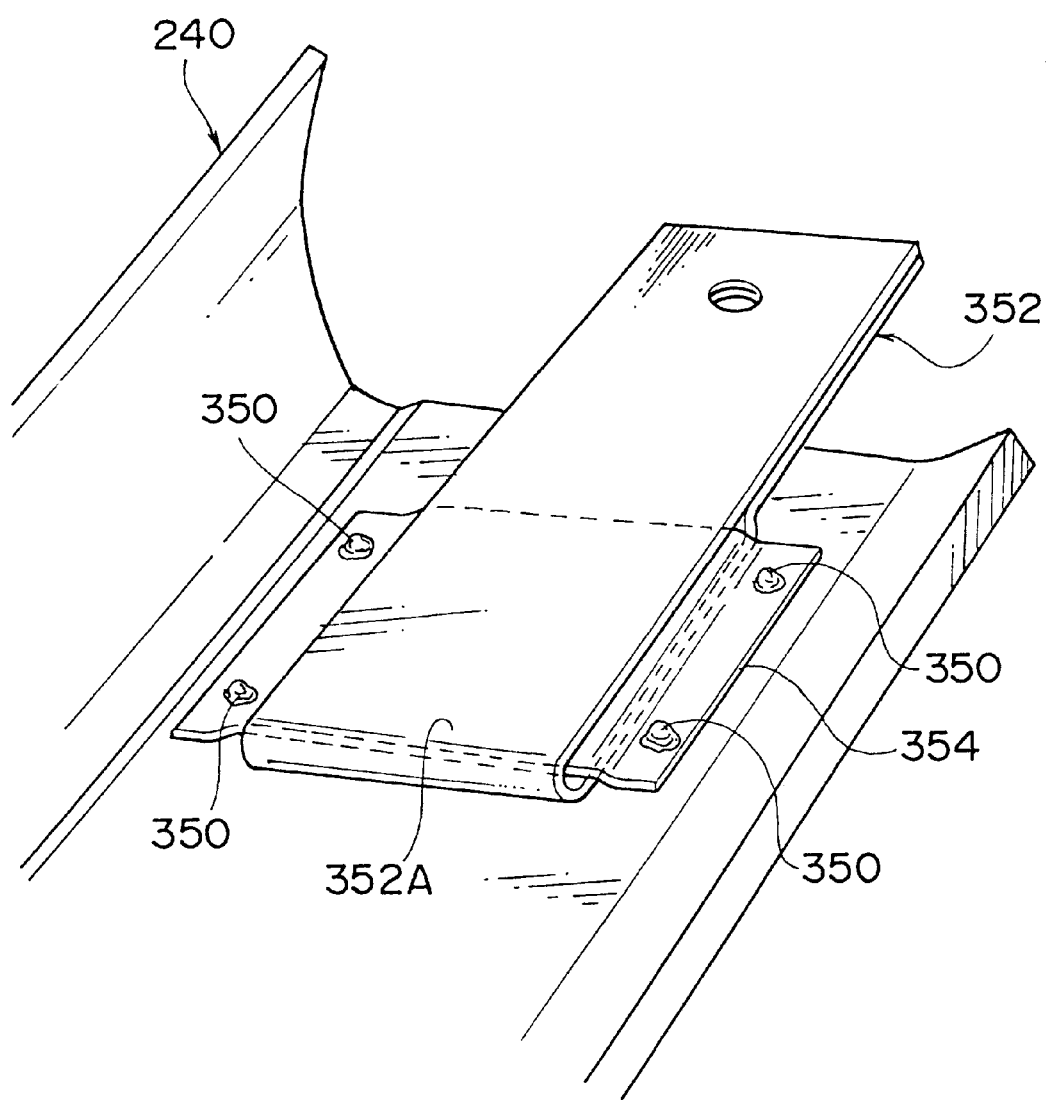

F I G. 4 4
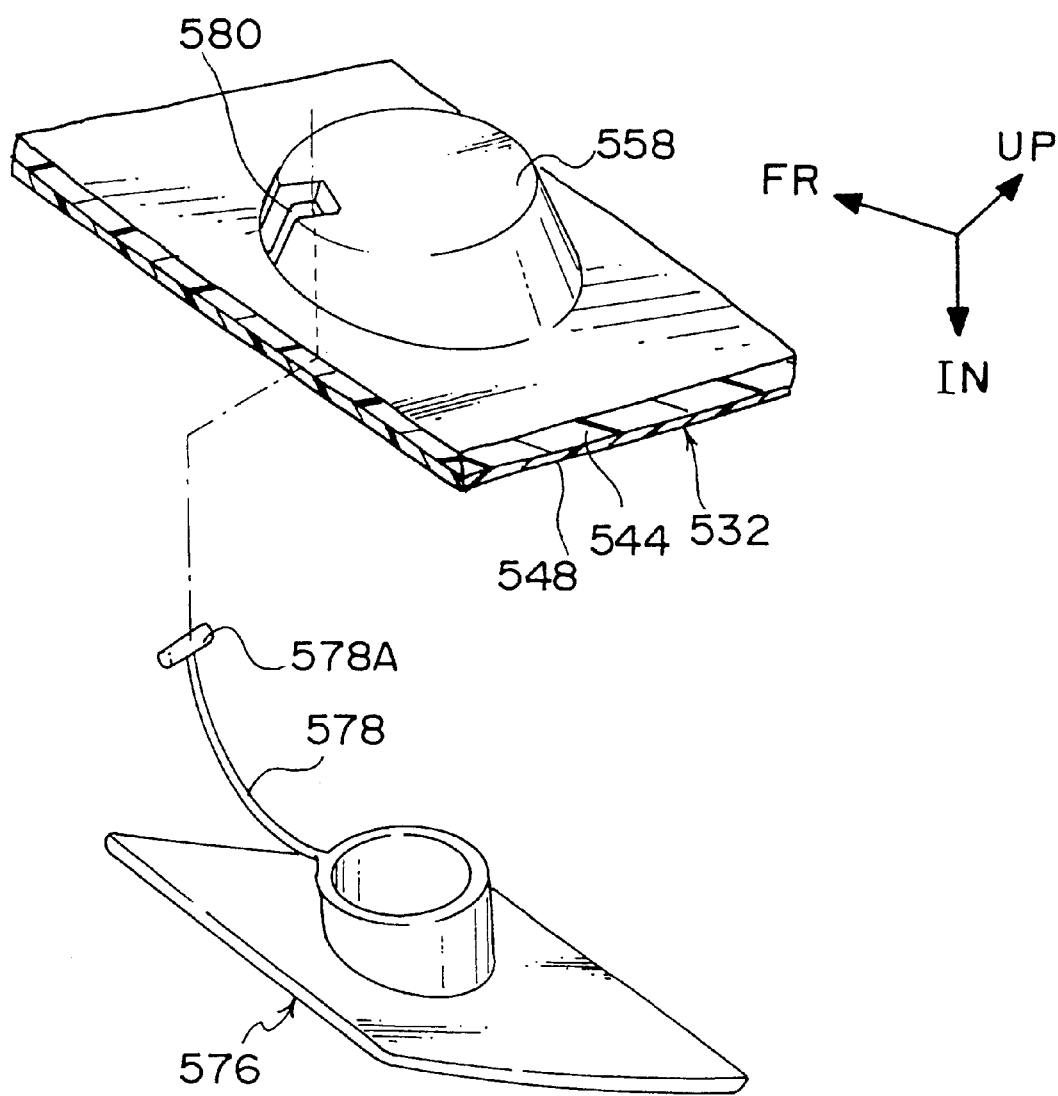

ARRANGEMENT AND CONSTRUCTION OF CREW PROTECTIVE DEVICE FOR AUTOMOBILE

TECHNICAL FIELD

This application is the national phase of international application PCT/JP97/04006 filed Nov. 4, 1997 which designated the U.S.

The present invention relates to a structure of arranging an vehicle occupant protecting apparatus for an automotive vehicle which expands a bag, which is housed along a front pillar portion and a roof side rail portion in a folded state, toward an inner side of a vehicle cabin in a side portion of a vehicle body in a curtain manner by a gas injected from an inflator at a time when a predetermined high load is applied to the side portion of the vehicle body.

BACKGROUND ART

There has been already proposed an vehicle occupant protecting apparatus which expands a bag, which is housed between a front pillar portion and a roof side rail portion in a folded manner along a window glass in a curtain manner, so as to improve a protecting performance for a head portion of the vehicle occupant at a time when a predetermined high load is applied to the side portion of the vehicle body. A structure shown in Japanese Patent Application Laid-Open No. 6-227340 which discloses an vehicle occupant protecting apparatus of this kind will be described below.

As shown in FIG. 55, an vehicle occupant protecting apparatus 700 is mainly structured by a sensor 702 for detecting a predetermined state of application of high load to a side portion of a vehicle body, an inflator 704 operated by the high load application state detected by the sensor 702 and injecting a gas, and an elongated bag 712 arranged from an upper end portion of a front pillar 706 along a roof side rail 708 and housed within a pillar garnish 710 of the front pillar 706 in a folded state. A front end portion of the bag 712 is connected to an upper end portion of the inflator 704, and a rear end portion of the bag 712 is positioned at a front portion of a center pillar 714.

In accordance with the structure described above, when a side collision is detected by the sensor 702, the inflator 704 is operated so as to inject the gas. Accordingly, the injected gas is supplied to the interior of the bag 712, and the pillar garnish 710 unfolds due to the an expanding pressure of the bag 712. As a result, the bag 712 which is expanding in a curtain manner is interposed between the head portion of the vehicle occupant and the side surface of the vehicle cabin.

However, in the case of the vehicle occupant protecting apparatus 700 mentioned above, there is the possibility that at a time when the bag 712 expands, the pillar garnish 710 of the front pillar 706 may break and be scattered, or the pillar garnish 710 may separate from the front pillar 706 and scatter.

The present invention has been made by taking the facts mentioned above into consideration, and an object of the present invention is to provide a structure of arranging an vehicle occupant protecting apparatus for an automotive vehicle which can prevent a pillar garnish of a pillar portion from scattering at a time when a bag is expanded.

DISCLOSURE OF THE INVENTION

In accordance with a first aspect of the present invention, there is provided a structure of arranging a vehicle occupant protecting apparatus for an automotive vehicle comprising:

an inflator disposed at a predetermined region of a vehicle body and jetting a gas at a time of a side collision;

a bag housed between a front pillar portion and a roof side rail portion in a folded manner, and expanded in a curtain manner to beneath the roof side rail portion within a vehicle cabin by the gas supplied from said inflator;

a pillar garnish which is formed by a trim member disposed at a vehicle cabin inner side of the front pillar portion, and which extends out along a longitudinal direction of the front pillar portion so as to cover a portion of said bag housed in the front pillar portion, an opening for expansion of said bag being formed in said pillar garnish by an expanding pressure when said bag expands; and scatter preventing means provided at at least one of said pillar garnish and said bag so as to prevent said pillar garnish from scattering at a time when said bag expands.

In accordance with this aspect, when a side collision occurs, the gas jetted from the inflator. Accordingly, the bag housed between the front pillar portion and the roof side rail portion in a folded state expands out to beneath the roof side rail portion within the vehicle cabin in a curtain manner. Therefore, the bag is interposed between the side portion of the vehicle body and the head portion of the vehicle occupant, so that the head portion of the vehicle occupant is protected.

Here, in accordance with this aspect, since the scatter preventing means is provided in at least one of the pillar garnish and the bag, the pillar garnish is prevented from being scattered by an expanding pressure at a time when the bag expands.

In accordance with a second aspect, in the first aspect, the scatter preventing means is a non-expanding portion of the bag which is positioned at a region corresponding to the pillar garnish at a time when the bag expands.

In accordance with this aspect, in the bag, the non-expanding portion is provided at the region corresponding to the pillar garnish at a time when the bag expands. Therefore, the non-expanding portion is positioned within the pillar garnish in a state in which the bag has expanded, and the portion at which the non-expanding portion is not provided is positioned out of the pillar garnish as an expanding portion. Accordingly, a pressing load acting on the pillar garnish can be reduced to the extent that the pressing load does not act on the pillar garnish from the non-expanding portion, in comparison with a case of using a bag having no non-expanding portion. The pillar garnish can be prevented from being scattered by reducing the pressing load.

In accordance with a third aspect, in the first aspect, the scatter preventing means is an unfolding portion which is provided at the pillar garnish and is capable of unfolding such that an opening for an expansion of the bag is formed around an intermediate portion in a widthwise direction of the pillar garnish.

In accordance with this aspect, since the unfolding portion capable of unfolding around the intermediate portion in the widthwise direction of the pillar garnish is provided, the pillar garnish is unfolded around the intermediate portion in the widthwise direction thereof at a time when the bag expands. Accordingly, by forming the pillar garnish in advance to be capable of unfolding around the intermediate portion in the widthwise direction thereof, the operating load against the pillar garnish due to the bag expanding pressure can be avoided, so that concentration of excess stress at the pillar garnish is prevented. The pillar garnish can be prevented from scattering by preventing the concentration of excess stress.

In accordance with a fourth aspect, in the third aspect, the intermediate portion in the widthwise direction of the pillar garnish is a weakened portion.

In accordance with this aspect, since the weakened portion is provided at the intermediate portion in the widthwise direction of the pillar garnish, the pillar garnish can be easily unfolded with the weakened portion as the starting point of unfolding.

In accordance with a fifth aspect, in the third aspect, the unfolding portion is made thinner than the other portions of the pillar garnish.

In accordance with this aspect, since the unfolding portion is made thinner than the other portions of the pillar garnish, the rigidity of this thin portion is lower than that of the other portions. Accordingly, the thin portion can be elastically deformed with ease and unfolded.

In accordance with a sixth aspect, in the third aspect, said pillar garnish is formed so as to include a base member, which is positioned at a vehicle cabin outer side, and an outer skin, which is positioned at a vehicle cabin inner side of the base member, and the base member is formed by a resin which is softer at one widthwise direction side of the pillar garnish widthwise direction intermediate portion than at the other widthwise direction side, the one widthwise direction side is the unfolding portion.

In accordance with this aspect, the pillar garnish is formed so as to include the base member, which is positioned at a vehicle cabin outer side, and the outer skin, which is positioned at a vehicle cabin inner side of the base member. Further, the portion positioned at one widthwise direction side (the bag housing portion in the pillar garnish) of the intermediate portion in the widthwise direction of the pillar garnish is made of a resin softer than the base member which is positioned at the widthwise direction other side of the pillar garnish (the portion other than the bag housing portion in the pillar garnish). Therefore, the portion at the one widthwise direction side has a rigidity lower than that of the portion at the other widthwise direction side. Accordingly, when the bag expand, the portion at the one widthwise direction side is elastically deformed with ease and unfolded.

In accordance with a seventh aspect, in the third aspect, said pillar garnish is formed so as to include a base member, which is positioned at a vehicle cabin outer side, and an outer skin, which is positioned at a vehicle cabin inner side of the base member, and the base member is separated into a first portion fixed to a pillar main body of the front pillar portion and a second portion forming the opening for expansion of said bag at a time when said bag expands, the first portion and the second portion are connected by a intermediate member interposed between the outer skins or the outer skin and the base member, and said second portion is made the unfolding portion.

In accordance with this aspect, the pillar garnish is formed so as to include the base member, which is positioned at the vehicle cabin outer side, and the outer skin, which is positioned at the vehicle cabin inner side of the base member. Further, the base member of the pillar garnish is separated into the first portion (the base portion) fixed to the front pillar and the second portion (the bag housing portion housing the bag front portion). Both are connected by the outer skin or the intermediate member interposed between the outer skins. Therefore, the separating position between the first portion and the second portion is the starting point of unfolding. Accordingly, when the bag expand, the second portion is extremely easily unfolded, with the outer skin or the intermediate member positioned at the separating position saving a hinge.

In accordance with an eighth aspect, in the third aspect, said pillar garnish is formed so as to include a base member, said pillar garnish is separated into a base portion, which is fixed to a pillar main body of the front pillar portion, and a bag housing portion, which houses said bag, and a front end portion of the bag housing portion is fixed to the pillar main body, a bag unfolding starting point region provided at the bag housing portion is a weakened portion, and a portion between said weakened portion and a widthwise direction end portion of the housing portion in which the opening for expansion of said bag is formed is the unfolding portion.

In accordance with this aspect, the pillar garnish is formed so as to include the member, and the pillar garnish is separated into the base portion fixed to the pillar main body and the bag housing portion in which the bag is housed. Further, the front end portion of the bag housing portion is fixed to the pillar main body and the weakened portion is provided at the region of the starting of unfolding of the bag housing portion. Therefore, when the bag expands, the bag housing portion of the pillar garnish can be easily unfolded, with the weakened portion of the development starting region being a start point, while the unfolding load is supported at the fixed region of the front end portion to the pillar main body.

In accordance with a ninth aspect, in the third aspect, said pillar garnish is formed so as to include a base member, which is positioned at a vehicle cabin outer side, and an outer skin, which is positioned at a vehicle cabin inner side of the base member, and a whole of the base member is formed by a soft material, whereby the unfolding portion is formed.

In accordance with this aspect, the pillar garnish is formed so as to include the base member, which is positioned at a vehicle cabin outer side, and the outer skin, which is positioned at a vehicle cabin inner side of the base member. Further, the whole of the base member is formed by a soft material. Therefore, the base member can be elastically deformed with ease. Accordingly, when the bag expands, the portion pressed by the expanding pressure of the bag in the pillar garnish can be elastically deformed with no trouble and can be easily unfolded.

In accordance with a tenth aspect, in the first aspect, said scatter preventing means is mounted to said pillar garnish along the longitudinal direction thereof, and is provided with extending portions respectively extending from both longitudinal direction end portions of said pillar garnish, and the extending portions are formed by a band-like strap fixed to a pillar main body of the front pillar portion.

In accordance with this aspect, the band-like strap is mounted to the pillar garnish. The strap extending portions of the strap, which respectively extend from the both longitudinal direction end portions (the upper and lower end portions) of the pillar garnish are fixed to the pillar main body of the front pillar portion. Therefore, the supporting strength of the pillar garnish with respect to the pillar main body is increased. Accordingly, even when a fixing device for fixing the pillar garnish to the pillar main body is out of place, the pillar garnish is securely supported to the pillar main body by a tensile force of the strap.

In accordance with an eleventh aspect, in the first aspect, said scatter preventing means has a predetermined strength, and is mounted to said pillar garnish along a surface thereof, and is provided with extending portions respectively extending from both longitudinal direction end portions of said pillar garnish, and the extending portions are formed by a net fixed to a pillar main body of the front pillar portion.

In accordance with this aspect, the net having a predetermined strength is mounted to the pillar garnish along the surface direction thereof. The extending portions(the end portions), which extend from the pillar garnish in the net, are fixed to the pillar main body. Therefore, the supporting strength of the pillar garnish with respect to the pillar main body is increased. Accordingly, even when the fixing device for fixing the pillar garnish to the pillar main body is out of place, the pillar garnish is securely supported to the pillar main body by a tensile force of the net.

In accordance with a twelfth aspect, in the first aspect, said scatter preventing means has an extending portion provided at said pillar garnish and extending forward a window shield glass and fixed to a body of a pillar main body of the front pillar portion, and said scatter preventing means has a hinge portion provided at said pillar garnish so as to form the opening for expansion of said bag.

In accordance with this aspect, the pillar garnish is structured such that when the bag expands, the extending portion of the pillar garnish is supported at the pillar main body of the front pillar portion and is unfolded toward the window shield glass with the hinge portion as the center of unfolding. As mentioned above, the pillar garnish is easily unfolded by the expanding pressure of the bag, so that the scattering thereof is prevented.

In accordance with a thirteenth aspect, in the first aspect, said pillar garnish is disposed so as to be separated from a pillar main body of the front pillar portion by a predetermined distance toward a vehicle cabin inner side, and said scatter preventing means is provided with bridges which are provided in vicinities of both longitudinal direction end portions at the reverse surface of said pillar garnish, and a strap, which connects said bridges and a predetermined region of said pillar main body and which has a distance longer than a distance between each of said bridges and the predetermined region.

In accordance with this aspect, the bridges are respectively provided in vicinities of the longitudinal direction end portions (two portions, the upper and lower portions) at the reverse surface of the pillar garnish. Each of the bridges and a predetermined region of the pillar main body are connected by using the strap which is longer than a distance between both portions. Therefore, when the pillar garnish is pressed toward the inner side of the vehicle cabin due to an expansion of the bag, although the pillar garnish is apart from the pillar main body, the pillar garnish does not come free from the pillar main body since the pillar garnish and the pillar main body are connected by the strap disposed in the vicinities of both end portions. As mentioned above, since the pillar garnish is apart from the pillar main body due to the expanding pressure due to the expansion of the bag, the expanding pressure acting on the pillar garnish is avoided, so that the pillar garnish is prevented from scattering.

In this case, the separating motion of the pillar garnish from the pillar main body is restricted at a time when the strap is extended.

In accordance with a fourteenth aspect, in the thirteenth aspect, the strap is wound around the bridge, and a recess portion for centering a wound portion of the strap around the bridge is provided at an end portion of the bridge which a region from to which a load is directly applied to the bridge from the wound portion of the strap around the bridge when said bag expands.

In accordance with this aspect, the strap is wound around the bridge, and the recess portion for centering the wound portion is provided at the end portion of the bridge which is a region to which the load is directly applied to the bridge from the wound portion of the strap due to the expansion of the bag. Therefore, the wound portion of the strap is biased to a center portion by the centering recess portion of the bridge at a time when the bag expands. Accordingly, in accordance with this aspect, even when the bag expands and torsion is generated in the pillar garnish which is apart from the pillar main body, the wound portion of the strap is not biased to a corner portion of the end portion of the bridge, so that the wound portion of the strap is always held at the center portion of the end portion of the bridge.

In accordance with a fifteenth aspect, in the thirteenth aspect, the strap is wound around the bridge, and at least one opening for absorbing an energy is provided in a vicinity of an end portion of the bridge which is a region to which a load is directly applied to the bridge from a wound portion of the strap around the bridge when said bag expands.

In accordance with this aspect, the strap is wound around the bridge, and at least one opening for absorbing an energy is provided in a vicinity of the end portion of the bridge which is a region to which the load is directly applied to the bridge from the wound portion of the strap when the bag expands. Therefore, the load acting on the bridge end portion at a time when the bag expands can be absorbed by the breaking of a peripheral portion of the opening.

In accordance with a sixteenth aspect, in the thirteenth aspect, the strap is wound around the bridge, and a recess portion for centering a wound portion of the strap around the bridge is provided at an end portion of the bridge which a region from to which a load is directly applied to the bridge from the wound portion of the strap around the bridge when said bag expands.

In accordance with this aspect, in the structure in which the strap is wound around the bridge, the bridge is layered in plural stages, and the wound portion of the strap is divided into plural portions in accordance with the number of stages of the bridge. The divisional wound portions are wound around the respective bridges. Therefore, the load acting on the bridge from the wound portion of the strap at a time when the bag expands is diffused to the respective bridge portions through the respective divisional portions.

In accordance with a seventeenth aspect, in the thirteenth aspect, a mounting seat of a temporarily fixing means, for temporarily fixing said pillar garnish to a pillar main body of the front pillar portion, is integrally provided at a region of the bridge opposing the opposing pillar main body of the front pillar portion.

In accordance with this aspect, the mounting seat of the temporarily fixing means for temporarily fixing the pillar garnish to the pillar main body is integrally provided at a region of the bridge opposing the pillar main body. Therefore, the structure can be made simple in comparison with a case in which the mounting seat of the temporarily fixing means for temporarily fixing the pillar garnish to the pillar main body is provided independently and separately from the bridge.

In accordance with a eighteenth aspect, in the thirteenth aspect, an engaging member capable of engaging with the bridge is mounted to an end portion of the strap, and the engaging member is engaged with the bridge so that the one end portion of the strap and the pillar garnish are connected to each other.

In accordance with this aspect, the engaging member capable of engaging with the bridge is mounted to the one end portion of the strap, and the one end portion of the strap and the pillar garnish are connected to each other due to the engaging member being engaged with the bridge. Therefore, the other end portion of the strap can be fixed in advance to the pillar main body, and the engaging member mounted to the one end portion of the strap can be engaged with the bridge at a time of assembling the pillar garnish.

In accordance with a nineteenth aspect, in the first aspect, the pillar garnish includes at least a base member, and the scatter preventing means is the base member which is formed by a non-break material, and there are further provided a fixing member for directly fixing the base member to the pillar main body of the front pillar portion, and a cap which is mounted to a recess portion formed on a design surface of the pillar garnish and which covers a head portion of the fixing member.

In accordance with this aspect, since the base member of the pillar garnish is formed by the non-break material, the pillar garnish is not easily deformed and broken when the bag expands. Accordingly, the pillar garnish is not scattered due to the expanding pressure at a time when the bag expands. Further, since the pillar garnish is directly fixed to the pillar main body by the fixing member, the pillar garnish is prevented from being out of place from the pillar main body.

In accordance with a twentieth aspect, in the nineteenth aspect, fall-out preventing means for connecting the cap to the base member is further provided.

In accordance with this aspect, even in the case that the cap is out of place from the pillar garnish when the bag is expands, the cap can be prevented from falling out from the garnish by the fallout preventing means which connects the cap to the base member of the pillar garnish.

In accordance with a twenty-first aspect, in the first aspect, said pillar garnish includes at least a base member, and said scatter preventing means is formed by the base member which is formed by a non-break material, engaging means for engaging the base member with a pillar main body of the front pillar portion, and an engagement force increasing portion provided at the engaging means and enabling deformation of said pillar garnish in a direction in which engagement between the base member and the pillar main body of the front pillar portion strengthened when said bag expand.

In accordance with this aspect, the pillar garnish can be easily mounted to the pillar main body by engaging the base member of the pillar garnish with the pillar main body by the engaging means. Further, since the pillar garnish is formed by the non-break material, the pillar garnish is not easily deformed and broken when the bag is expands. Still further, when the bag expands, the pillar garnish in deformed in the direction in which the engagement between the pillar garnish and the pillar main body is strengthened by the engagement force increasing portion provided in the engaging means. Thus, the pillar garnish can be prevented from coming out of place.

In accordance with a twenty-second aspect, in the first aspect, the scatter preventing means comprises:

engaging and attaching means for engaging and attaching said pillar garnish and a pillar main body of the front pillar portion in such a manner that said pillar garnish can come out of place from the pillar main body of the front pillar portion;

a bridge provided on at a reverse surface of said pillar garnish and having a guide hole extending through in a longitudinal direction of the front pillar portion; and a strap inserted through the guide hole so as to be supported by said pillar garnish, both longitudinal direction end portions of the strap being fixed to the pillar main body of the front pillar portion, and the strap being set to a length of forming said bag projecting opening when said bag is expands and the engagement and attachment between the pillar garnish and said pillar main body of the front pillar portion is released.

In accordance with a twenty-third aspect, in the twenty-second aspect, the bridge is provided in vicinities of both end portions and in a vicinity of a longitudinal direction center portion along the longitudinal direction of said pillar garnish.

In accordance with the twenty-second aspect, when the strap is inserted into the guide hole of the bridge, the both ends of the strap are fastened to the pillar main body in such a manner as to cover the folded and housed bag. Next, by engaging and attaching the engaging and attaching means, the pillar garnish can be mounted to the pillar main body.

Then, after mounting, when the bag expands, the pillar garnish is pushed by the bag, the engagement and attachment of the engaging and attaching means is released, the pillar garnish separates from the pillar main body, and the bag protrudes (expands) from the separated opening.

At this time, even when the bag protrudes, the pillar garnish is connected and held to the strap which has a length which can form the opening which allows the bag to protrude. Therefore, the pillar garnish can be prevented from being scattered.

Further, the strap is structured so as to have a length with leeway which allows formation of the opening through which the bag protrudes, which length is different than a length needed only for mounting the pillar garnish to the pillar main body. Therefore, the fastening operation can be simply performed by moving the pillar garnish in such manner as to shift from fastening portion or the like at a time of inserting the strap into the guide hole of the bridge and fastening the both ends of the strap to the pillar main body at vicinities of both ends of the pillar garnish in such a manner as to cover the folded and housed air bag. Since the shifting distance can be changed for a distance about twice the opening dimension, the fastening operation of the strap can be even more smoothly performed, so that it is easy to mount the pillar garnish to the pillar main body.

Accordingly, in the twenty-second aspect described above, even in the case of the structure in which the pillar garnish comes out of place from the pillar main body when the bag expands, the mounting operation can be easily performed.

Further, as in the case of the twenty-third aspect, when the bridge through which the strap is inserted are disposed at vicinities of both ends and at a vicinity of the center of the rear surface side of the pillar garnish, the stress can be dispersed when the pillar garnish is pushed by the bag while being held by the strap at a time the bag expands. Thus, the connecting strength between the strap and the pillar garnish can be improved.

In accordance with a twenty-fourth aspect, in the first aspect, said scatter preventing means is provided with a strap whose longitudinal direction center portion is integrally formed with said pillar garnish along a longitudinal direction of said pillar garnish and whose both longitudinal direction end portions are apart from said pillar garnish and are fixed to a pillar main body of a front pillar portion, and the structure of arranging a vehicle vehicle occupant protecting apparatus for an automotive vehicle further comprises:

an inserting portion formed in a vehicle front side end portion of said pillar garnish;

an opening portion formed in an insert of an instrument panel and into which said inserting portion is inserted; and an engaging portion formed at said inserting portion, and due to said engaging portion engaging with an edge portion of said opening portion, said pillar garnish can be temporarily placed at a tilted position at which said pillar garnish is tilted at a predetermined angle from a normal assembly position and an extending portion of the strap can be fixed to the pillar main body of the front portion.

In accordance with this aspect, the engaging portion, which is formed in the inserting portion of the vehicle front side end portion (the lower portion) of the pillar garnish, catches on the edge portion of the opening portion in the insert of the instrument panel. The pillar garnish is temporarily placed at the inclined position at which the pillar garnish is inclined at a predetermined angle from the normal assembly position. In this inclined state, the both longitudinal direction end portions (the extending portions) of the strap are fixed to the pillar main body in the pillar inner panel or the like. As a result, by changing the shape of the simple pillar garnish in which the insertion portion having the engaging portion is formed at a lower portion of the pillar, at the time of assembly, a worker need not hold the pillar garnish with one hand in a vicinity of an assembly position of the front pillar. The worker can fix the extending portion of the strap to the pillar main body by means of a bolt or the like by both hands therefore, the assembly workability of the pillar garnish can be improved.

BRIEF DESCRIPTION OF THE DRAWINGS

FIG. 1 is a cross sectional view along line 1—1 in FIG. 2 and shows in an enlarged manner an accommodated state of a bag front portion in an air bag apparatus in accordance with a first embodiment in connection with a pillar garnish of a front pillar.

FIG. 2 is a schematic structural view which shows a region at which the air bag apparatus is disposed in accordance with the first embodiment, as seen from a side portion.

FIG. 25 is a back surface view of a pillar garnish as seen in FIG. 24.

FIG. 26 is an enlarged perspective view which shows a main portion around a bridge and a strap of the pillar garnish shown in FIG. 24 with a middle portion being omitted.

FIG. 27 is an enlarged cross sectional view which shows a main portion of a structure of fixing a strap of the pillar garnish shown in FIG. 24 to a pillar inner panel.

FIG. 28 is an enlarged cross sectional view which shows in an enlarged manner a main portion of a structure of a horizontal cross section of a front pillar portion in accordance with the eleventh embodiment.

FIG. 39 is an enlarged perspective view which shows a main portion of an example (in which a projection stands upright from the pillar garnish, a folding portion of the strap is disposed, and thereafter, the bridge plate is inserted into the folding portion so as to thermally caulk the projection) of a structure connecting the strap and the pillar garnish in a similar manner.

FIG. 44 is an exploded perspective view which shows a cap and a recess portion in the structure of arranging the vehicle occupant protecting apparatus for an automotive vehicle in accordance with the eighteenth embodiment.

PREFERRED EMBODIMENTS FOR CARRYING OUT THE INVENTION

[First Embodiment]

A first embodiment will be described below with reference to FIGS. 1 to 4.

Figure 3:
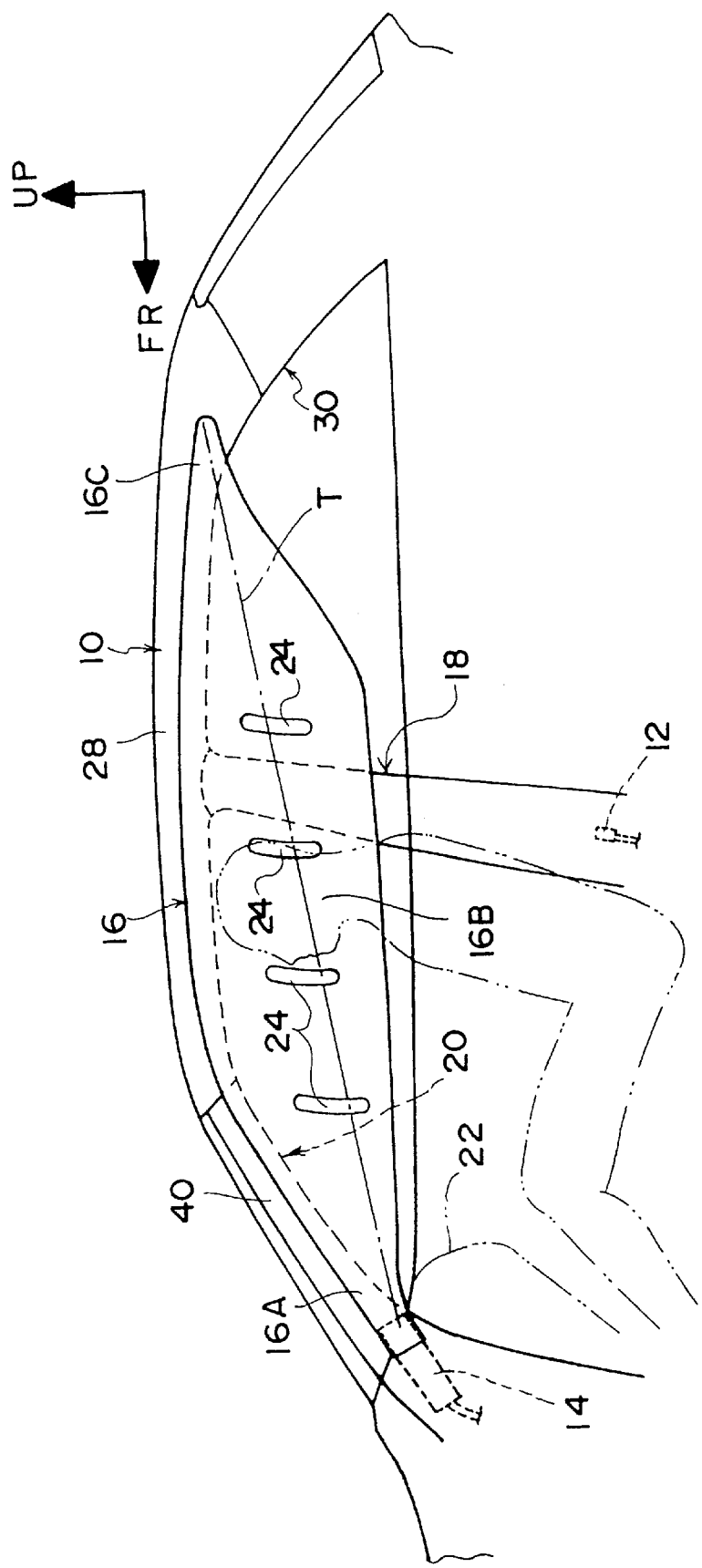
FIG. 3 is a schematic view corresponding to FIG. 2 and showing a state in which a bag is expanded at a time of a side collision.

A schematic structure of an operating state of an air bag apparatus 10 serving as an vehicle occupant protecting apparatus for an automotive vehicle is shown in FIGS. 2 and 3 by side views. As shown in these drawings, the air bag apparatus 10 is mainly formed by a sensor 12 for detecting a predetermined state of application of high load to a side portion of a vehicle body, a cylindrical inflator 14 for injecting gas upon operation, and a bag 16 folded in a predetermined folding manner. These elements will be briefly described below in this order, and thereafter, a main portion of the present embodiment will be described.

The sensor 12 is disposed in the portion close to a lower end portion of a center pillar portion (a B pillar portion) 18, and is structured so as to detect a predetermined state of application of high load in the case that a high load higher than a predetermined value acts on the side portion of the vehicle body. An acceleration sensor or the like is employed as the sensor 12. Besides the portion close to the lower end portion of the center pillar portion 18, an inner portion of a side door or the like can be selected as the portion at which the sensor 12 is disposed.

The inflator 14 is disposed in the portion close to a connecting portion between a front pillar portion (an A pillar portion) 20 and an instrument panel 22, and is connected to the sensor 12 mentioned above through a center control unit (not shown) disposed below a console box (not shown). Accordingly, when the predetermined state of application of high load is detected by the sensor 12, a predetermined operating current is made to flow to the inflator 14 from the center control unit, so that the inflator 14 is operated.

If the inflator 14 is disposed in the portion close to the connecting portion, there is the merit of directly connecting a front end portion 16A of the bag 16 to the inflator 14 as will be described hereinafter. However, a structure of disposing the inflator 14 in another portion of the vehicle body and connecting it to the front end portion 16A of the bag 16 by means of a tube or the like may be employed. Further, a gas generating agent sealing type for generating a gas so that the gas generating agent sealed therewithin is burnt, or a high pressure gas sealing type for injecting a high pressure gas by breaking a partition wall provided therewithin, or the like can be employed as the inflator 14.

The bag 16 is formed such that the expanded shape is substantially a parallelogram as seen in side view. A plurality of non-expanding portions 24, which are formed by sewing or adhesion or the like and which cross a tension line T connecting a front end fixing point of the bag 16 and a rear end fixing point mentioned below and whose longitudinal direction is the vertical direction of the bag, are formed in the middle portion in the vertical direction of the bag 16 at predetermined intervals. Further, the bag 16 is folded by a predetermined way of folding so as to be formed in a long shape, and thereafter, is housed within a resin long case 26 (refer to FIG. 5) which is broken and unfolded by a predetermined bag expanding pressure.

Further, the bag 16 mentioned above is disposed between a front pillar portion 20 and a roof side rail portion 28. More specifically, the front end portion 16A of the bag 16 is disposed at a position at which the inflator 14 is disposed such that a gas injected from the inflator 14 is flows into the front one portion 16A. A middle portion 16B is disposed along the front pillar portion 20 and the roof side rail portion 28, and the rear end portion 16C is disposed in the portion close to a quarter pillar portion (a C pillar portion) 30. Accordingly, in accordance with the present embodiment, the bag 16 which is longer in the longitudinal direction in the vehicle than that used in the prior art is employed.

Next, a structure of the front pillar portion 20 including the air bag apparatus 10 will be described below. A horizontal cross sectional structure in the middle portion in the longitudinal direction of the front pillar portion 20 is shown in FIG. 1. As shown in this drawing, the front pillar portion 20 comprises a front pillar main body 38 and a resin pillar garnish 40 which is disposed inside the vehicle cabin of the front pillar main body 38 so as to be spaced apart. The front pillar main body 38 is formed by a pillar outer panel 32 arranged outside the vehicle cabin and having a hat-shaped cross section, a substantially flat-plate-shaped pillar inner panel 34 disposed inside the vehicle cabin, and a pillar reinforcement 36 disposed so as to be sandwich between the pillar outer panel 32 and the pillar inner panel 34 and having a hat-shaped cross section in a closed cross sectional structure. An opening weather strip 39 is elastically fitted to an rear end flange portion of the front pillar main body 38.

The pillar garnish 40 is formed by a base member 42 made by a resin material having a predetermined hardness and formed in a convex curved shape, and an outer skin 44 covering an outer surface (a surface inside the vehicle cabin) of the base member 42. Further, a front portion side of the base member 42 of the pillar garnish 40 is made thick (hereinafter, this portion is referred to "a base portion 42A"), and a rear portion side of the base member 42 is made thin (hereinafter, this portion is referred to "a bag housing portion 42B"). Accordingly, the rigidity of the base portion 42A is set to be high, and on the contrary, the rigidity of the bag housing portion 42B is set to be lower than that of the base portion 42A.

The rigidity setting of the former is for ensuring the mounting rigidity of the front pillar main body 38 to the pillar inner panel 34, and the rigidity setting of the latter is for ensuring a smooth unfolding ability of the bag housing portion 42B. The connecting portion between the base portion 42A and the bag housing portion 42B (that is, a rigidity-suddenly-changing portion formed in the middle portion in the widthwise direction of the pillar garnish 40 along the longitudinal direction thereof) is a hinge portion 46 when the bag housing portion 42B unfolds. A final end portion close to the bag housing portion 42B in the pillar garnish 40 formed in the manner described above is elastically engaged with the opening weather strip 39 mentioned above.

In accordance with the present embodiment, a predetermined space portion 48 is formed between the base member 42 of the pillar garnish 40 and the pillar inner panel 34 by disposing the pillar garnish 40, which is formed in the convex curved shape described above, in the substantially flat-plate-shaped pillar inner panel 34 with a predetermined interval therebetween.

At the front side of the space portion 48, a resin rib 50 serving as an energy absorbing member for absorbing a secondary collision load in the vehicle occupant head portion at a time of a light load side collision to the side portion of the vehicle body (that is, at a time when the light load of an extent that the air bag apparatus 10 is not operated acts on the side portion of the vehicle body) is disposed so as to traverse the space portion 48. A mounting seat surface, formed at the outer side of the vehicle cabin, of the rib 50 is disposed adjacent to a convex portion 52 which is formed in the pillar inner panel 34 and projects toward the pillar garnish 40 end.

On the other hand, a bag front portion 16D is housed in the rear side of the space portion 48 together with the case 26. The bag front portion 16D is arranged in a state of being folded in a substantially rectangular cross section by a predetermined folding method. Further, a fin-like bag fixing portion 16E provided at a suitable interval is inserted between the aforementioned mounting seat surface of the rib 50 and the convex portion 52 of the pillar inner panel 34. In correspondence to this, the case 26 for housing the bag front portion 16D is also bent substantially in a rectangular shape in cross section. Further, a pair of case fixing portions 26A are inserted between the mounting seat surface of the rib 50 and the convex portion 52 in such a manner as to cover the front and rear surfaces of the bag fixing portion 16E. Then, in this state, the bag fixing portion 16E and the case fixing portion 26A are fastened to the convex portion 52 of the pillar inner panel 34 together with the rib 50 and the base portion 42A of the base member 42 in the pillar garnish 40 by fixing means such as a bolt 54 and a nut 56.

Figure 4:
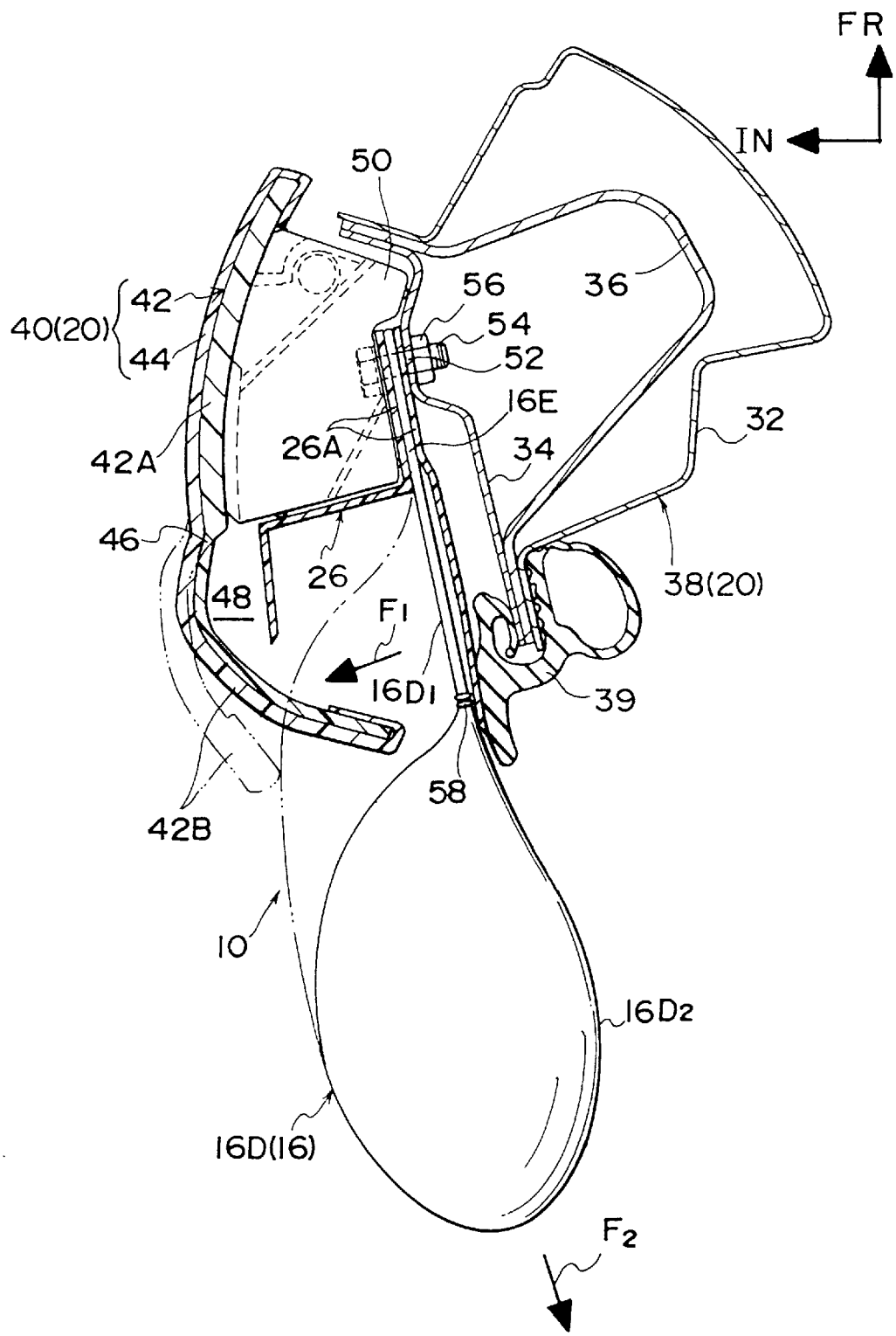
FIG. 4 is an enlarged cross sectional view corresponding to FIG. 1 and showing a state in which a bag front end is expanded at a time of a side collision.

Further, in accordance with the present embodiment, as can be understood from FIG. 4 showing the state at a time when the bag is expanded, a non-expanding portion $16D_1$ formed by sewing by means of a sewing thread 58 or the like is formed in the portion corresponding to the pillar garnish 40 in the bag front portion 16D. Accordingly, the gas injected from the inflator 14 does not flow into the non-expanding portion $16D_1$.

For example, adhesion by means of an adhesive or the like may be employed as another method of forming the non-expanding portion $16D_1$.

Next, the operation and effects of the present embodiment will be described.

When a predetermined high load is applied to the side portion of the vehicle body, the state of application of high load is detected by the sensor 12. Accordingly, the predetermined operating current is made to flow to the inflator 14 from the center control unit, thereby operating the inflator 14. Therefore, the predetermined amount of gas is injected from the inflator 14. Then, the bag 16 starts expanding and makes the case 26 break at the corner portion thereof due to the expanding pressure at that time so as to unfold the bag. The expanded bag 16 is expanded downward in a curtain manner along the roof side rail portion 28 from the front pillar portion 20 white pressing and opening the pillar garnish 40 of the front pillar portion 20 and the outer end portion of the roof head lining positioned at the roof side rail portion 28. As a result, the bag 16 is interposed between the vehicle body side portion and the vehicle occupant head portion, and the vehicle occupant head portion is protected by the bag 16.

The expanding process of the bag 16 will be described further. In the present embodiment, since a plurality of non-expanding portions 24 are formed in the middle portion in the vertical direction of the bag 16 as mentioned above, the gas injected from the inflator 14 flows from the front end portion 16A of the bag 16, and thereafter, flows separately into upper and lower portions due to the non-expanding portion 24 positioned at the frontmost end. Accordingly, the bag 16 is expanded such that an outer peripheral portion thereof forms a frame, and the gas continuously flows into the portions between the non-expanding portions 24 so as to expand the corresponding portions in the bag thickness direction. Therefore, a predetermined tension acts between the non-expanding portions 24, and the bag 16 is finally expanded substantially in a parallelogram shape which is formed by the great tensile stress working along the tension line T connecting the front end fixing point and the rear end fixing point (refer to FIG. 3).

In this case, in accordance with the present embodiment, as shown in FIG. 4, the non-expanding portion $16D_1$ is formed in the portion corresponding to the pillar garnish 40 at bag front portion 16D housed in the rear side of the space portion 48 between the pillar inner panel 34 and the pillar garnish 40 in the front pillar main body 38. Therefore, the pressing load $F_1$ acting on the bag housing portion 42B end of the pillar garnish 40 can be reduced at a time when the bag front portion 16D unfolds the bag housing portion 42B of the pillar garnish 40 around the hinge portion 46. Accordingly, in the case that the non-expanding portion $16D_1$ such as that of the present embodiment is not formed, since the bag front portion 16D is expanded as shown by the two-dot chain line in the drawing, the pressing load $F_1$ acting on the bag housing portion 42B end of the pillar garnish 40 becomes large. However, when the structure is formed so as to prevent the expansion of the bag front portion 16D within the bag housing portion 42B as in the present embodiment, the pressing load $F_1$ acting on the bag housing portion 42B end of the pillar garnish 40 can be reduced. Accordingly, in accordance with the present embodiment, when the bag 16 (the bag front portion 16D) is expanded, the pillar garnish 40 disposed at the front pillar portion 20 can be prevented from scattering.

Further, as mentioned above, since the gas dose not flow into the non-expanding portion $16D_1$ in the bag front portion 16D, the volume of flowing gas necessary for the bag front portion 16D can be reduced. In addition, since the gas can flow into the expanding portion $16D_2$ in the bag front portion 16D instantaneously to the extent that the gas dose not flow into the non-expanding portion $16D_1$ in the bag front portion 16D, an expanding force $F_2$, which is directed to the lower portion of the roof side rail and which attempts to expand the expanding portion $16D_2$, can be increased. As a result, in accordance with the present embodiment, it is possible to shorten the expanding time of the bag front portion 16D.

Further, in accordance with the present embodiment, since the bag housing portion 42B is structured so as to unfold around the hinge portion 46 by making the base portion 42A of the base member 42 thick and making the bag housing portion 42B thin, it is possible to easily avoid the operating load by the bag expanding pressure against the bag housing portion 42B, and it is possible to prevent the excessive stress from concentrating at the bag housing portion 42B. As a result, in accordance with the present embodiment, it is possible to effectively prevent the pillar garnish 40 from scattering when the bag front portion 16D expands.

In accordance with the present embodiment, as shown in FIG. 4, the non-expanding portion $16D_1$ is formed by applying by sewing the sewing thread 58 at the portion corresponding to the pillar garnish 40 in the bag front portion 16D. However, in the relation to the third aspect described above, it is not always necessary to provide the non-expanding portion $16D_1$. This point can be similarly applied to the eighth to tenth embodiments which will be described later.

[Second Embodiment]

A second embodiment will be described below with reference to FIGS. 5 and 6. The same reference numerals are given to the same elements as those in the embodiment mentioned above, and description thereof will be omitted.

Figure 5:
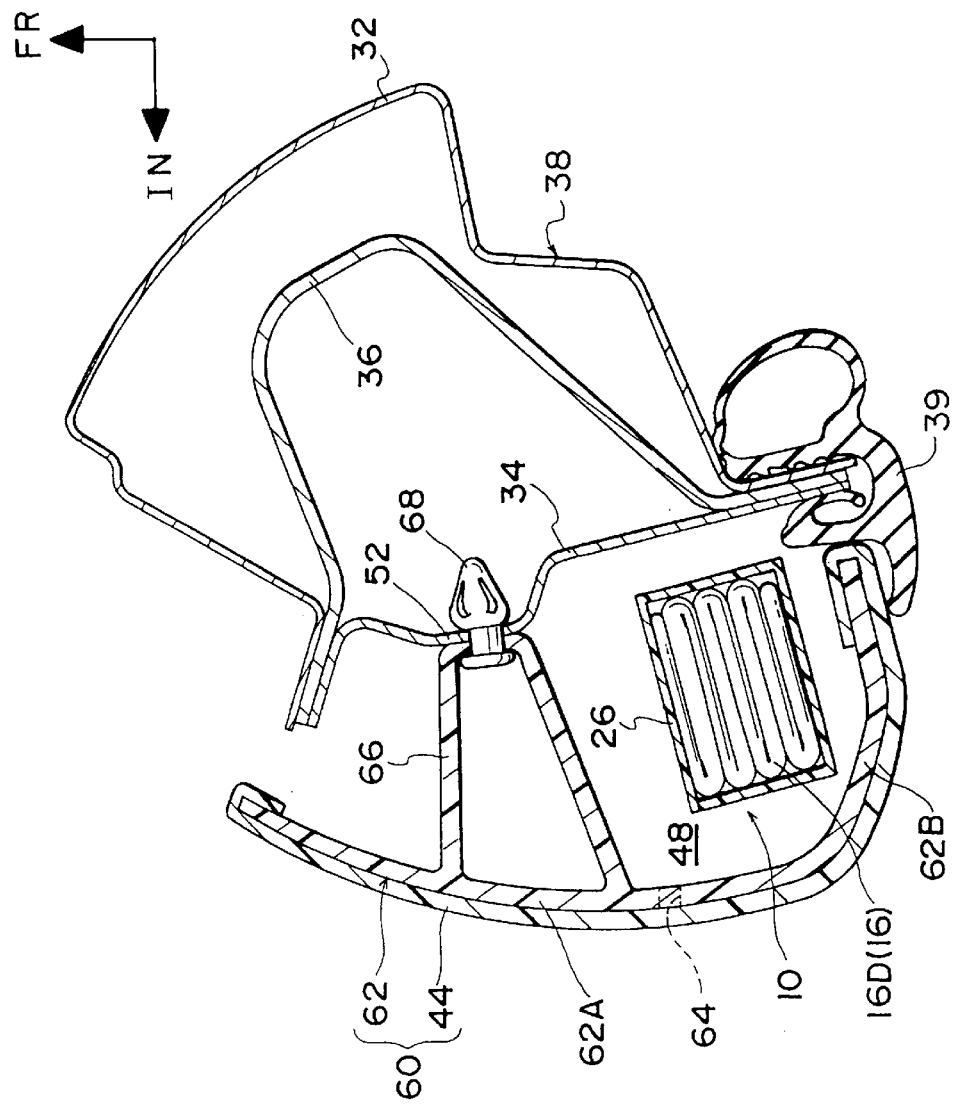
FIG. 5 is a cross sectional view corresponding to FIG. 1 and shows in an enlarged manner a main portion (in which a slit is formed in a base member of a pillar garnish) in accordance with an example of a second embodiment.

In the embodiment shown in FIG. 5, a pillar garnish 60 is formed by a base member 62 and an outer skin 44 which respectively have the same thickness. Further, in accordance with the present embodiment, a plurality of slits 64 corresponding to a weakened portion is formed in a connecting portion between a base portion 62A and a bag housing portion 62B in the base member 62 (a middle portion in a widthwise direction of the pillar garnish 60) along a longitudinal direction of the garnish at predetermined intervals. Accordingly, the rigidity of the region at which the slits 64 are formed in the base member 62 is reduced. A mounting seat 66 having a substantially trapezoidal cross section is integrally formed in a portion close to the base portion 62A in the base member 62, and the mounting seat 66 is fixed to the convex portion 52 in the pillar inner panel 34 by means of a resin clip 68.

In accordance with the above-described structure, when the bag front portion 16D is expanded so that a predetermined expanding pressure is applied to the bag housing portion 62B in the pillar garnish 60, the bag housing portion 62B is easily unfolded toward the inner side of the vehicle cabin, with the unfolding staring at the region at which the slits 64 are formed which has been made a low rigidity region. Accordingly, the region at which the slits 64 are formed, which has been made a low rigidity region, serves as the unfolding hinge of the bag housing portion 62B. As a result, also in accordance with the present embodiment, it is possible to further effectively prevent the pillar garnish 60 from scattering when the bag front portion 16D is expanded.

Further, since the slits 64 mentioned above can be integrally formed at a time of molding the base member 62, there is the merit that the structure is made simple in comparison with a case in which a separate part is additionally used.

Figure 6:
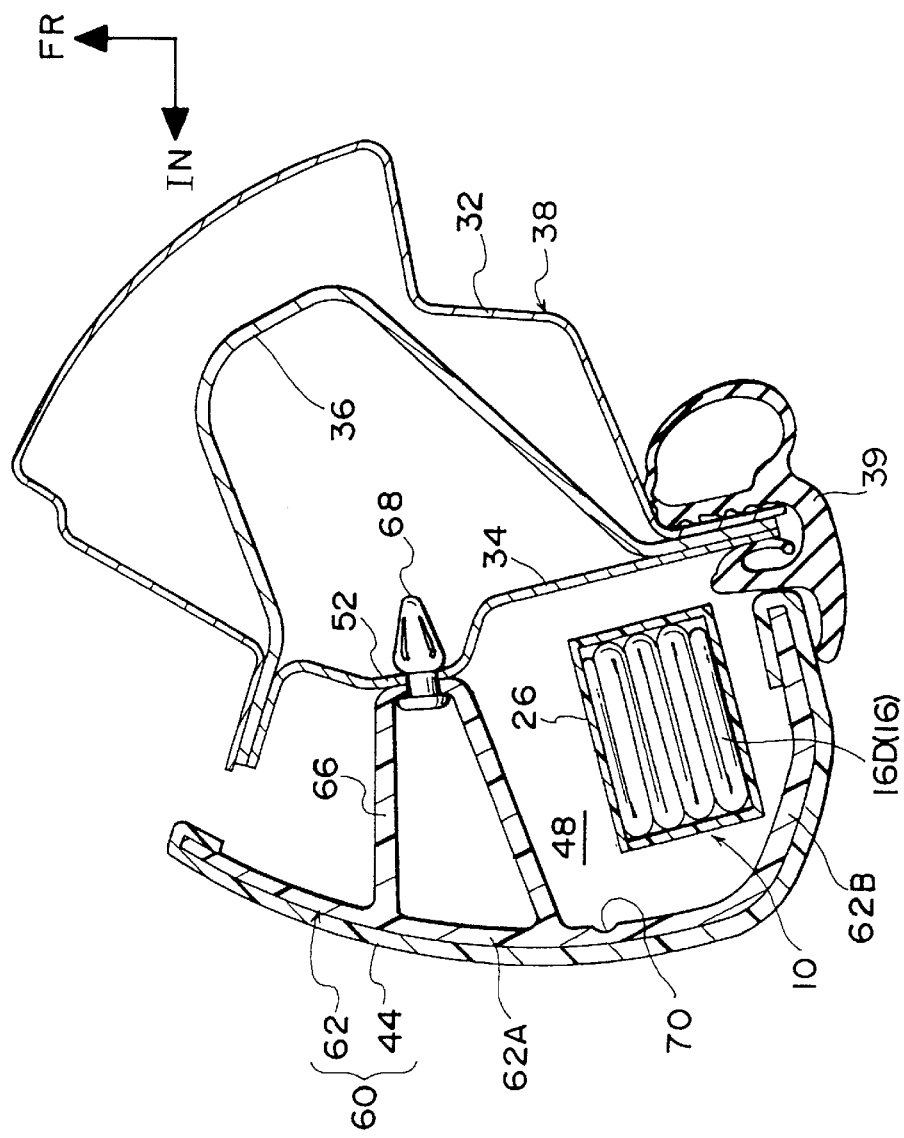
FIG. 6 is a cross sectional view corresponding to FIG. 5 and shows in an enlarged manner a main portion (in which a thin portion is formed in a base member of a pillar garnish) in accordance with another example of the second embodiment.

Still further, in a modified example of the second embodiment shown in FIG. 6, in place of the slits 64 mentioned above, a thin portion 70 having a concave groove shape and serving as a weakened portion is integrally formed in the connecting portion between the base portion 62A and the bag housing portion 62B of the base member 62. Accordingly, also in this modified example, the same operation and effects as those of the embodiment shown in FIG. 5 can be obtained.

[Third Embodiment]

A third embodiment will be described below with reference to FIG. 7. In this case, the same reference numerals are given to the same elements as those in the above-described embodiments, and description thereof will be omitted.

Figure 7:
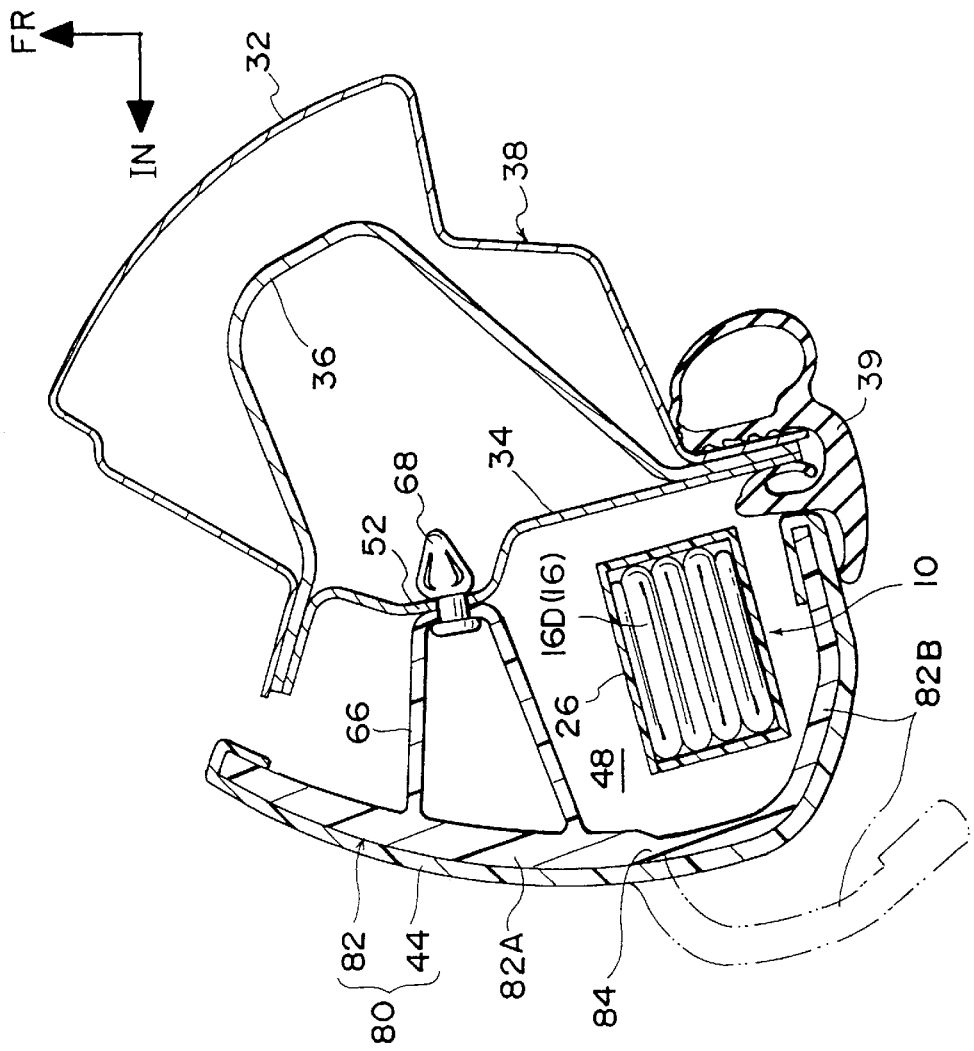
FIG. 7 is a cross sectional view corresponding to FIG. 5 and shows in an enlarged manner a main portion (in which a bag housing portion in a base member of a pillar garnish is made thin with respect to a base portion) in accordance with a third embodiment.

As shown in FIG. 7, the structure is the same as that of the embodiment described above in that a pillar garnish 80 is formed by a base member 82 and the outer skin 44. However, in the present embodiment, there is a difference in that a base portion 82A in the base member 82 is formed thick, but a bag housing portion 82B in the base member 82 is formed thinner than the base portion 82A, and the feature of the present embodiment resides in this point. Accordingly, the rigidity of the thin bag housing portion 82B is made lower than that of the thick base portion 82A.

In accordance with the above-described structure, when the bag front portion 16D is expanded so that a predetermined expanding pressure is applied to the bag housing portion 82B of the pillar garnish 80, the bag housing portion 82B, whose rigidity is made low, can be elastically deformed with ease with respect to the hinge portion 84, which is the connecting portion between the bag housing portion 82B and the base portion 82A, serving as the starting point of unfolding. As a result, also in accordance with the present embodiment, it is possible to further effectively prevent the pillar garnish 80 from scattering when the bag front portion 16D is expanded.

Further, at the time of molding the base member 82, it is extremely easy to form the base portion 82A thick and to form the bag housing portion 82B thin. Therefore, the number of production steps is not increased and the structure can be made simple.

Further, in accordance with the present embodiment, since the bag housing portion 82B is made thin, it can be easily assembled by utilizing the elastic deformation of the bag housing portion 82B when assembling the pillar garnish 80 to the front pillar main body 38. Accordingly, it is possible to prevent the pillar garnish 80 from breaking at the time of assembling and to prevent residual deformation from being generated.

[Fourth Embodiment]

A fourth embodiment will be described below with reference to FIGS. 8 and 9. The same reference numerals are given to the same elements as those in the above-described embodiments, and description thereof will be omitted.

Figure 8:
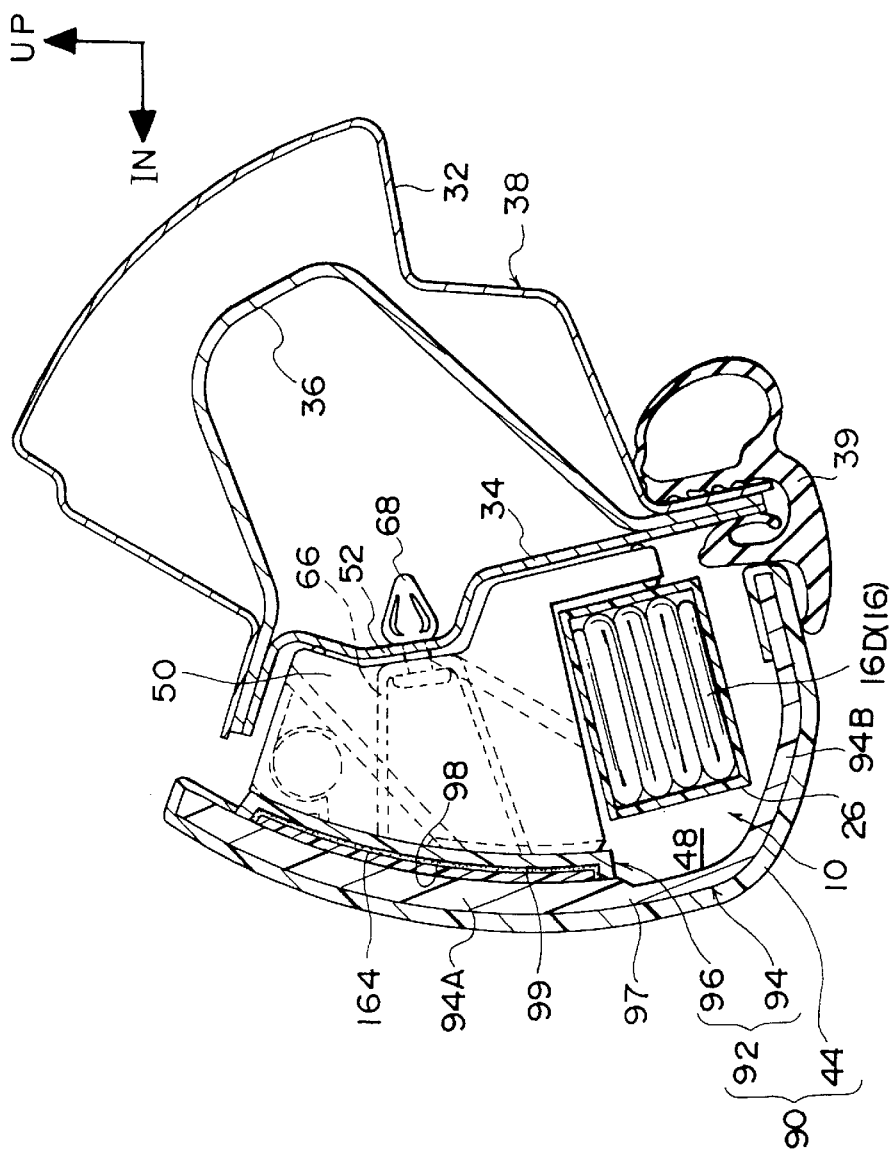
FIG. 8 is a cross sectional view corresponding to FIG. 5 and shows in an enlarged manner a main portion (in which a base member of a pillar garnish is formed of a soft material and a rigid material) in accordance with an example of a fourth embodiment.

The feature of the embodiment shown in FIG. 8 resides in the point that a base member 92 of a pillar garnish 90 is formed by two kinds, hard and soft, of base members which are a soft member 94 made of an urethane, TPO or the like and having a low rigidity, and a hard member 96 made of ABS, PP or the like and having a high rigidity. More specifically, the soft member 94 comprises a thickened base portion 94A and a thinned bag housing portion 94B and is formed in a curved shape. A surface of the soft member 94 (a surf ace inside the vehicle cabin) is covered by the outer skin 44, and a connecting portion between the base portion 94A and the bag housing portion 94B is made a hinge portion 97. Further, the hard member 96 is disposed only at the base portion 94A side in the soft member 94, and the mounting seat 66 mentioned above is formed on the surface at the outer side of the vehicle cabin. A concave portion 98 having a shallow bottom is formed at a bottom portion of the hard member 96, and the hard member 96 is adhered to the base portion 94A of the soft member 94 by an adhesive 99 with a strap 164 for reinforcement (which will be described later in a later embodiment) disposed within the concave portion 98.

The hard member 96 may be adhered to the soft member 94 by welding or the like in place of the adhesive 99, or a method of simultaneously molding both by double injection molding at a time of molding the base member 92 may be employed.

In accordance with the structure described above, when the bag front portion 16D is expanded so that a predetermined expanding pressure is applied to the bag housing portion 94B of the pillar garnish 90, since the bag housing portion 94B is a portion of the soft member 94 and has low rigidity, the bag housing portion 94B can be elastically deformed with ease with the starting point of unfolded being the hinge portion 97 which is the connecting portion between the bag housing portion 94B and the base portion 94A. As a result, also in accordance with the present embodiment, it is possible to even more effectively prevent the pillar garnish 90 from scattering when the bag front portion 16D is expanded.

Further, in accordance with the present embodiment, the base member 92 is separated into the soft member 94 and the hard member 96, and the hard member 96 is disposed in the portion close to the base portion 94A of the soft member 94. Therefore, the shape holding characteristic (shape holding performance) of the pillar garnish 90 is excellent, and it is possible to easily set the mounting seat 66 for mounting the pillar garnish 90 at the pillar inner panel 34 of the front pillar 38.

Figure 9:
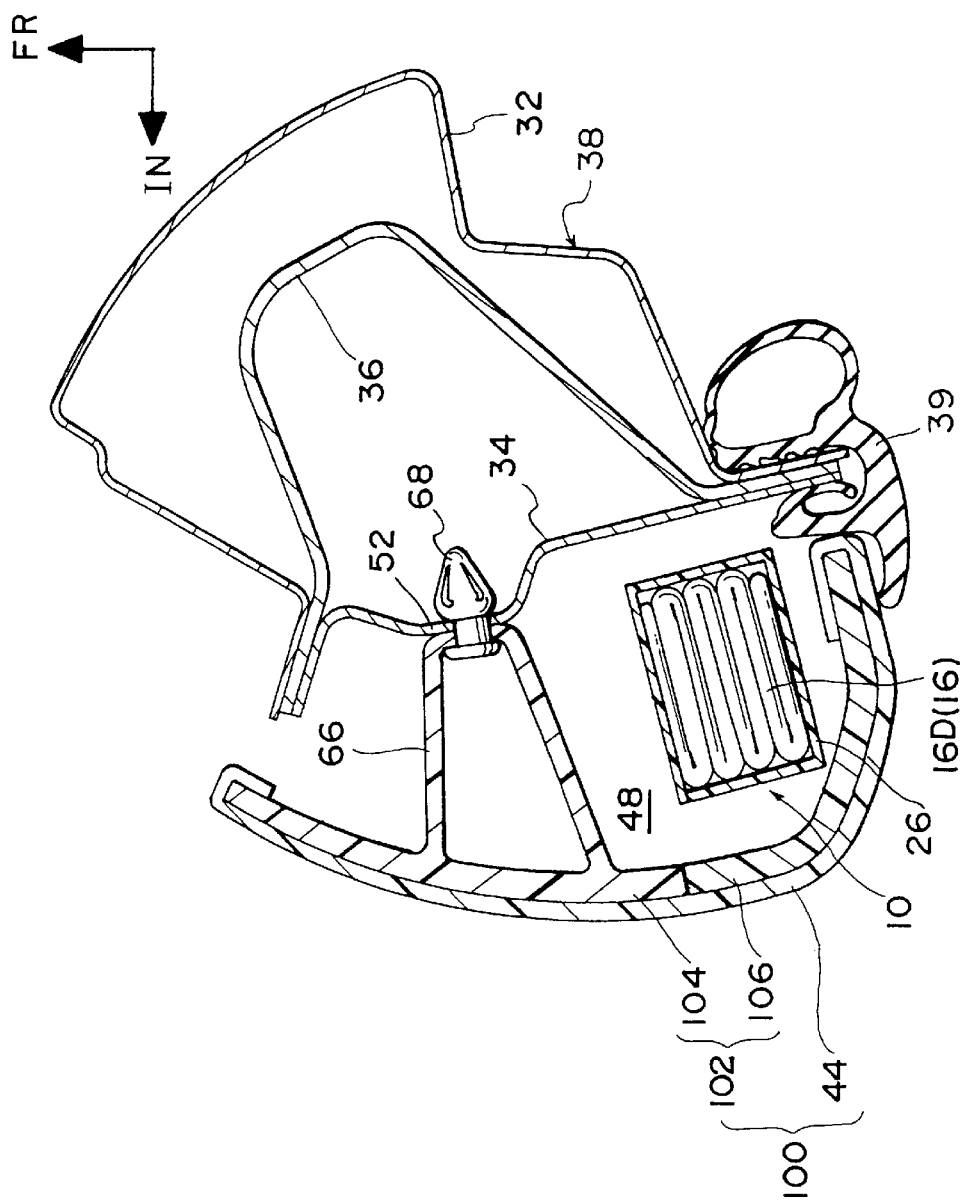
FIG. 9 is a cross sectional view corresponding to FIG. 5 and shows in an enlarged manner a main portion (in which a base member of a pillar garnish is formed of a soft material and a rigid material and both materials are separated by a hinge portion) in accordance with another example of the fourth embodiment.

Moreover, the feature of the embodiment shown in FIG. 9 (the modified example of the fourth embodiment) resides in the points that a base member 102 of a pillar garnish 100 is separated at a portion corresponding to a hinge, a hard member 104 is disposed in the portion close to the base portion, and a soft member 106 is disposed in the portion close to the bag housing portion. The hard member 104 and the soft member 106 are integrally formed by an adhesive (not shown) or the like. Also in accordance with the present embodiment, the same operation and effects as those of the embodiment shown in FIG. 8 described above can be obtained. In addition, in accordance the present embodiment, there is the merit that the amount of material used for the soft member 106 is less than that in the case of the embodiment shown in FIG. 8.

[Fifth Embodiment]

A fifth embodiment will be described below with reference to FIGS. 10 and 11. The same reference numerals are given to the same elements as those in the embodiments described above, and description thereof will be omitted.

Figure 10:
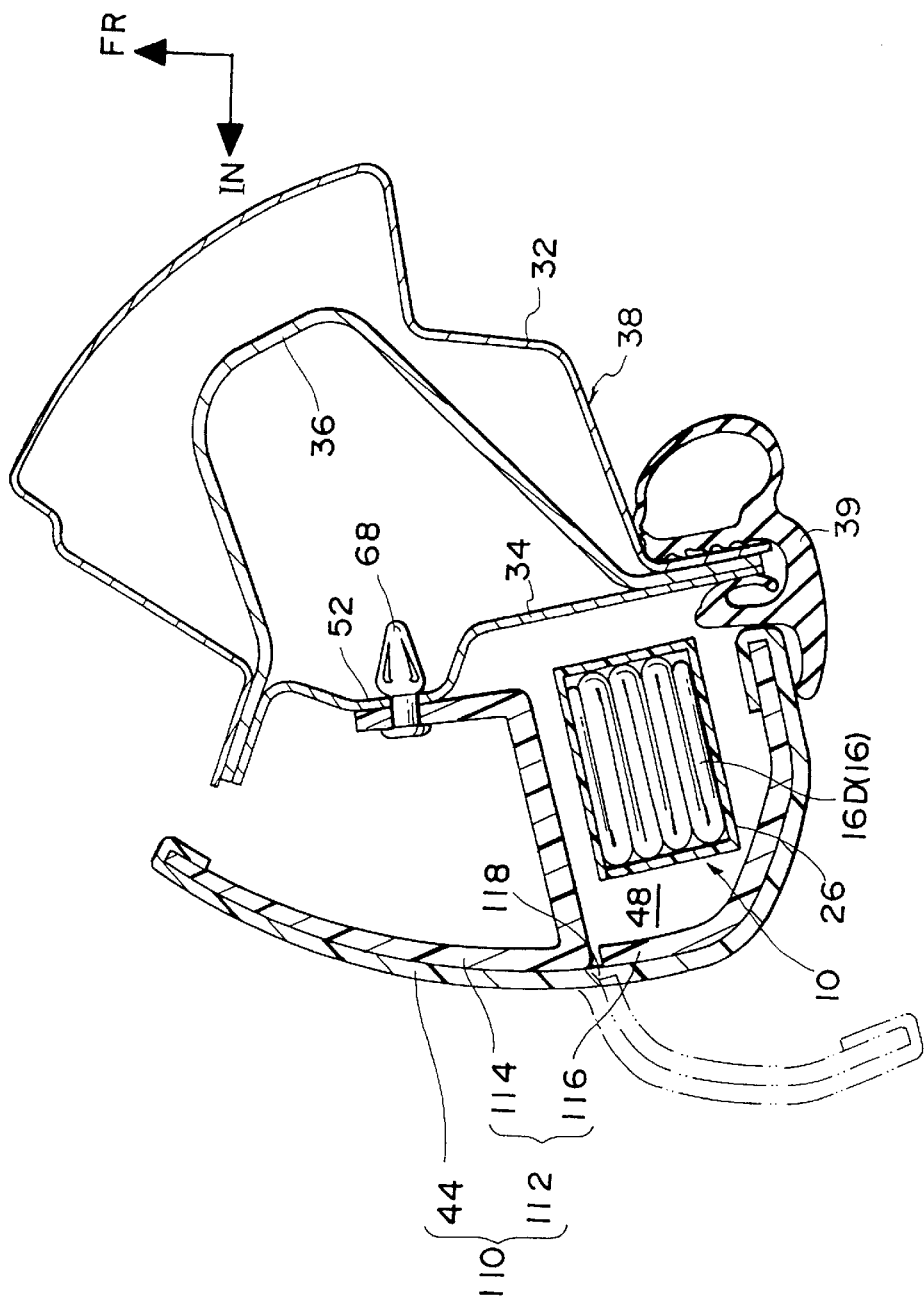
FIG. 10 is a cross sectional view corresponding to FIG. 5 and shows in an enlarged manner a main portion (in which a base member of a pillar garnish is separated into a base portion and a bag housing portion and is integrally formed by an outer skin) in accordance with an example of a fifth embodiment.

In the embodiment shown in FIG. 10, a base member 112 of a pillar garnish 110 is separated into a base portion 114, which is disposed at the portion close to a front portion, and a bag housing portion 116, which is disposed at the portion close to a rear portion. The base portion 114 is formed in such a manner as to have a substantially C-shaped cross section, and an end portion outside the vehicle cabin is fixed to the convex portion 52 of the pillar inner panel 34 by means of the clip 68. Further, the bag housing portion 116 is formed in a convex curved shape in order to house the bag front portion 16D. Still further, the base portion 114 and an outer surface (a surface inside the vehicle cabin) of the bag housing portion 116 are covered by the outer skin 44, so that both are integrally formed. A slight gap is formed at the connecting portion between the base portion 114 and the bag housing portion 116, and this region at which the gap is formed is used as a hinge 118.

In accordance with the structure described above, when the bag front portion 16D is expanded so that a predetermined expanding pressure is applied to the bag housing portion 116 of the pillar garnish 110, since the bag housing portion 116 is separated from the base portion 114, the bag housing portion 116 is extremely easily unfolded with the starting point of unfolding being the hinge portion 118 which is the connecting portion between the bag housing portion 116 and the base portion 114. As a result, also in accordance with the present embodiment, it is possible to further effectively prevent the pillar garnish 110 from scattering when the bag front portion 16D is expanded.

Further, in accordance with the present embodiment, since the base portion 114 which is fixed to the front pillar main body 38 and the bag housing portion 116 which houses the bag front portion 16D are separated into independent parts, it is possible to decrease a fixing strength of the base portion 114 to the front pillar 38 as compared with a case of using a base member in which both the base portion and the bag housing portion are formed as a single part. Accordingly, since the unfolding load applied to the base portion 114 end when the bag housing portion 116 is unfolded can be reduced by the above-described structure, there is no trouble even when the rigidity of the base portion 114 is reduced. Considering this fact from another view point, it is possible to improve the removability of the pillar garnish 110 from the front pillar main body 38.

Figure 11:
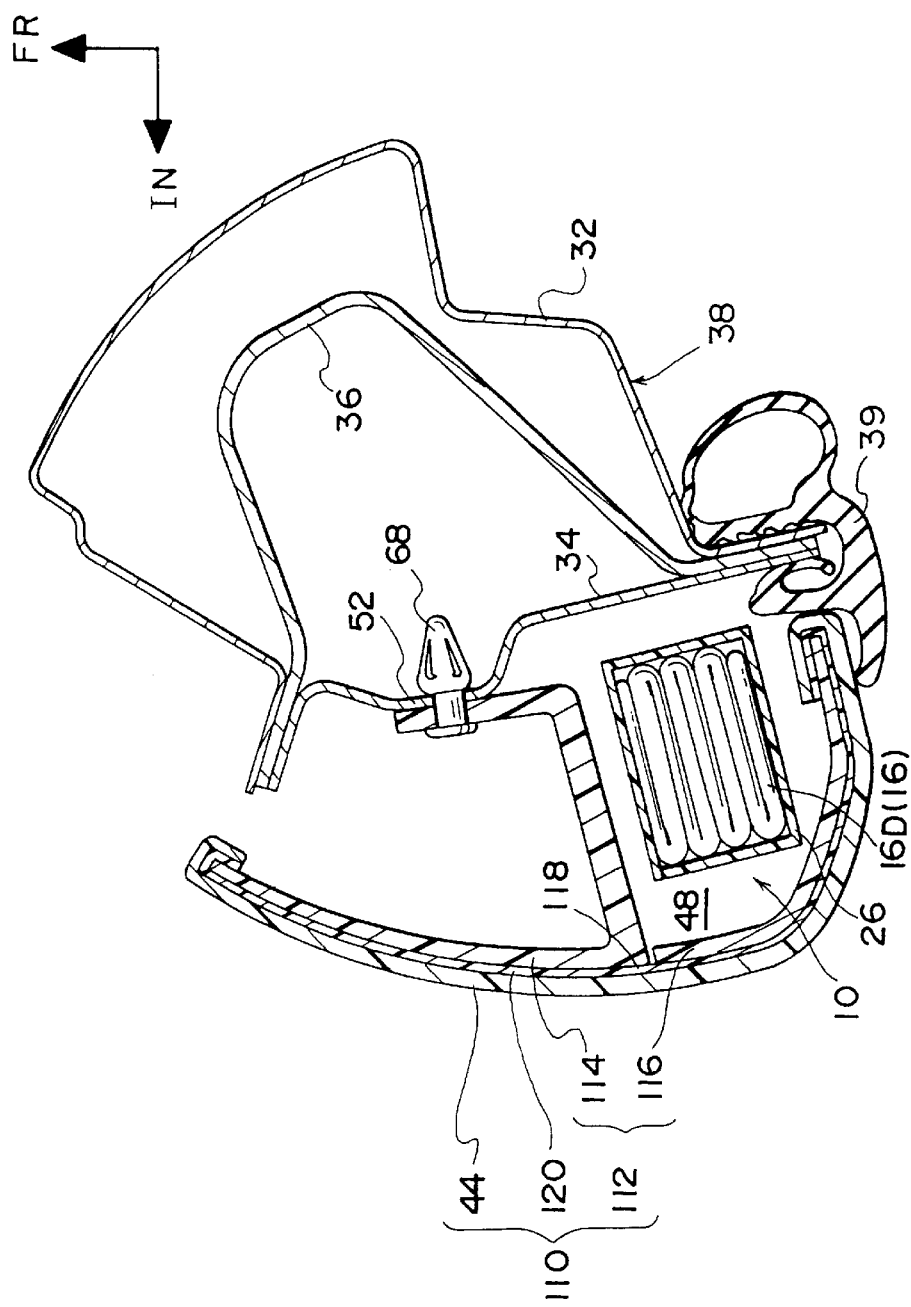
FIG. 11 is a cross sectional view corresponding to FIG. 5 and shows in an enlarged manner a main portion (in which a base member of a pillar garnish is separated into a base portion and a bag housing portion and is integrally formed by a middle member) in accordance with another example of the fifth embodiment.

The embodiment shown in FIG. 11 (the modified example of the fifth embodiment) has a feature in the point that both of the base portion 114 and the bag housing portion 116 are integrally formed by a middle member 120, which is interposed between the outer skin 44 and the base member 112 and made of a nylon base fabric or the like, in place of integrally forming the base portion 114 and the bag housing portion 116 by the outer skin 44. The same operation and effects as those of the above-described fifth embodiment can be obtained by employing this structure. In addition, in the case that the base portion 114 and the bag housing portion 116 are integrally formed by using the outer skin 44, the material which can be used is inherently limited. However, there is the merit that it is possible to select a material having a high bonding strength by using the middle member 120.

[Sixth Embodiment]

A sixth embodiment will be described below with reference to FIG. 12. The same reference numerals are given to the same elements as those in the above-described embodiments, and description thereof will be omitted.

Figure 12:
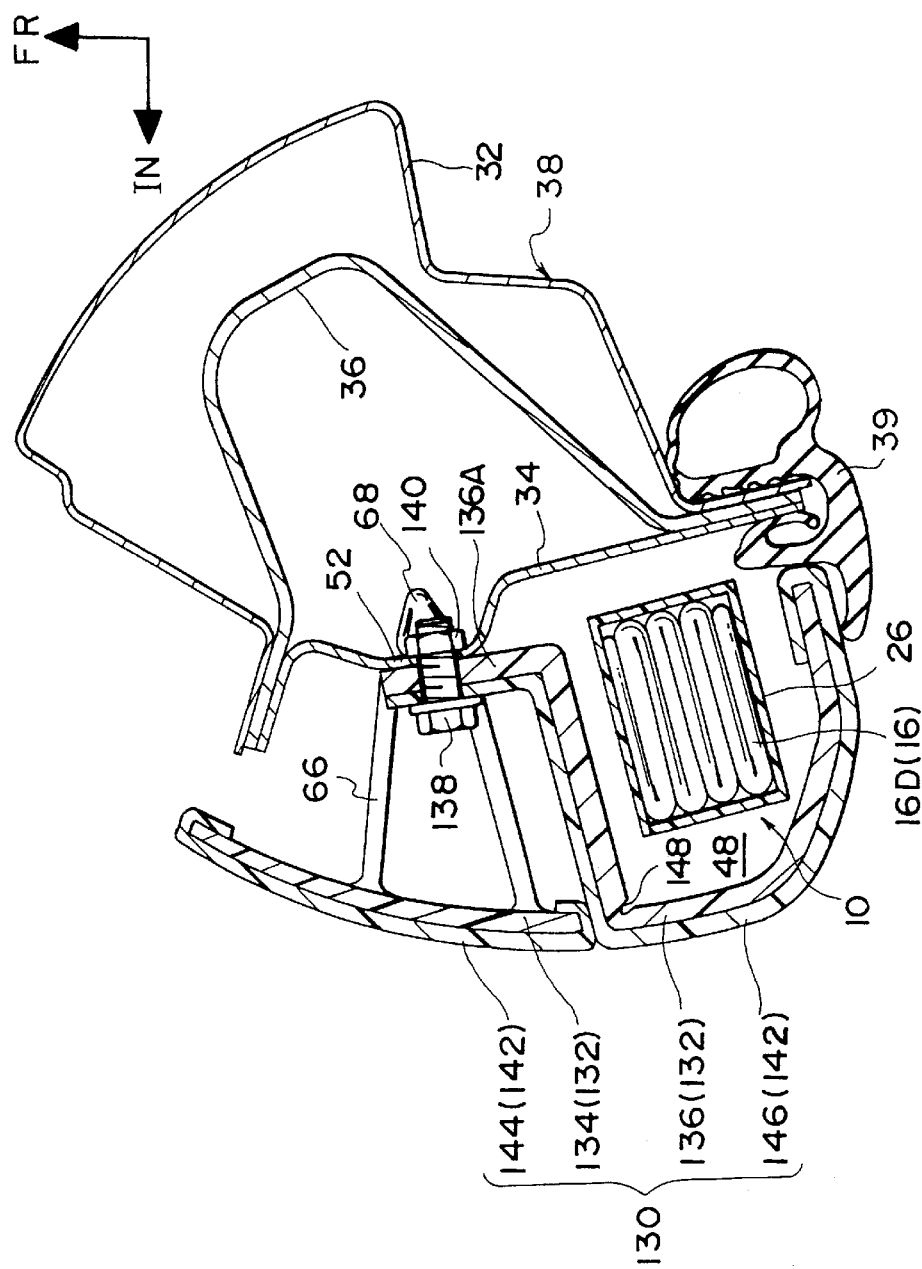
FIG. 12 is a cross sectional view corresponding to FIG. 5 and shows in an enlarged manner a main portion (in which a whole of a pillar garnish is separated into a base portion and a bag housing portion and they are respectively fixed to a front pillar) in accordance with a sixth embodiment.

As shown in FIG. 12, in accordance with the present embodiment, a base member 132 of a pillar garnish 130 is separated into a base portion 134 disposed at the portion close to a front portion and a bag housing portion 136 disposed at the portion close to a rear portion. Further, the base portion 134 is formed in a gently curved shape, and is fixed to the convex portion 52 of the pillar inner panel 34 by means of the clip 68 through the mounting seat 66 which is integrally formed at the back surface end thereof. Still further, the bag housing portion 136 is structured such that the bag front portion 16D is formed substantially in a C-shaped cross section which can house the portion 160. The front end portion thereof is curved toward the forward side so that the mounting piece 136A is integrally formed. The mounting piece 136A is fixed to the convex portion 52 of the pillar inner panel 34 by means of a bolt 138 and a nut 140, whereby the bag housing portion 136 is mounted to the pillar inner panel 34.

Further, in correspondence to the structure described above, in accordance with the present embodiment, an outer skin 142 of the pillar garnish 130 is also separated into a base end outer skin 144, which covers the surface end of the base portion 134, and a housing portion end outer skin 146, which covers the surface end of the bag housing portion 136.

Moreover, a notch 148 serving as a weakened portion for facilitating unfolding is formed on the back surface of the base adjacent corner portion in the bag housing portion 136. In the present embodiment, although the notch 148 is formed as the weakened portion, the present invention is not limited to the same, and a slit or the like may be formed.

In accordance with the structure described above, when the bag front portion 16D is expanded so that the predetermined expanding pressure is applied to the bag housing portion 136 of the pillar garnish 130, since the bag housing portion 136 is separated from the base portion 134, the bag housing portion 136 can be easily unfolded with the notch 148 as the starting point of unfolding, while the unfolding load is directly supported by the pillar inner panel 34. As a result, also in accordance with the present embodiment, it is possible to further effectively prevent the pillar garnish 130 from scattering when the bag front portion 16D is expanded.

Further, in accordance with the present embodiment, since the whole of the pillar garnish 130 is completely separated into the base portion end and the bag housing portion end as independent parts, they can be firmly fixed to the pillar inner panel 34 of the front pillar main body 38. Accordingly, it is possible to even more effectively ensure the scatter preventing effect of the pillar garnish 130. In this case, in accordance with the present embodiment, since the unfolding load is not applied to the base portion 134 of the pillar garnish 130, this is fixed to the pillar inner panel 34 by means of the clip 68. However, in view of realizing the effect mentioned above, the base portion 134 may be firmly fixed to the pillar inner panel 34 by a bolt and a nut.

[Seventh Embodiment]

A seventh embodiment will be described below with reference to FIG. 13. The same reference numerals are given to the same elements as those in the above-described embodiments, and description thereof will be omitted.

Figure 13:
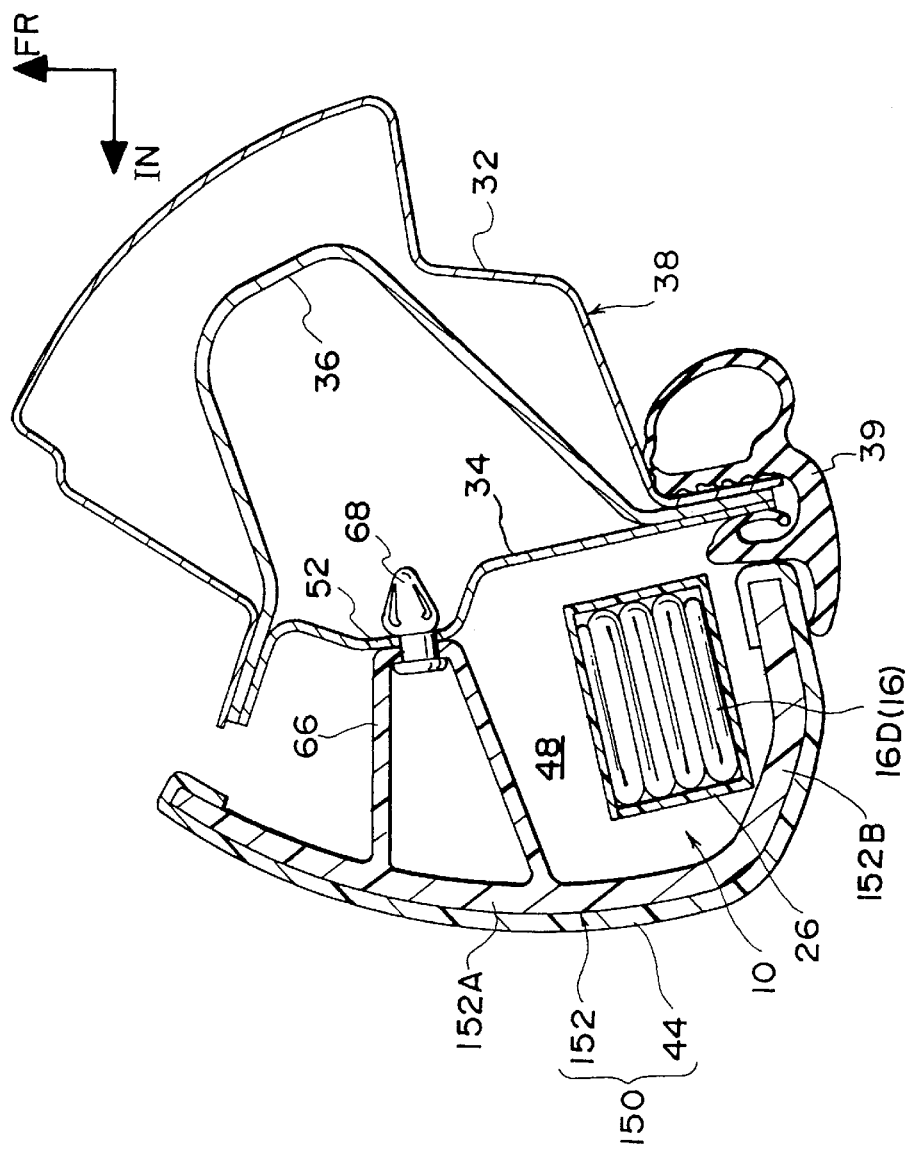
FIG. 13 is a cross sectional view corresponding to FIG. 5 and shows in an enlarged manner a main portion (in which a whole of a pillar garnish is made of a soft material) in accordance with a seventh embodiment.

As shown in FIG. 13, in accordance with the present embodiment, there is the feature that the whole of a base member 152 of a pillar garnish 150 (the whole including a base portion 152A and a bag housing portion 152B) is constituted by a soft material such as an urethane, TPO, perplene material or the like.

In accordance with the above-described structure, when the bag front portion 16D is expanded so that a predetermined expanding pressure is applied to the bag housing portion 152B of the pillar garnish 150, the bag housing portion 152B is elastically deformed with no trouble and unfolded since the whole of the base member 152 is formed by a soft material. As a result, also in accordance with the present embodiment, it is possible to even more effectively prevent the pillar garnish 150 from scattering when the bag front portion 16D is expanded.

[Eighth Embodiment]

An eighth embodiment will be described below with reference to FIGS. 14 to 18. The same reference numerals are given to the same elements as those in the above-described embodiments, and description thereof will be omitted.

Figure 14:
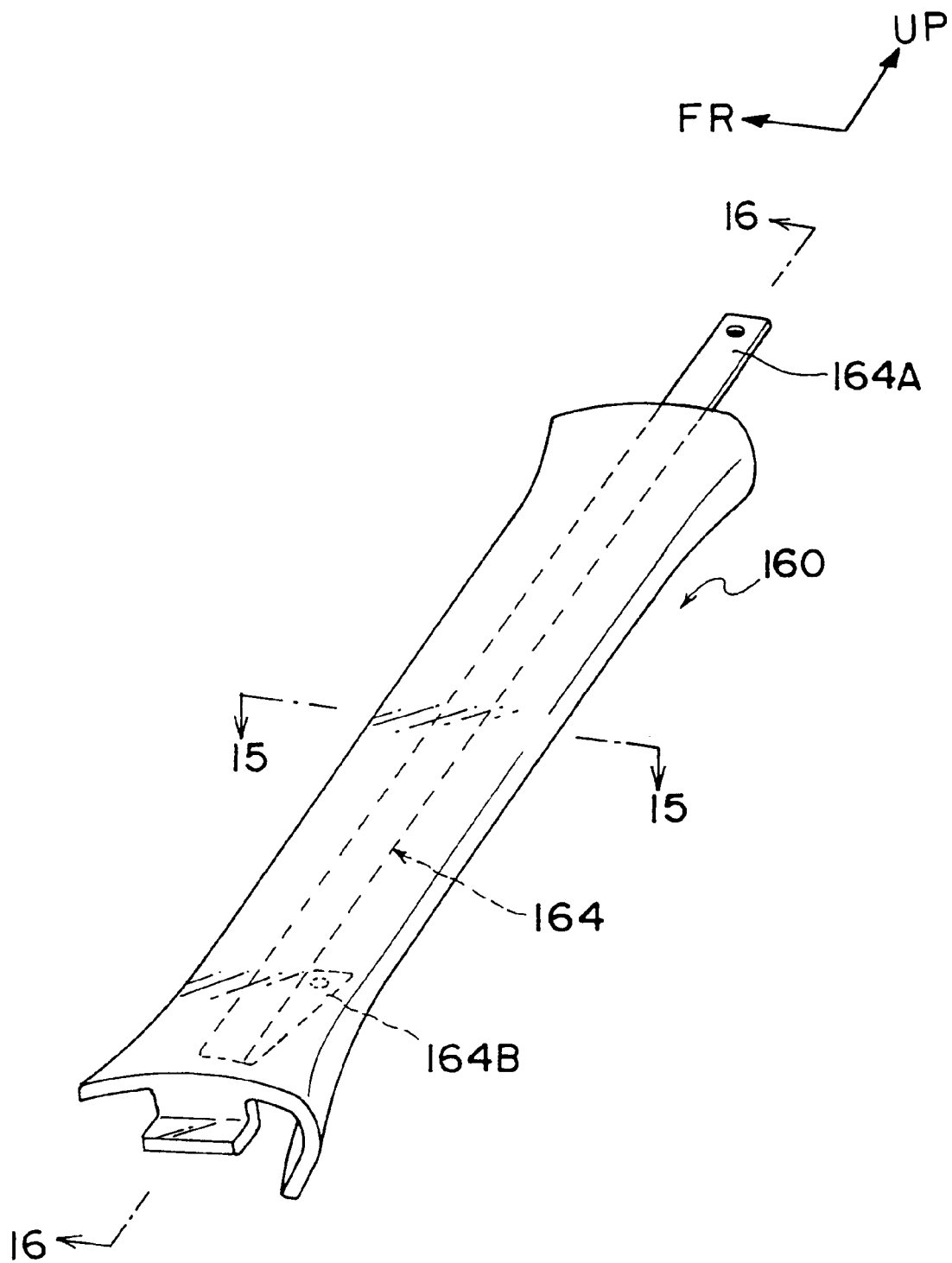
FIG. 14 is a perspective view which shows a pillar garnish in accordance with an example of an eighth embodiment.
Figure 15:
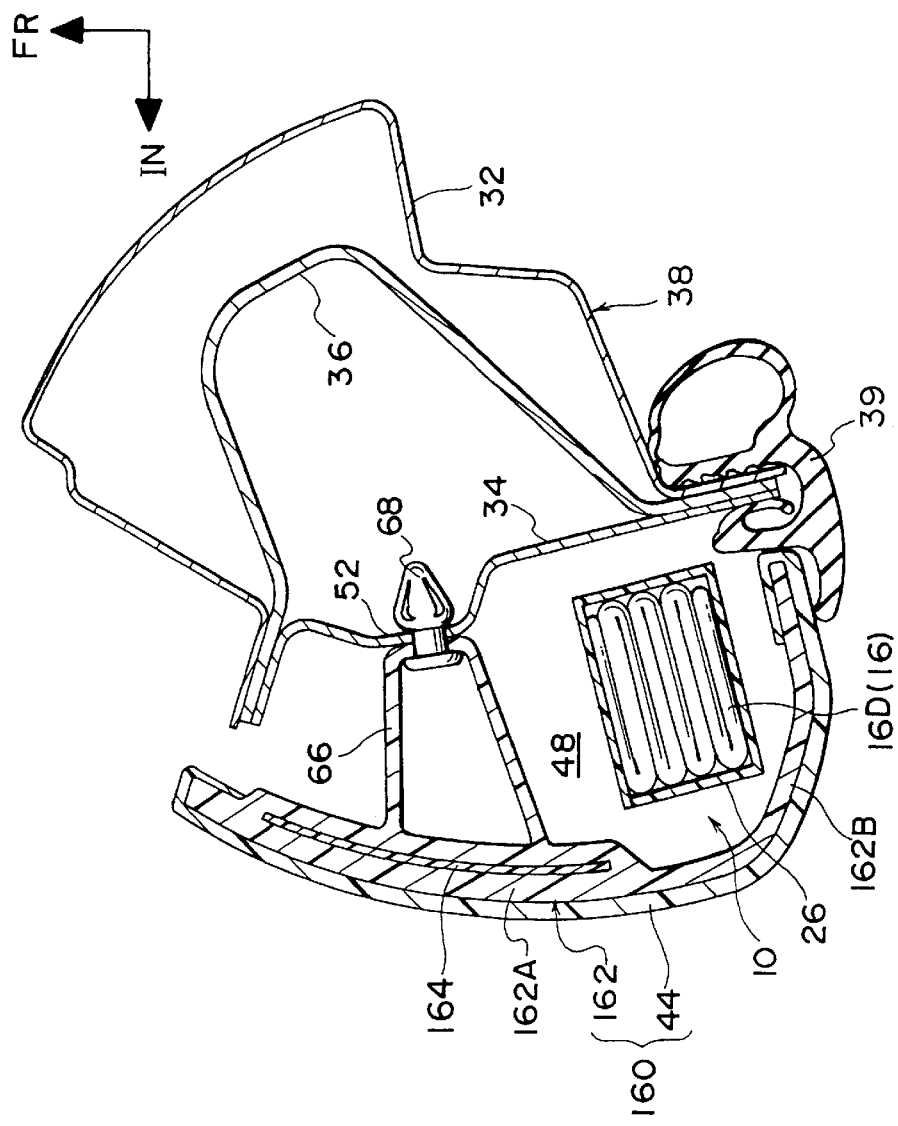
FIG. 15 is a cross sectional view along line 15—15 in FIG. 14 and shows in an enlarged manner a main portion (in which a strap is inserted in a longitudinal direction of a pillar garnish so as to be fixed to a front pillar) in accordance with an example of the eighth embodiment.
Figure 16:
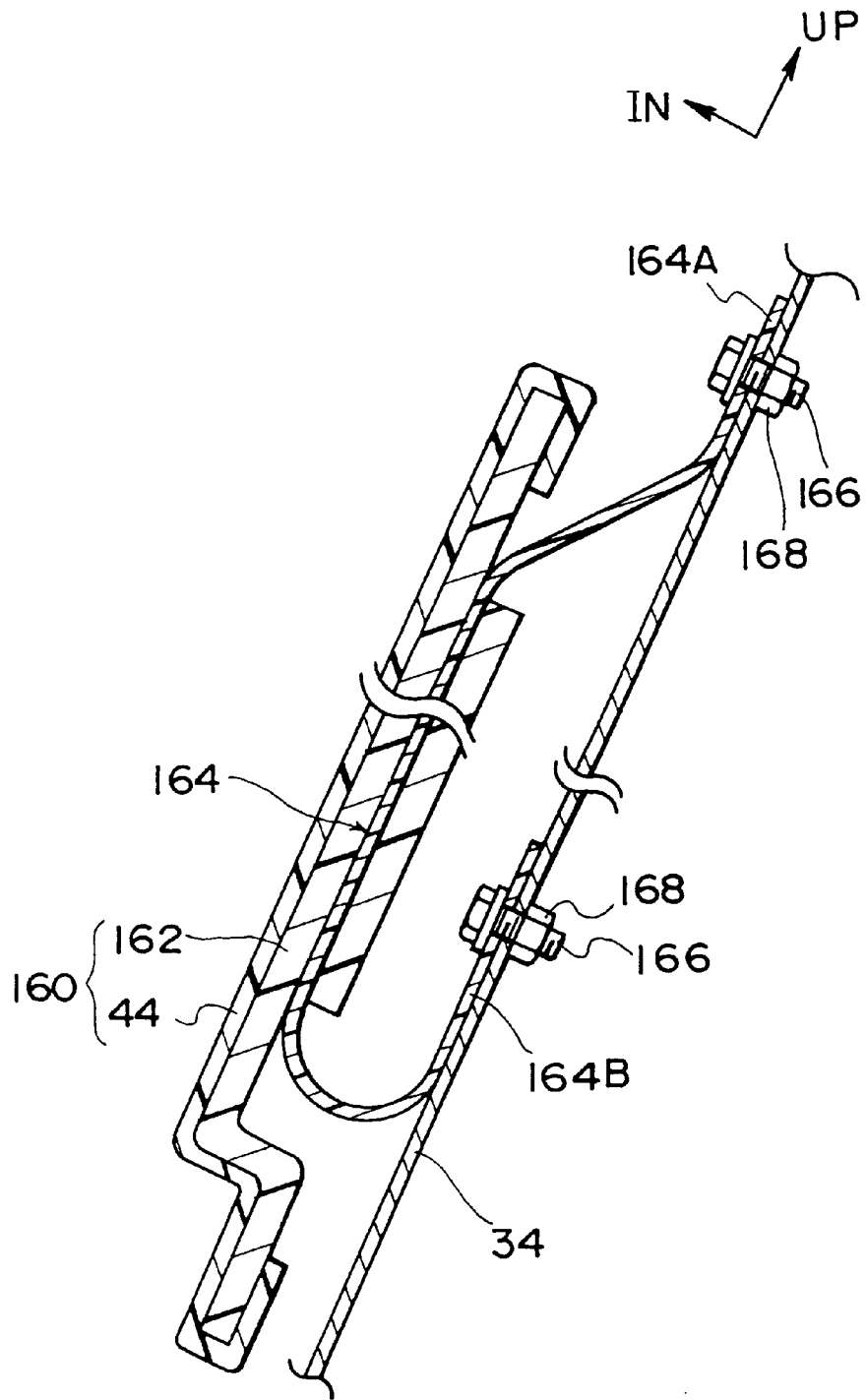
FIG. 16 is a cross sectional view along line 16—16 in FIG. 14 and shows in an enlarged manner a main portion in accordance with an example of the eighth embodiment.

In accordance with the embodiment shown in FIGS. 14 to 16, there is a feature in that a band-like strap 164 is inserted into a base member 162 of a pillar garnish 160 by insert molding. As shown in FIG. 14, the strap 164 is inserted along a longitudinal direction of the pillar garnish 160. Further, as shown in FIG. 15 which is a horizontal cross sectional view of the pillar garnish 160, the strap 164 is inserted only within a base portion 162A of the base member 162. The mounting seat 66 mentioned above is integrally formed on the back surface of the base portion 162A, and the base member 162 is fixed to the pillar inner panel 34 through the mounting seat 66 by means of the clip 68. Further, as shown in FIG. 16 which is a vertical cross sectional view of the pillar garnish 160, an upper end portion 164A of the strap 164 is extended from an upper end portion of the base member 162 and is fixed to a portion close to the upper end portion of the pillar inner panel 34 by means of a bolt 166 and a nut 168. Further, a lower end portion 164B of the strap 164 is extended from a lower end portion of the base member 162 so as to be folded, and thereafter, is fixed to a portion close to the lower end portion of the pillar inner panel 34 by means of the bolt 166 and the nut 168. In this case, the strap 164 mentioned above may be made of a metal or made of a resin having a high rigidity.

In accordance with the structure described above, the band-like strap 164 is inserted into the base member 162 of the pillar garnish 160 by insert molding, and the upper end portion 164A and the lower end portion 164B of the strap 164 are fixed to the pillar inner panel 34 by means of the bolt 166 and the nut 168. Therefore, it is possible to increase the supporting strength against the pillar inner panel 34 of the pillar garnish 160. Accordingly, even when the clip 68 is out of place from the pillar inner panel 34 at a time when the bag front portion 16D is expanded so that the bag housing portion 162B of the base member 162 is unfolded, the pillar garnish 160 is securely supported to the pillar inner panel 34 by the strap 164. As a result, also in accordance with the present embodiment, it is possible to effectively prevent the pillar garnish 160 from scattering when the bag front portion 16D is expanded.

In this case, in accordance with the present embodiment, the structure is made such that the upper end portion 164A and the lower end portion 164B of the strap 164 are fixed to the pillar inner panel 34. However, the structure is not limited to this, and it suffices if the upper end portion 164A and the lower end portion 164B are fixed to the body. For example, the lower end portion 164B of the strap 164 may be further extended so as to be fixed to a cowl, or the upper end portion 164A may be further extended so as to be fixed to the roof.

Figure 17:
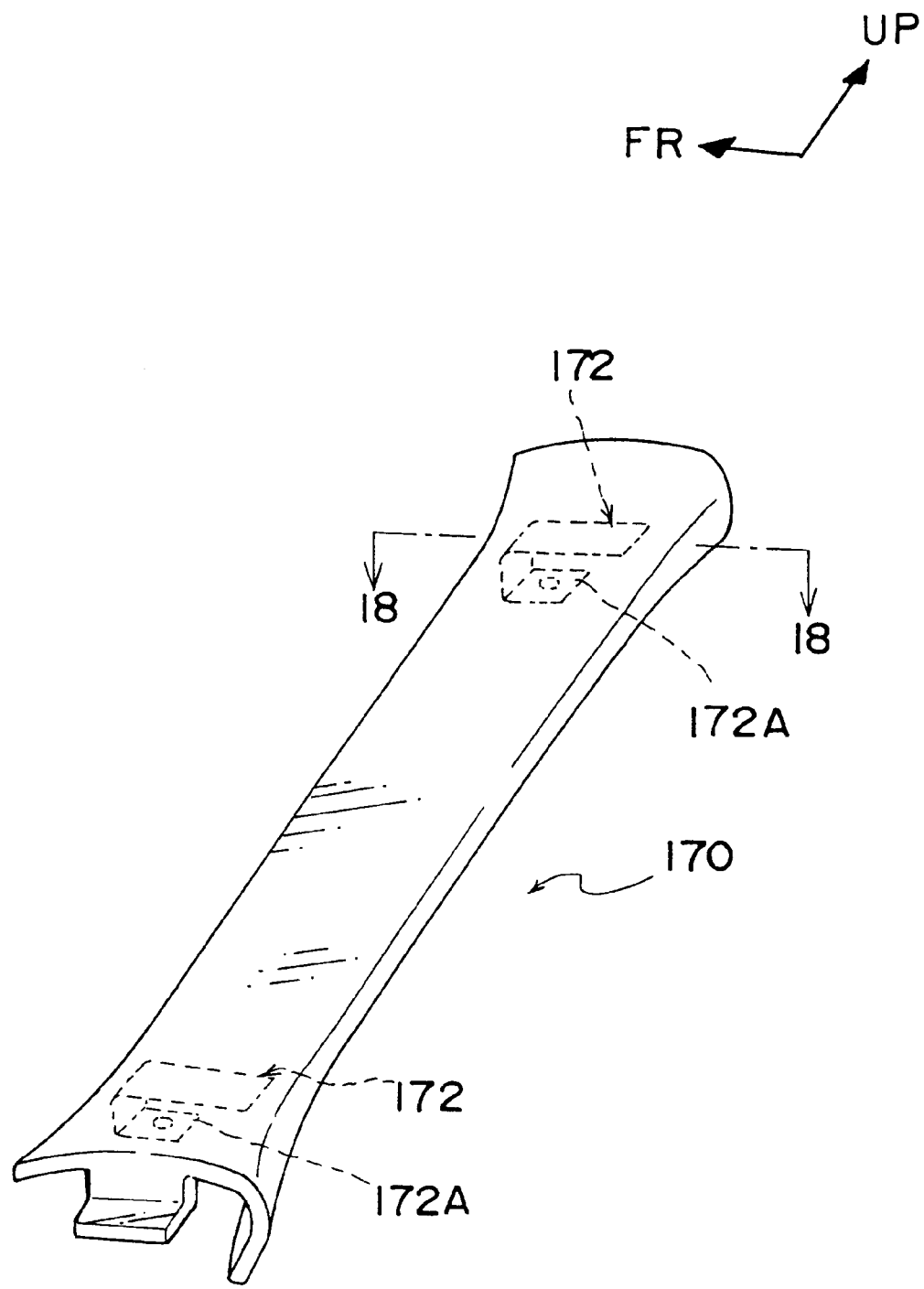
FIG. 17 is a perspective view which shows a pillar garnish in accordance with another example of the eighth embodiment.
Figure 18:
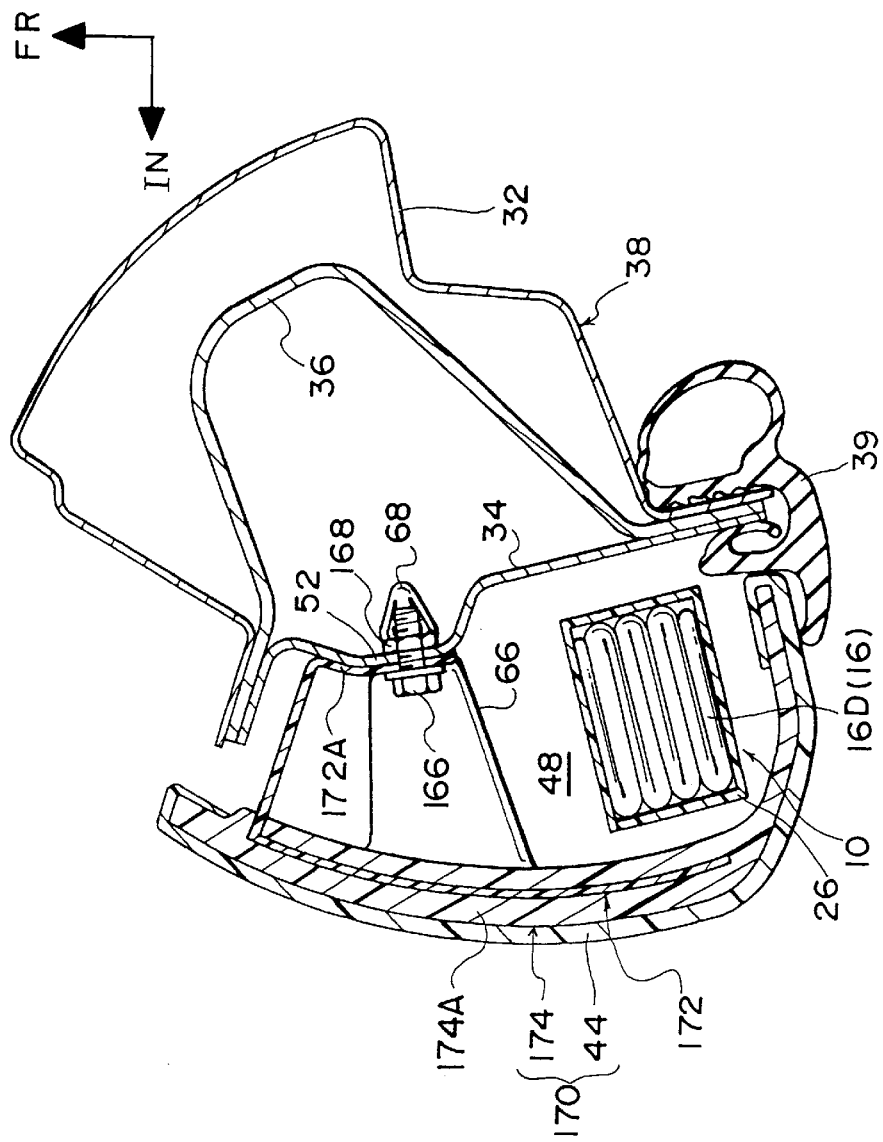
FIG. 18 is a cross sectional view along line 18—18 in FIG. 17 and shows in an enlarged manner a main portion (in which a strap is inserted into upper and lower end portions of a pillar garnish so as to be fixed to a front pillar) in accordance with another example of the eighth embodiment.

On the other hand, in the embodiment shown in FIGS. 17 and 18, there is the feature that a strap 172 is disposed in each of an upper portion and a lower portion of a pillar garnish 170. The strap 172 is embedded only in a base portion 174A of a base member 174, and is embedded such that the widthwise direction of the garnish is the longitudinal direction of the strap 172. Further, an end portion 172A extending from the base member 174 of the strap 172 is fixed to the convex portion 52 of the pillar inner panel 34 by means of the bolt 166 and the nut 168. Also in accordance with this structure, the same operation and effects as those of the previously-described structure can be obtained.

[Ninth Embodiment]

A ninth embodiment will be described below with reference to FIGS. 19 to 21. The same reference numerals are given to the same elements as those in the above-described embodiments, and description thereof will be omitted.

Figure 19:
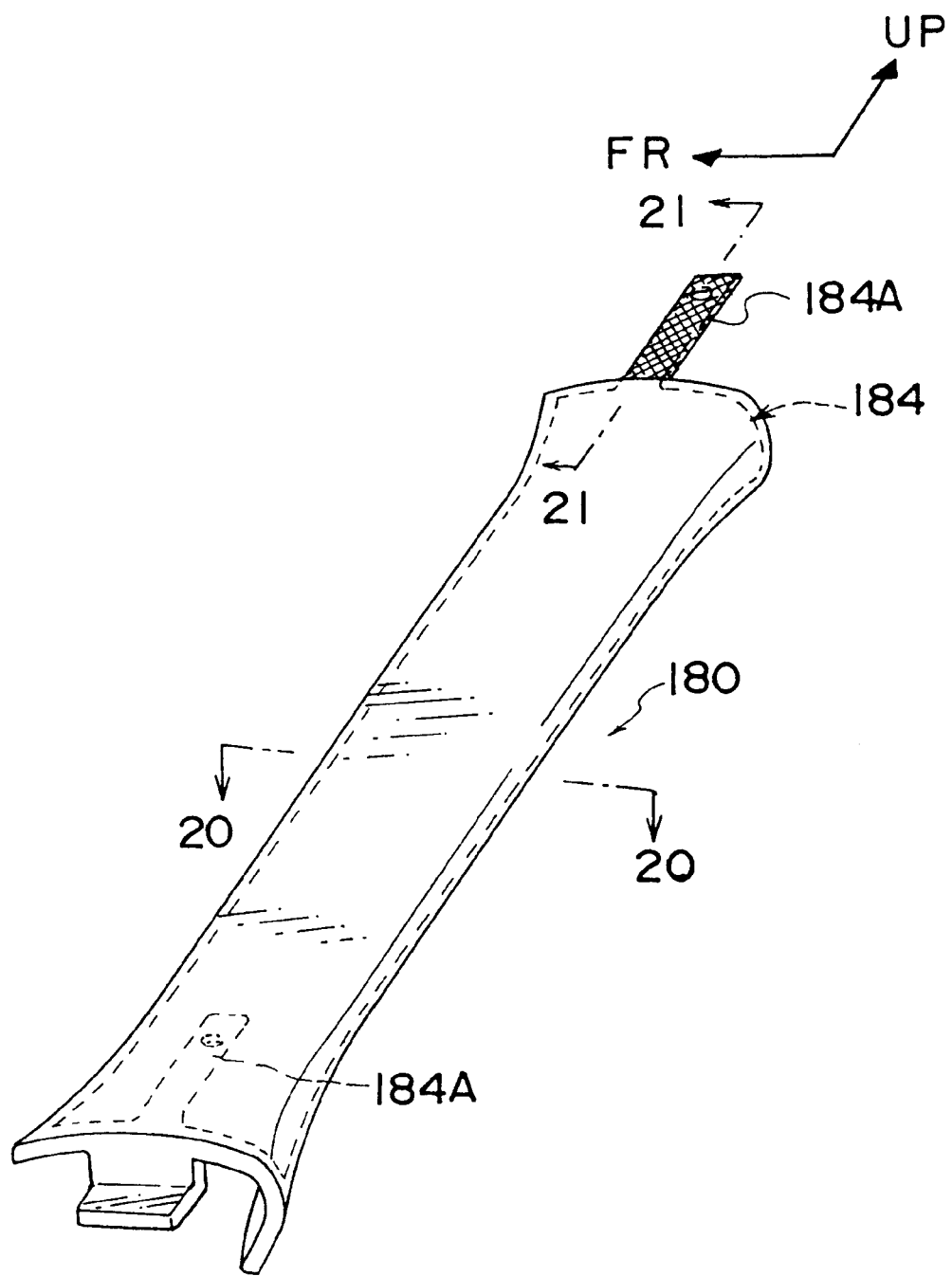
FIG. 19 is a perspective view which shows a pillar garnish in accordance with a ninth embodiment.
Figure 20:
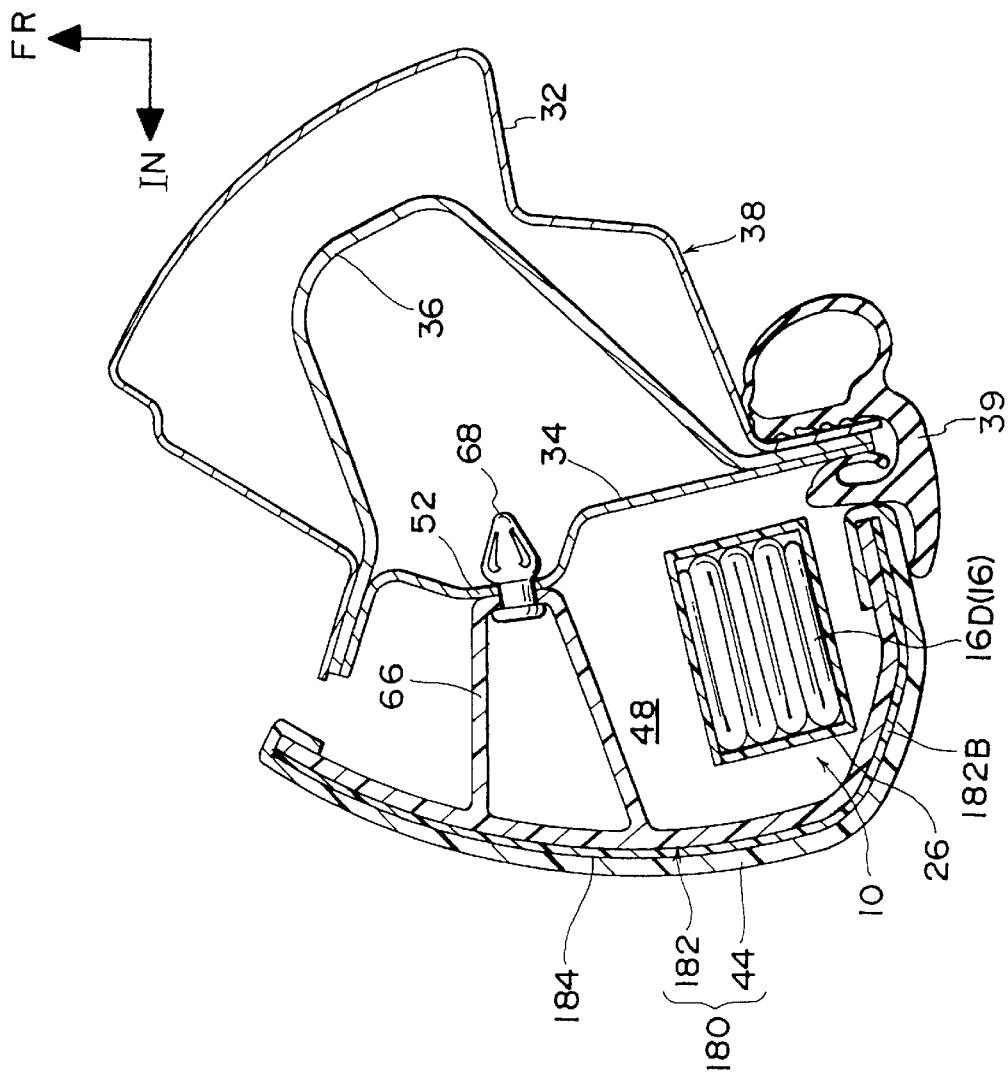
FIG. 20 is a cross sectional view along line 20—20 in FIG. 19 and shows in an enlarged manner a main portion (in which a net is adhered to a base member of a pillar garnish and a portion thereof is fixed to a front pillar) in accordance with the ninth embodiment.
Figure 21:
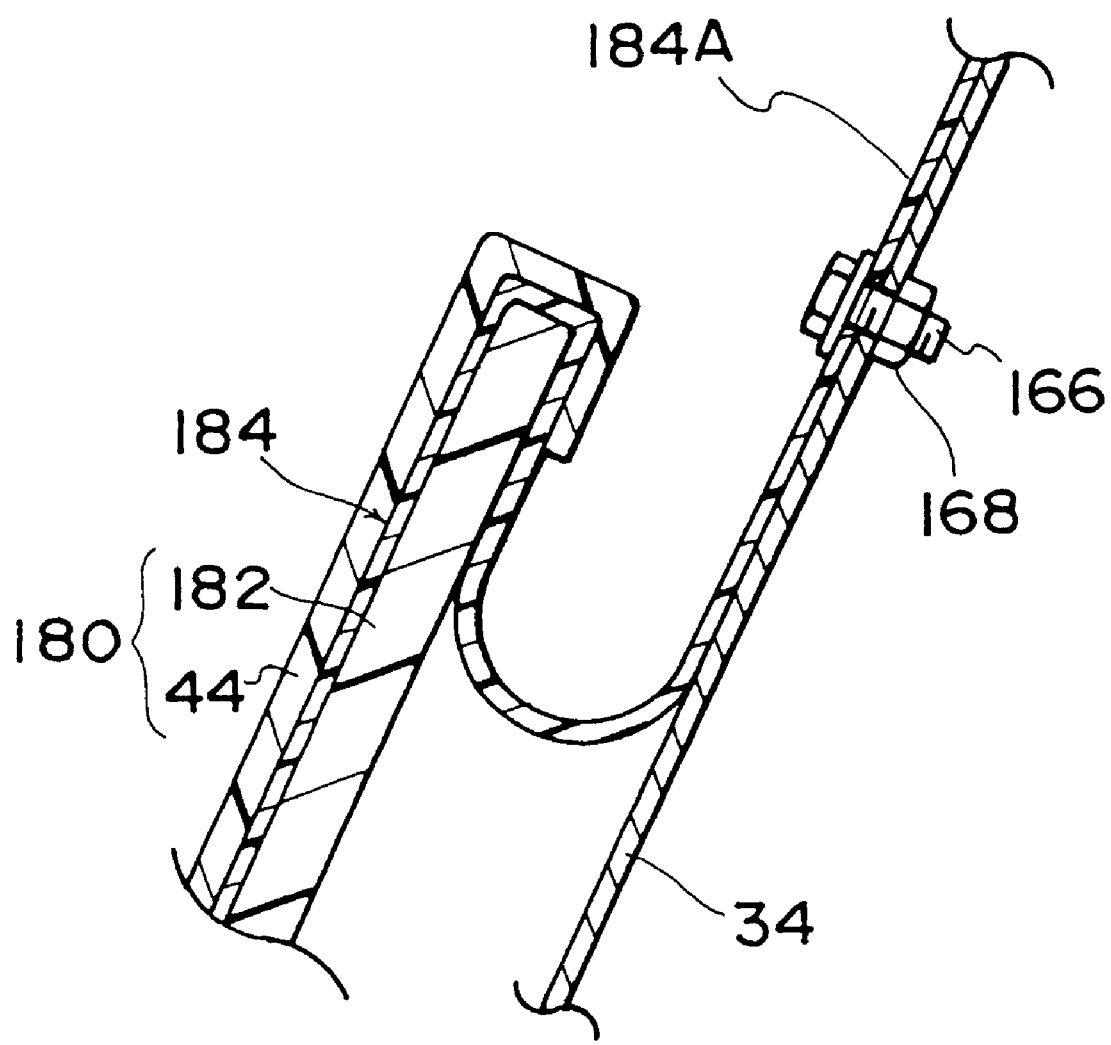
FIG. 21 is a cross sectional view along line 21—21 in FIG. 19 and shows in an enlarged manner a main portion in accordance with the ninth embodiment.

In accordance with the embodiment shown in FIGS. 19 to 21, there is the feature that a net 184 is bonded to a surface of a base member 182 of a pillar garnish 180. As shown in FIGS. 19 and 20, the net 184 which is made of a metal or a rigid resin is bonded onto the surface of the base member 182 of the pillar garnish 180 along a surface direction thereof by means of an adhesive (not shown). With the net 184 bonded onto the surface of the base member 182, the outer skin 44 is coated over the base member 182 and the net 184. Further, a band-like fixing piece 184A is extended from each of the upper end portion and the lower end portion of the net 184. These fixing pieces 184A are fixed to the upper end portion and the lower end portion of the pillar inner panel 34 by means of the bolts 166 and the nuts 168, whereby the net 184 is mounted to the pillar inner panel 34 (refer to FIG. 21).

In accordance with the structure described above, the net 184 is bonded onto the surface of the base member 182 of the pillar garnish 180, and further, the fixing piece 184A of the net 184 is fixed to the pillar inner panel 34 by means of the bolt 166 and the nut 168. Therefore, it is possible to increase the supporting strength against the pillar inner panel 34 of the pillar garnish 180 in the same manner as in the eighth embodiment described above. Accordingly, even when the clip 68 is out of place from the pillar inner panel 34 at a time when the bag front portion 16D is expanded so that the bag housing portion 182B of the base member 182 is unfolded, the pillar garnish 180 is securely supported to the pillar inner panel 34 by the net 184. As a result, also in accordance with the present embodiment, it is possible to effectively prevent the pillar garnish 180 from scattering when the bag front portion 16D is expanded.

Further, in accordance with the present embodiment, since the net 184 is bonded onto the surface of the base member 182 so as to be fixed to the pillar inner panel 34, most of the expanding pressure at a time when the bag front portion 16D is expanded is transmitted to the pillar inner panel 34 through the net 184. Accordingly, it is possible to manufacture the base member 182 of the pillar garnish 180 by using an easily breaking material (a material conventionally used for the garnish such as PP, ABS or the like), and the degrees of freedom for selecting the material can be increased.

In accordance with the present embodiment, the fixing piece 184A of the net 184 is fixed to the pillar inner panel 34. However, the structure is not limited to the same, and it suffices if the fixing piece 184A is fixed to the body.

Further, in accordance with the present embodiment, the structure is such that the net 184 is bonded onto the surface of the base member 182 by means of an adhesive. However, the structure is not limited to the same, and a structure of inserting by means of insert molding may be employed.

[Tenth Embodiment]

A tenth embodiment will be described below with reference to FIGS. 22 and 23. The same reference numerals are given to the same elements as those in the above-described embodiments, and description thereof will be omitted.

Figure 22:
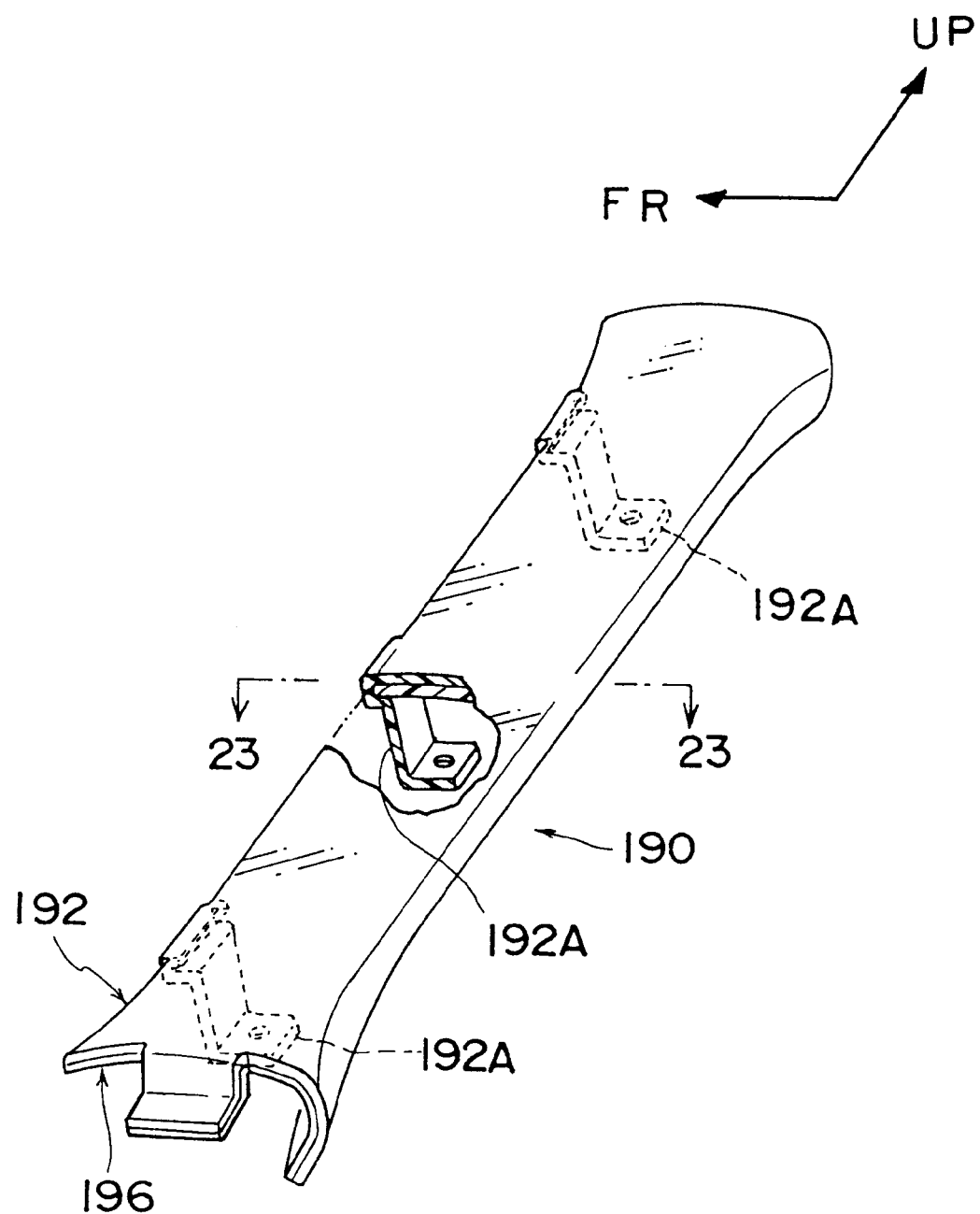
FIG. 22 is a perspective view which shows a pillar garnish in accordance with a tenth embodiment.
Figure 23:
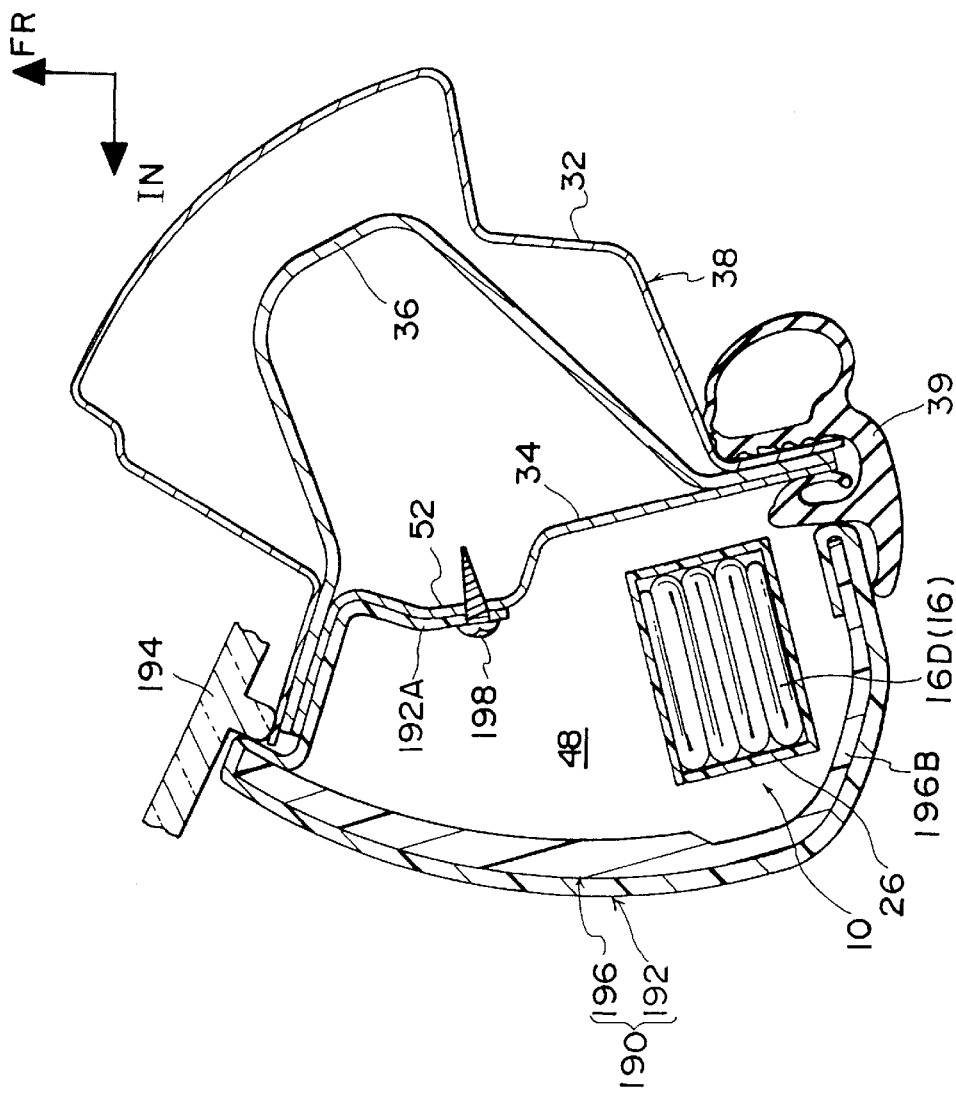
FIG. 23 is a cross sectional view along line 23—23 in FIG. 22 and shows in an enlarged manner a main portion (in which an outer skin extending portion is provided on an outer skin of a pillar garnish so as to be fixed to a front pillar) in accordance with the tenth embodiment.

As shown in FIGS. 22 and 23, in accordance with the present embodiment, a plurality of outer skin extending portions 192A, which are extended to a windshield glass 194 end from a front end edge of an outer skin 192, are integrally formed on the outer skin 192 of a pillar garnish 190. Each of the outer skin extending portions 192A is formed in a band shape, and is extended to the convex portion 52 along the surface of the pillar inner panel 34 of the front pillar 38 after being folded over a back surface end of a base member 196. Then, the outer skin extending portion 192A is fixed to the convex portion 52 by means of a screw 198, whereby the outer skin 192 is supported to the pillar inner panel 34. Although not illustrated in this drawing, the mounting seat is also formed on the base member 196 in the present embodiment, and is fixed to the pillar inner panel 34 by means of the clip.

In accordance with the structure described above, even when the clip is out of place from the pillar inner panel 34 at a time when the bag front portion 16D is expanded so that the bag housing portion 196B of the base member 196 is unfolded, since the outer skin extending portions 192A are fixed to the pillar inner panel 34, the pillar garnish 190 is only unfolded toward the windshield glass 194 with the outer skin extending portions 192A serving as the center of rotation. As a result, also in accordance with the present embodiment, it is possible to effectively prevent the pillar garnish 190 from scattering when the bag front portion 16D is expanded.

Further, in accordance with the present embodiment, since the structure is made such that a plurality of outer skin extending portions 192A are formed on the outer skin 192 so as to be fixed to the pillar inner panel 34, the outer skin extending portions 192A can be firmly fixed to the pillar inner panel 34. Accordingly, without increasing the number of special parts, it is possible to reliably prevent the pillar garnish 190 from being out of place from the pillar inner panel 34.

In accordance with the present embodiment, the pillar garnish 190 is formed by the base member 196 and the outer skin 192, and the structure is such that the outer skin extending portions 192A provided at the outer skin 192 serve as the hinge at a time of unfolding. However, present invention is not limited to the same, and may be structured such that the pillar garnish is formed only by the base member, and the portions extending toward the windshield glass 194 are provided at the pillar garnish, so that the extending portions are fixed to the pillar inner panel 34 and an integral hinge is provided near the root portions of the extending portions.

[Eleventh Embodiment]

A eleventh embodiment will be described below with reference to FIGS. 24 through 28. The same reference numerals are given to the same elements as those in the above-described embodiments, and description thereof will be omitted.

A structure of mounting a pillar garnish 240 to a pillar inner panel 34 which is a main portion of the present embodiment will be described below.

Figure 24:
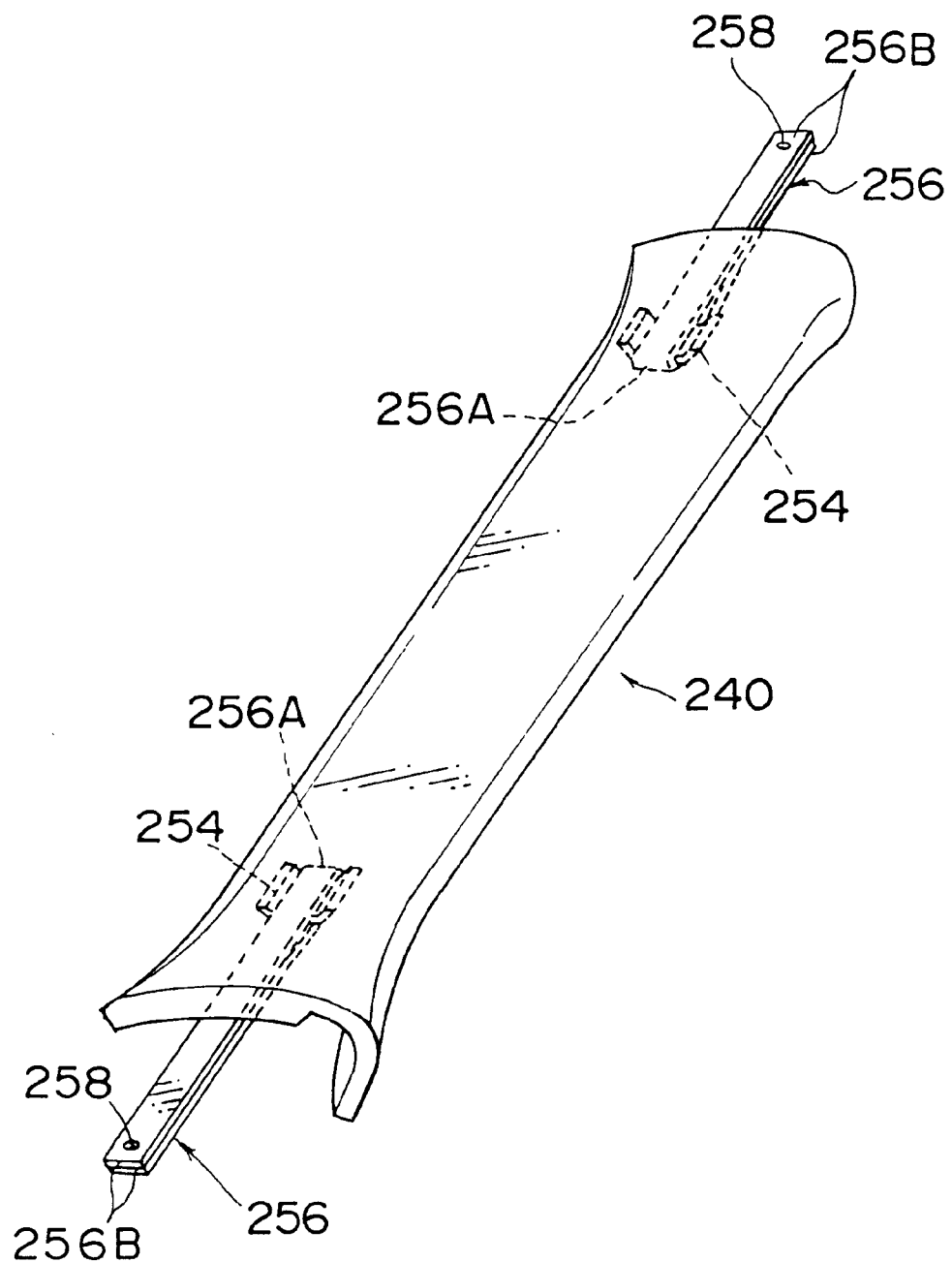
FIG. 24 is a perspective view as seen from a front surface end which shows a pillar garnish with a pair of straps in accordance with an eleventh embodiment.

FIG. 24 is an overall perspective view of the pillar garnish 240 as seen from a surface side. FIG. 25 is a rear view of the pillar garnish 240. FIG. 24 is a perspective view, which is enlarged and viewed from the rear surface side, of only vicinities of upper and lower end portions of the pillar garnish 240, with the intermediate portion thereof not illustrated.

As shown in these drawings, a bridge 254 is integrally formed with a base member 242 at a middle portion in a widthwise direction close to the upper end portion and the lower end portion at the back surface end of the pillar garnish 240. More specifically, as shown in FIG. 26, the bridge 254 is formed in a substantially C-shaped cross section comprising a pair of leg portions 254A and a top portion 254B. A band-like strap 256 is wound around each of the top portions 254B of the bridges 254 (hereinafter, this portion is referred as "a wound portion 256A"). Further, a bolt insertion hole 258 is formed in each of both end portions 256B of the strap 256, and both the end portions 256B are overlapped such that both of the bolt insertion holes 258 are coaxially disposed.

As shown in FIGS. 25 and 27, a fixing bolt 260 is inserted into the bolt insertion holes 258 from the inner side of the vehicle cabin, and both the end portions 256B of the strap 256 are fixed to the pillar inner panel 34 by the fixing bolt 260 being screwed with a weld nut 262 previously welded to the back surface of the pillar inner panel 34.

As a result, the pillar garnish 240 and the pillar inner panel 34 are connected through the straps 256 disposed at the both end portions in the longitudinal direction of the pillar garnish 240 (that is, at the upper end portion and the lower end portion). The longitudinal dimension of the overlapped strap 256 is set to be a predetermined amount longer than a distance between the bridge 254 of the pillar garnish 240 in an assembled state and a region for fixing to the pillar inner panel 34 (in such a manner as to allow a predetermined amount of slack) (refer to FIG. 27).

In this case, the resin clip 68 (refer to FIG. 28) is integrally formed on the back surface end of the above-described pillar garnish 240 along the longitudinal direction thereof at a suitable interval. The pillar garnish 240 is temporarily fixed to the pillar inner panel 34 by these clips 68 being elastically engaged with the pillar inner panel 34.

Next, operation and effects of the present embodiment will be described below.

Here, as described above, when the bag 16 is expanded, a relatively great bag expanding pressure is applied to the pillar garnish 240 toward the inner side of the vehicle cabin. Accordingly, the clip 68 temporarily fixing the pillar garnish 240 to the pillar inner panel 34 comes out of place from the pillar inner panel 34, and the pillar garnish 240 separates from the pillar inner panel 34 toward the inner side of the vehicle cabin.

However, in accordance with the present embodiment, the bridge 254 is formed at each of the widthwise direction the middle portions in the vicinity of the upper end portion and in the vicinity of the lower end portion at the back surface side of the pillar garnish 240, and the pillar garnish 240 and the pillar inner panel 34 are connected through the straps 256 wound around the bridges 254. Therefore, the pillar garnish 240 is securely supported to the pillar inner panel 34 by means of the pair of straps 256 even when the clip 68 temporarily fixing the pillar garnish 240 is out of place from the pillar inner panel 34. Accordingly, the pillar garnish 240 does not separate from the pillar inner panel 34 due to the expanding pressure of the bag 16. As a result, it is possible to prevent the pillar garnish 240 from falling out into the inner side of the vehicle cabin when the bag 16 is expanded.

Since the movement of the pillar garnish 240 separating from the pillar inner panel 34 is restricted at the time when the pair of straps 256 are extended, the pillar garnish 240 does not float up to the inner side of the vehicle cabin more than a necessary amount.

Further, in accordance with the present embodiment, since the pillar garnish 240 can move apart from the pillar inner panel 34 until the pair of straps 256 are extended, the bag expanding space can be enlarged.

Moreover, in accordance with the present embodiment, since the straps 256 are arranged at two portions, upper and lower portions, of the pillar garnish 240, the strap length can be shortened in comparison with the case of arranging a strap formed by one piece along the longitudinal direction of the pillar garnish 240. Accordingly, the cost can be reduced.

In this case, in accordance with the present embodiment, the structure is such that the bridges 254 are integrally formed on the back surface of the base member 42 of the pillar garnish 240. However, the structure is not limited to this, and the bridges may be attached to the back surface of the base member 42 at a later step. This point applies as well to the embodiments described below.

[Twelfth Embodiment]

Figure 29:
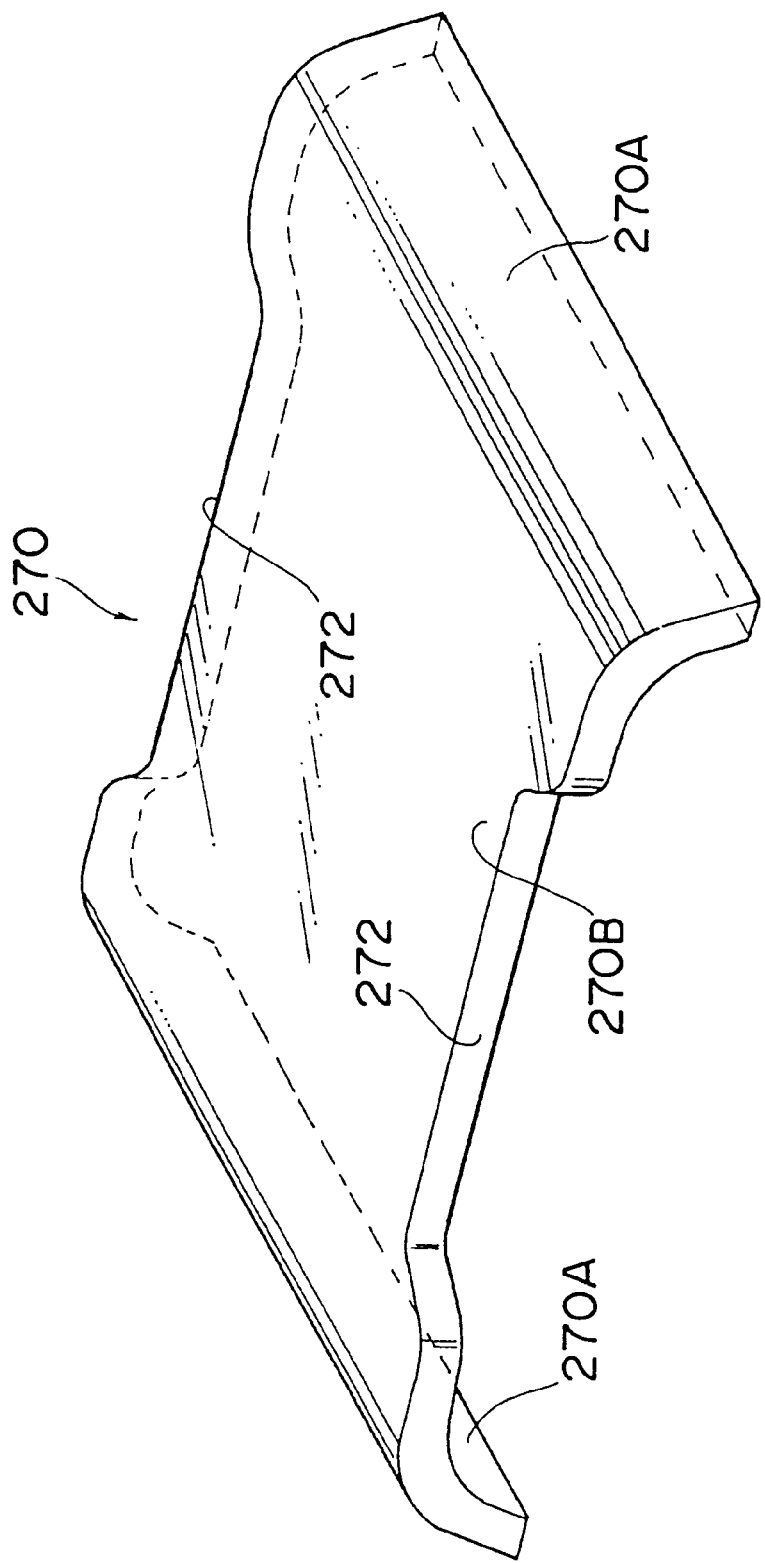
FIG. 29 is an enlarged perspective view which shows in an enlarged manner a main portion of a bridge (which forms a recess portion for centering the strap) in accordance with a twelfth embodiment.

A twelfth embodiment will be described below with reference to FIG. 29. The same reference numerals are given to the same elements as those in the above-described embodiments, and description thereof will be omitted.

As shown in the drawing, also in accordance with the present embodiment, a bridge 270 is formed by a pair of leg portions 270A and a top portion 270B. In accordance with the present embodiment, concave portions 272 recessed in a longitudinal direction of the bridge 270 (an inserting direction of the strap 256 in the above-mentioned embodiment) and in directions approaching to each other are respectively formed in center portions of both longitudinal direction end portions of the top portion 270B of the bridge 270. A widthwise size of these concave portions 272 is set to be a degree slightly larger than the widthwise size of the strap 256.

In accordance with the structure described above, when the clip 68 is out of place from the pillar inner panel 34 so that the pillar garnish 240 separates from the pillar inner panel 34 at a time when the bag 16 is expanded, the strap 256 is extended. In accordance with this, the bag expanding pressure acting on the pillar garnish 240 is directly applied to the longitudinal direction side end portion of the bridge 270 through the wound portion 256A of the strap 256. In this case, if the pillar garnish 240 separated from the pillar inner panel 34 were to twist, there would be the possibility that the wound portion 256A of the strap 256 would slide along the end edges of the longitudinal direction side end portions of the bridge 270 so as to be biased to the corner portions thereof.

However, in accordance with the present embodiment, since the concave portions 272 are formed in the center portion of the both longitudinal direction end portions of the top portion 270B of the bridge 270, the wound portion 256A of the strap 256 is biased (centered) within the concave portions 272. Accordingly, in accordance with the present embodiment, the wound portion 256A of the strap 256 is always held at the concave portions 272 at the center portions of both longitudinal direction end portions of the top portion 270B of the bridge 270. As a result, it is possible to prevent the stress from concentrating at the corner portions of the longitudinal direction side end portions of the top portion 270B of the bridge 270, and accordingly, to prevent the bridge 270 from breaking.

[Thirteenth Embodiment]

Figure 30:
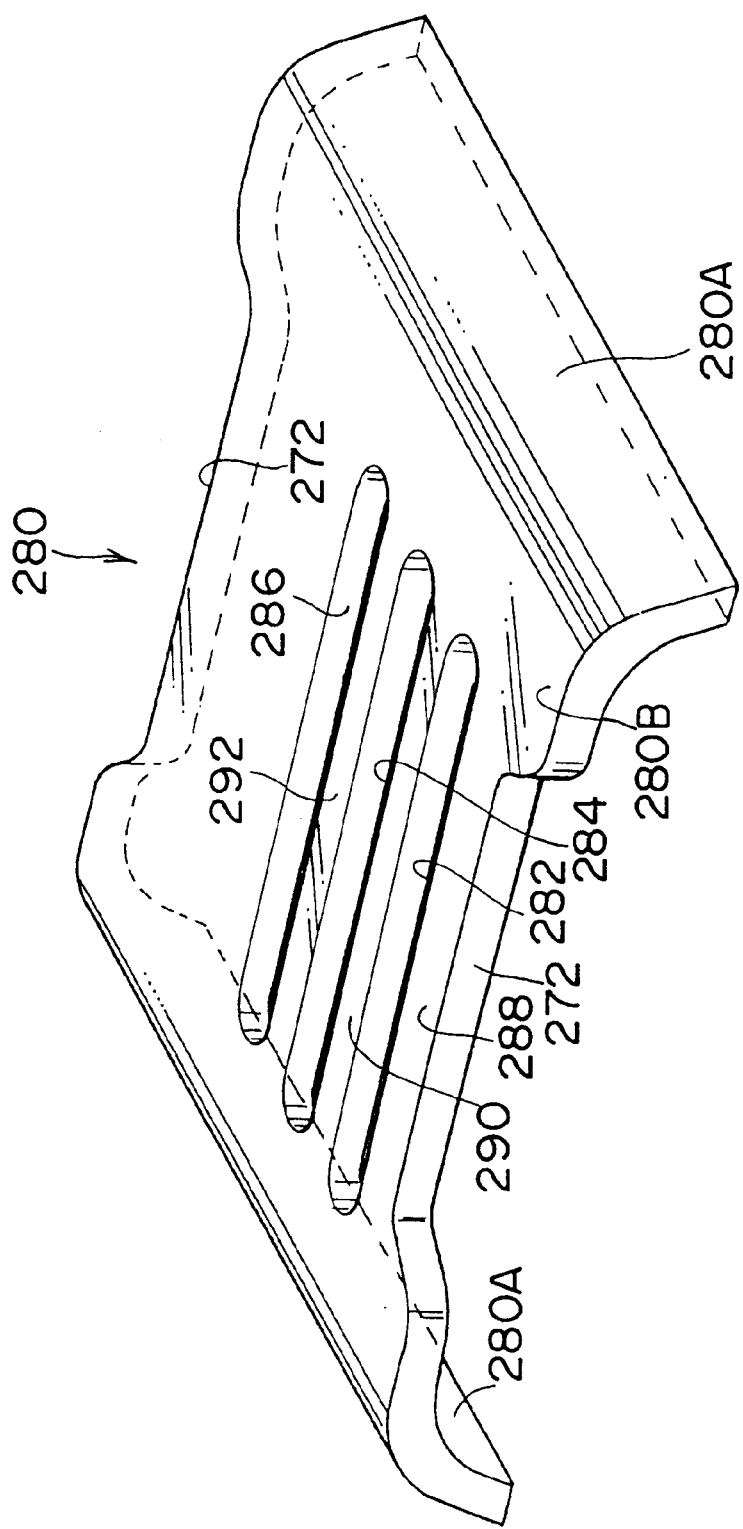
FIG. 30 is an enlarged perspective view which shows in an enlarged manner a main portion of a bridge (which forms a plurality of oblong holes for absorbing energy in addition to a recess portion for centering the strap) in accordance with a thirteenth embodiment.
Figure 31:
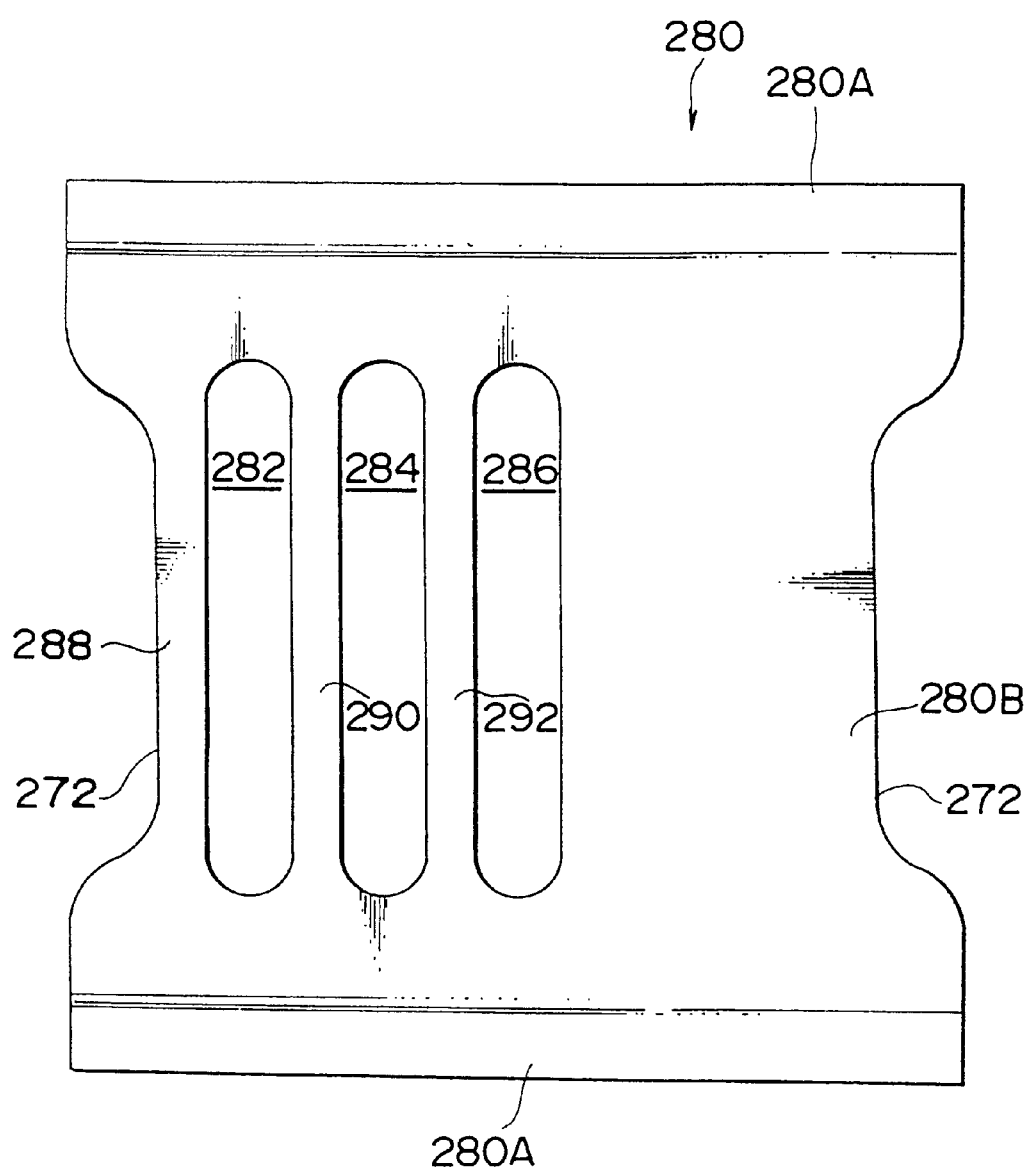
FIG. 31 is a plan view of a bridge shown in FIG. 30.

A thirteenth embodiment will be described below with reference to FIGS. 30 and 31. The same reference numerals are given to the same elements as those in the twelfth embodiment described above, and description thereof will be omitted.

As shown in these drawings, in accordance with the present embodiment, there is the feature that a plurality of oblong holes 282, 284, 286 are formed in the top portion 280B of the bridge 280, which has the pair of leg portions 280A and the top portion 280B and which was described in the above twelfth embodiment. The oblong holes 282, 284 and 286 are formed in such a manner as to be adjacent to the concave portions 272 and such that the widthwise direction of the top portion 280B is their longitudinal direction. Accordingly, the portion close to the concave portion 272 at the top portion 280B of the bridge 280 is weakened. Here, in this case, the wound portion 256A of the strap 256 is positioned in the concave portion 272 close to the portion in which the oblong holes 282 to 286 are formed.

In accordance with the structure described above, when the bag 16 is expanded due to the operation explained in the above-described twelfth embodiment so that the pillar garnish 240 separates from the pillar inner panel 34, the wound portion 256A of the strap 256 is centered at the concave portions 272 of the bridge 280 and is held thereat.

Here, in the case that the load directly applied to the concave portion 272 of the bridge 280 from the wound portion 256A of the strap 256 is relatively great, a peripheral portion 288 between the concave portion 272 and the oblong hole 282 adjacent thereto is plastically deformed (broken) at first, whereby energy can be absorbed. Further, in the case that the operating load is great, a peripheral portion 290 between the adjacent holes 282 and 284 is next plastically deformed, whereby energy is further absorbed. In the case that the operating load is even greater, a peripheral portion 292 between the adjacent oblong holes 284 and 286 is next plastically deformed, whereby energy is further absorbed.

As described above, in accordance with the present embodiment, the peripheral portions 288 to 292 are plastically deformed in a successive manner in accordance with the magnitude of the operating load applied to the concave portion 272 of the bridge 280, so that the energy is absorbed. Therefore, it is possible to prevent the whole of the bridge 280 from breaking.

In this case, in accordance with the present embodiment, the structure is such that a plurality of oblong holes 282, 284 and 286 are formed in the top portion 280B of the bridge 280. However, the structure is not limited to this, and it suffices if an opening is provided. Accordingly, the structure may be such that small holes are arranged at positions at which the oblong holes 282, 284 and 286 are formed. Further, the number of the formed opening is not always a plural number, and may be a single number.

[Fourteenth Embodiment]

A fourteenth embodiment will be described below with reference to FIGS. 32 to 34. The same reference numerals are given to the same elements as those in the above-described embodiments, and description thereof will be omitted.

Figure 32:
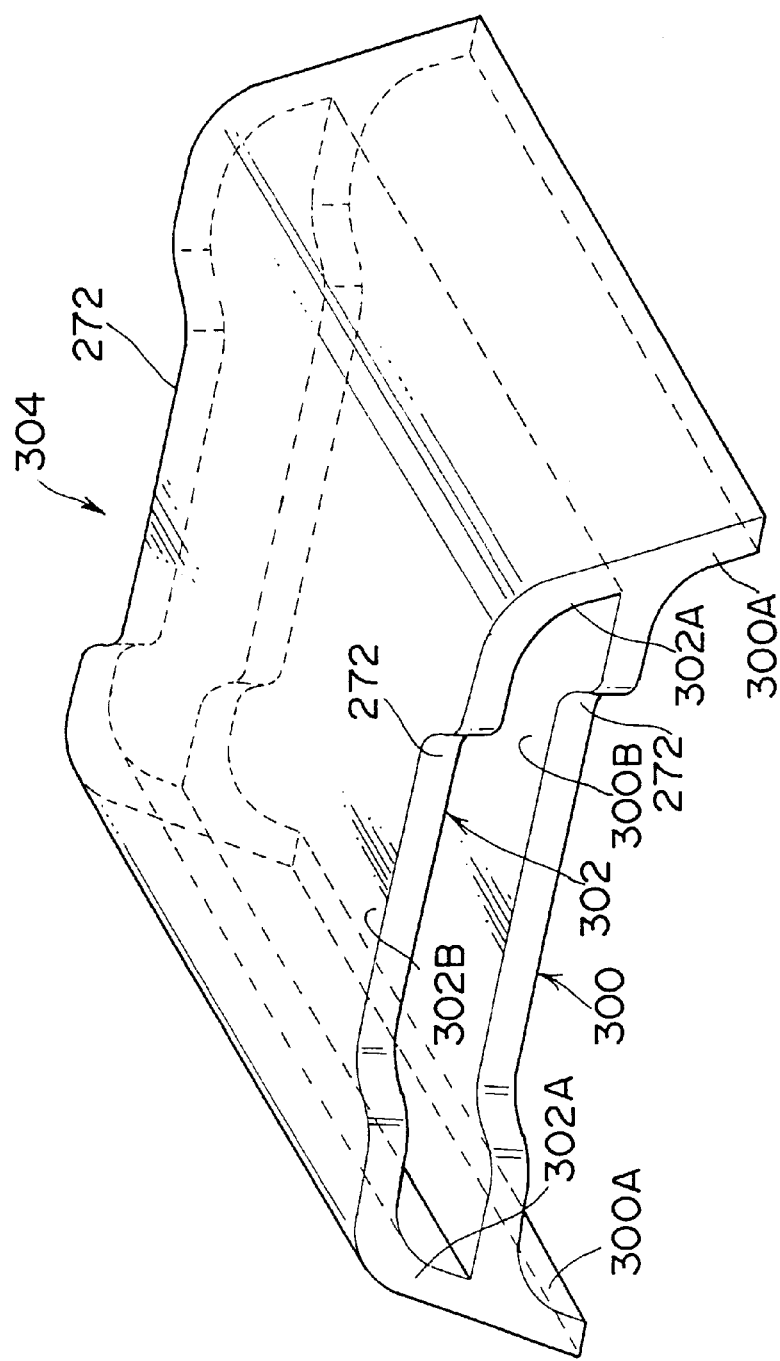
FIG. 32 is an enlarged perspective view which shows in an enlarged manner a main portion of a bridge (a bridge layered at two stages) in accordance with a fourteenth embodiment.

As shown in FIG. 32, in accordance with the present embodiment, there is the feature that a bridge 304 is employed. The bridge 304 is formed by overlapping by integral molding an upper stage bridge portion 302, which is formed by a pair of leg portions 302A and a top portion 302B, on a lower stage bridge portion 300, which is formed by a pair of leg portions 300A and a top portion 300B. The concave portion 272 mentioned above is formed in each of the center portions of both longitudinal direction end portions of the top portion 300B of the lower stage bridge portion 300 and the top portion 302B of the upper stage bridge portion 302.

Figure 33:
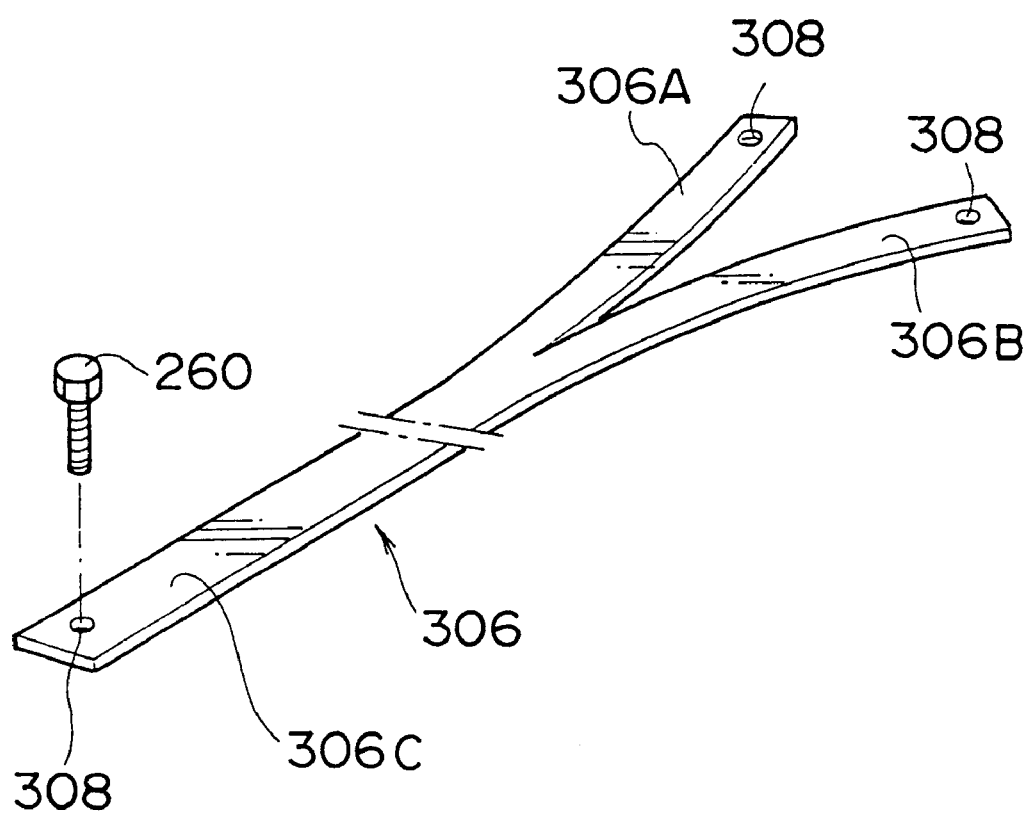
FIG. 33 is an enlarged perspective view which shows a main portion of a strap used for the bridge shown in FIG. 32.
Figure 34:
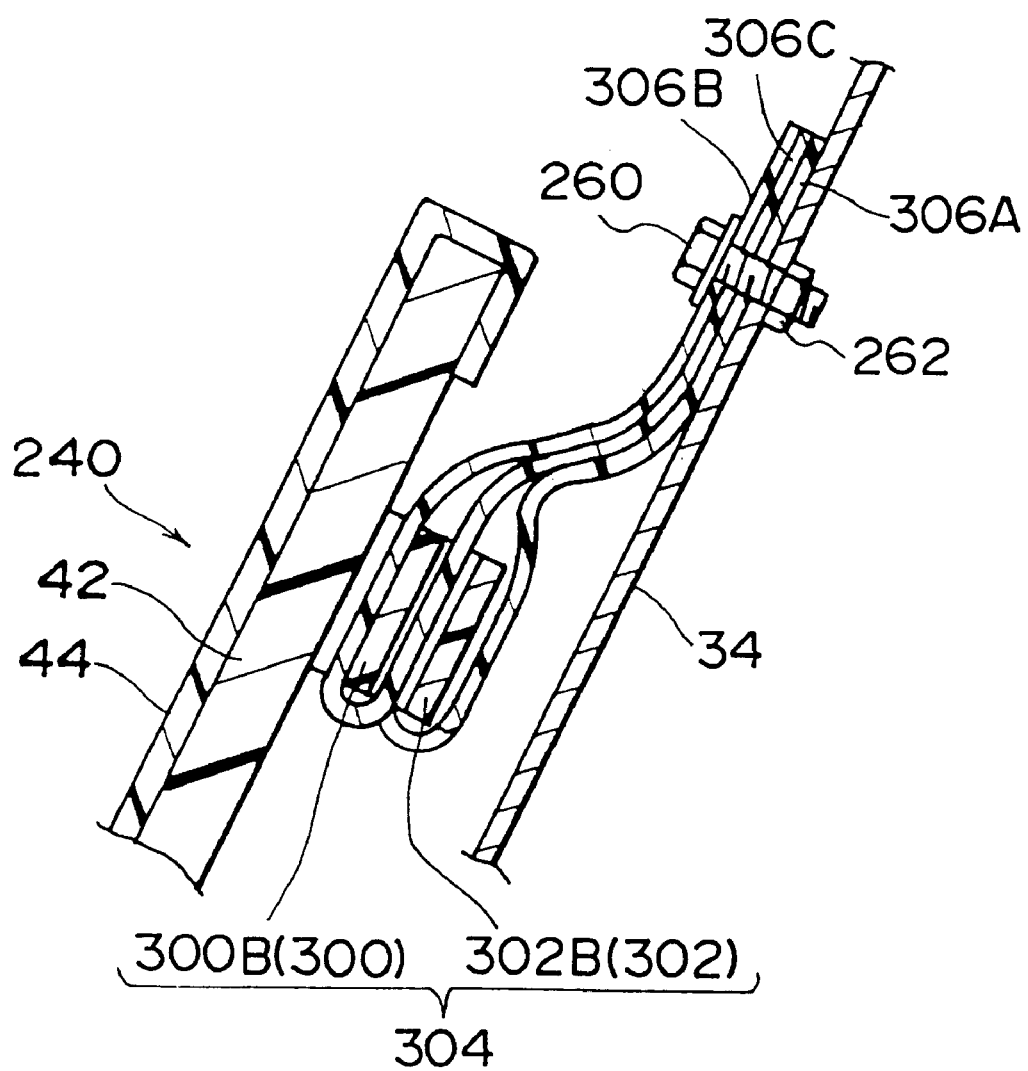
FIG. 34 is an enlarged cross sectional view corresponding to FIG. 27 and shows a main portion in a state in which the strap shown in FIG. 32 is wound around the bridge shown in FIG. 32 so as to be fixed to a pillar inner panel.

In correspondence with this, as shown in FIG. 33, the wound portion of a strap 306 is separated into a first wound portion 306A and a second wound portion 306B. A bolt insertion hole 308 is formed in a base end portion 306C of the strap 306 and in each of front end portions of the first wound portion 306A and the second wound portion 306B.

In accordance with the structure described above, as shown in FIG. 34, after inserting both of first wound portion 306A and the second wound portion 306B between the top portion 300B of the lower stage bridge portion 300 and the top portion 302B of the upper stage bridge portion 302, the first wound portion 306A is folded and wound outward to the outer side (to the pillar inner panel 34 side) of the top portion 302B of the upper stage bridge portion 302, and the second wound portion 306B is folded and wound inward to the inner side (to the base member 42 side) of the top portion 300B of the lower stage bridge portion 300. Then, with the base end portion 306C of the strap 306 being held between the front end portion of the first wound portion 306A and the front end portion of the second wound portion 306B, each of the bolt insertion holes 308 is mutually overlapped with each other, and a fixing bolt 360 is fastened to a weld nut 362 on the back surface of the pillar inner panel 34.

When the structure is formed in this manner, the load acting on the bridge 304 at a time when the bag 16 is expanded can be dispersed to the top portion 302B of the upper stage bridge portion 302 from the first wound portion 306A or to the top portion 300B of the lower stage bridge portion 300 from the second wound portion 306B, respectively. As a result, the bridge 304 is prevented from breaking.

Further, in accordance with the present embodiment, since the bridge 304 is layered in plural stages, it is advantageous in that it is strong against the load acting on the pillar garnish 240 in the direction toward the interior of the vehicle cabin.

Still further, also in accordance with the present embodiment, since the structure of the twelfth embodiment described above is employed, the first wound portion 306A and the second wound portion 306B of the strap 306 can be centered.

In accordance with the present embodiment, the bridge 304 layered at two stages is used. However, the structure is not limited to this, and it suffices that the bridge be layered in plural stages. In the case that the bridge portion is layered in three or more stages, a number of the wound portions of the strap can be increased in accordance with the number of stages.

[Fifteenth Embodiment]

Figure 35:
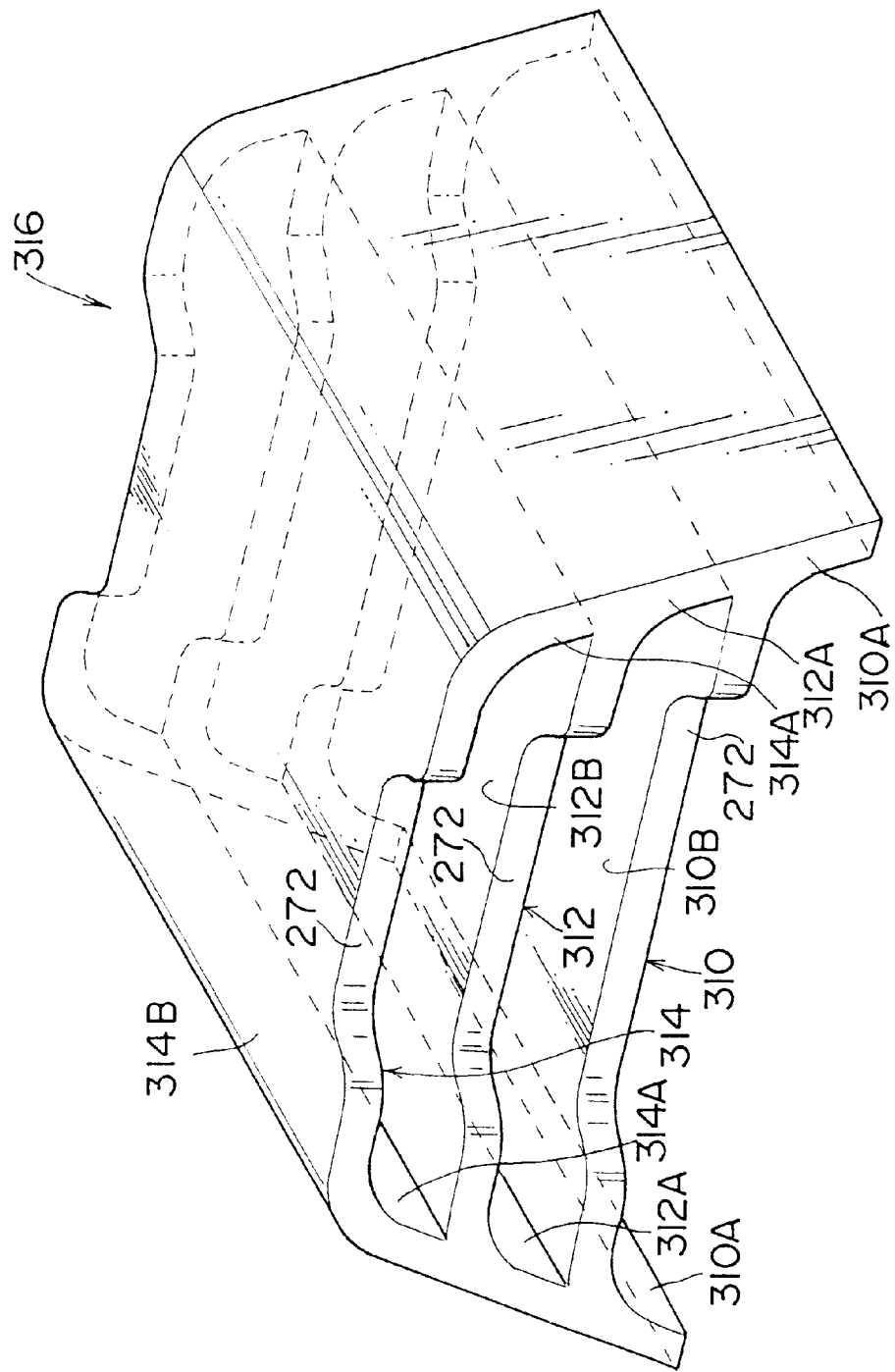
FIG. 35 is an enlarged perspective view which shows in an enlarged manner a main portion of a bridge (a bridge layered at three stages) in accordance with a fifteenth embodiment.

A fifteenth embodiment will be described below with reference to FIG. 35. The same reference numerals are given to the same elements as those in the above-described embodiments, and description thereof will be omitted.

In accordance with the present embodiment, there is the feature that a lower stage bridge portion 310 formed by a pair of leg portions 310A and a top portion 310B, a middle stage bridge portion 312 formed by a pair of leg portions 312A and a top portion 312B, and an upper stage bridge portion 314 formed by a pair of leg portions 314A and a top portion 314B are integrally formed so as to form a three-layered bridge 316.

Further, in accordance with the present embodiment, the three-layered bridge 316 is used. However, as the strap itself, the strap 306 having the first wound portion 306A and the second wound portion 306B shown in the fourteenth embodiment is employed. Accordingly, the concave portions 272 provided in the center portions of the both longitudinal direction end portions of the top portion 310B of the lower stage bridge portion 310 and the top portion 312B of the middle stage bridge portion 312 are necessary. However, the concave portions 272 provided in the center portion of the both longitudinal direction of the top portion 314B of the upper stage bridge portion 314 may be omitted.

In accordance with the structure described above, it is possible to use the top portion 314B of the upper stage bridge portion 314 in the bridge 316 as the clip seat for the resin clip 68 for temporarily fixing the pillar garnish 240 described in the above eleventh embodiment to the pillar inner panel 34. Accordingly, the structure is made simple in comparison with a case in which the mounting seat for the temporary fixing means for temporarily fixing the pillar garnish 240 to the pillar inner panel 34 is separately and independently provided on the back surface side of the pillar garnish 240. Accordingly, a productivity can be improved, and costs can be reduced.

[Sixteenth Embodiment]

Next, some examples of structures in place of the above-described connecting structure between the strap and the pillar garnish will be described below with reference to FIGS. 36 to 39. The same reference numerals are given to the same elements as those in the above-described embodiments, and description thereof will be omitted.

Figure 36:
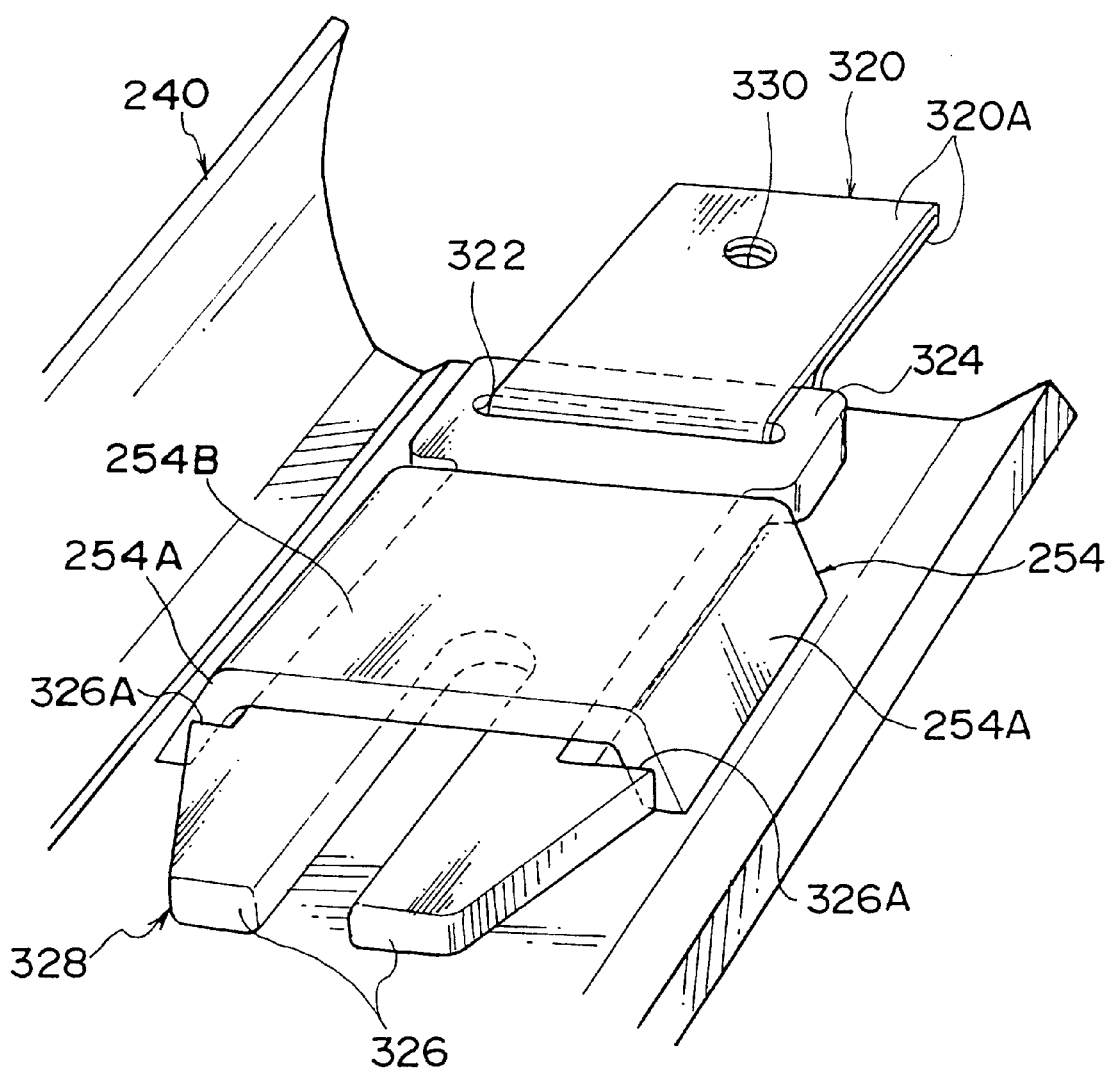
FIG. 36 is an enlarged perspective view which shows a main portion of an example (in which a strap and a bridge are connected by a lock plate) of a structure connecting a strap and a pillar garnish in accordance with a sixteenth embodiment.

In accordance with the embodiment shown in FIG. 36, a metal lock plate 328 which is formed by a base portion 324 and a pair of extending portions 324 is used. The base portion 324 is formed in a rectangular frame shape and has an oblong hole 322 into which a relatively short strap 320 can be inserted. The pair of extending portions 326 extend from the base portion 324 and separate into two branches from a middle portion to a front end portion. The pair of extending portions 326 are structured so as to be capable of elastically deforming in directions of approaching to each other. Further, an outer surface of the extending portion 326 is made a taper surface tapered toward a front direction. An engaging portion 326A which can engage with the leg portion 254A of the bridge 254 is formed at an outer end portion at a side opposite the inserting direction of the extending portion 326.

The strap 320 is inserted into the oblong hole 322 in the base portion 324 of the above-described lock plate 328, and is folded and overlapped. Then, the fixing bolt 260 mentioned above is inserted into bolt insertion holes 330 coaxially formed on both end portions 320A of the strap 320, and is screwed with the weld nut 262 at the back surface side of the pillar inner panel 34, whereby both the end portions 320A which are the other end portion of the strap 320 are fixed in advance to the pillar inner panel 34.

In accordance with the structure described above, as explained above, the other end portion of the strap 320 can be fixed in advance to the pillar inner panel 34, and the lock plate 328 mounted to one end portion of the strap 320 is inserted into and engaged with the bridge 254 at a time of assembling the pillar garnish 240. As a result, assembling operability to the pillar inner panel 34 of the pillar garnish 240 can be improved.

Figure 37:
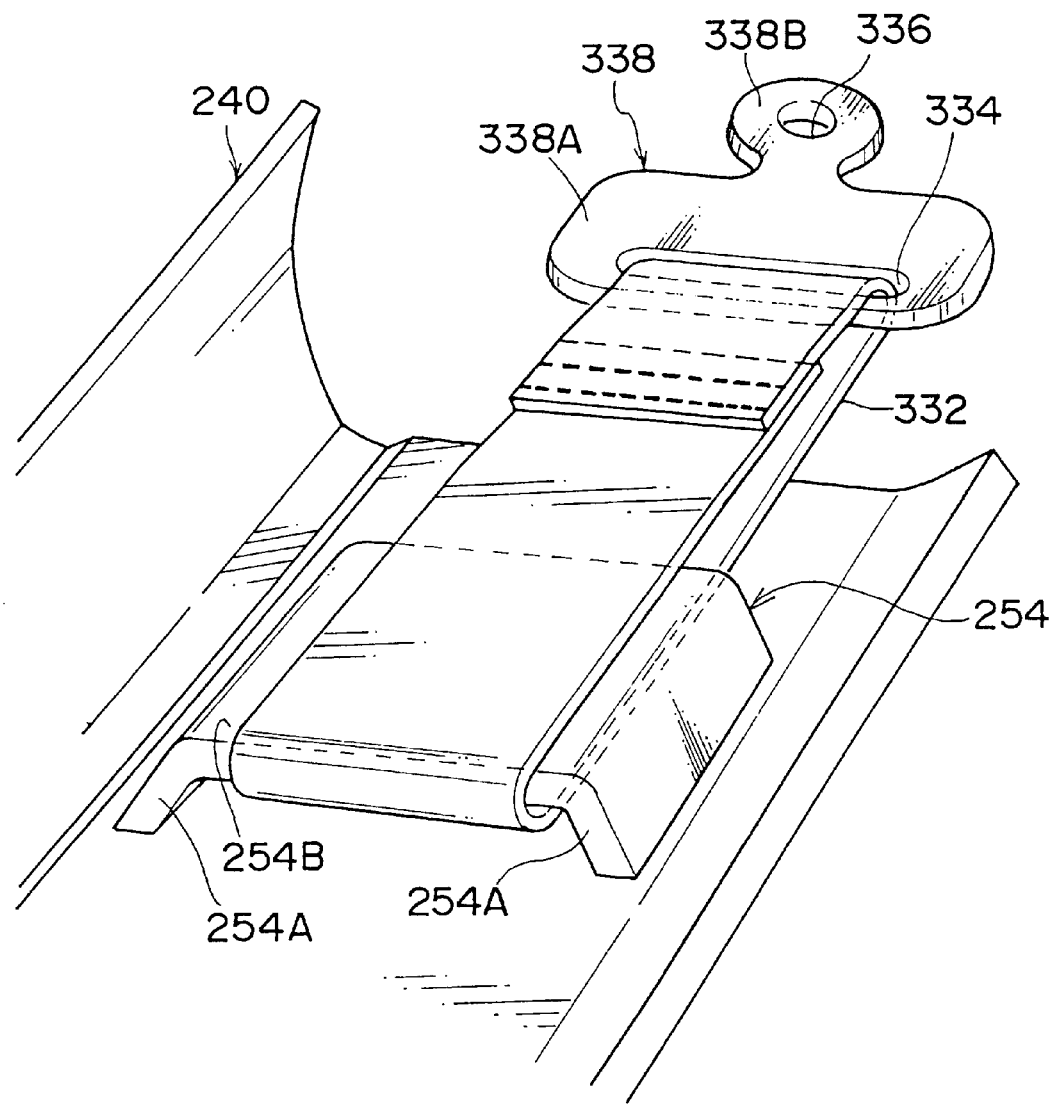
FIG. 37 is an enlarged perspective view which shows a main portion of an example (in which a strap is inserted into a bridge and an anchor plate and thereafter is made into a loop shape) of a structure connecting the strap and the pillar garnish in a similar manner.

In accordance with the embodiment shown in FIG. 37, an anchor plate 338 formed by a main body portion 338A and amounting portion 338B is used. The main body portion 338A is formed in a substantially rectangular plate shape and has an oblong hole 334 into which a strap 332 can be inserted. The mounting portion 338B projects from the main body portion 338A and has a bolt insertion hole 336 formed in the middle portion thereof.

After the strap 332 is inserted into the oblong hole 334 of the anchor plate 338 and is wound around the top portion 254B of the bridge 254, both the end portions are fastened by sewing or adhesion or the like, whereby the strap 332 is formed in a loop shape.

Figure 38:
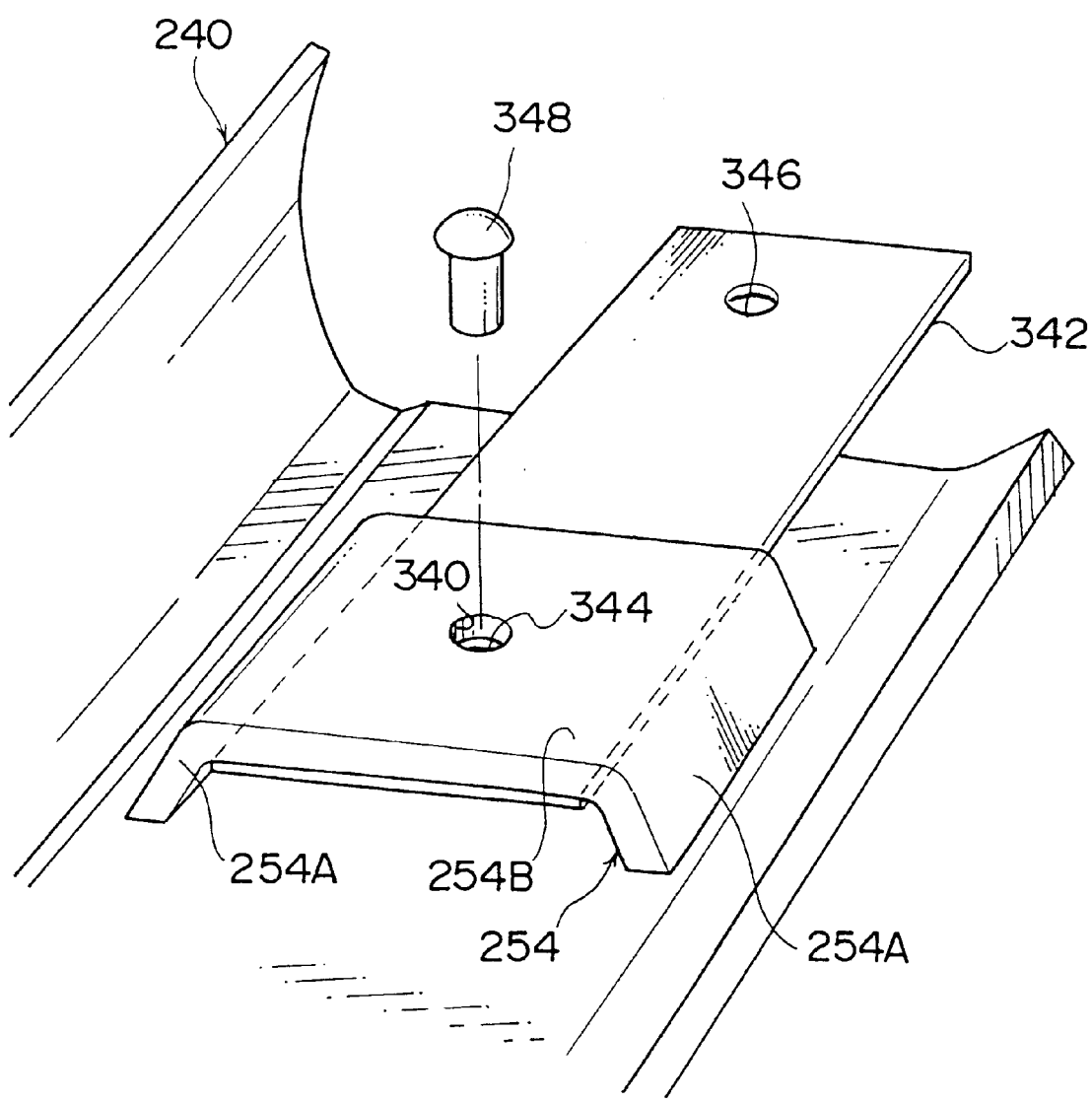
FIG. 38 is an enlarged perspective view which shows a main portion of an example (in which an end portion of a strap is inserted into a bridge and is fixed by a pin) of a structure connecting the strap and the pillar garnish in a similar manner.

In accordance with the embodiment shown in FIG. 38, a pin insertion hole 340 is formed in the middle portion of the top portion 254B of the bridge 254. Further, the strap 342 is formed as a single, belt-shaped member. A pin insertion hole 344 and a bolt insertion hole 346 into which a fixing bolt 260 is inserted are formed in both end portions of the strap 342.

One end portion of the strap 342 is inserted at the back surface side of the top portion 254B of the bridge 254, and the pin 348 is inserted into the pin insertion hole 340 of the bridge 254 and into the pin insertion hole 344 of the strap 342. Therefore, the insertion end portion is caulked, and one end portion of the strap 342 is thereby fixed to the top portion 254B of the bridge 254.

In accordance with the embodiment shown in FIG. 39, four resin projections 350 are provided upright in advance from a predetermined position of the back surface of the pillar garnish 240. Then, after a single strap 352 is folded at the middle portion so as to overlap in two layers, a folded portion 352A is disposed between the projections 350 adjacent in the widthwise direction of the pillar garnish 240, and further, the rectangular, flat-plate-shaped bridge plate 354 is inserted in the folded portion 352A. Small holes in which the projections 350 can be inserted are formed at the four corners of the bridge plate 354. The projections 350 corresponding to the interiors of these small holes are inserted and thermally caulked. The bridge plate 354 is thereby mounted to the back surface side of the pillar garnish 240.

[Seventeenth Embodiment]

A seventeenth embodiment will be described below with reference to FIGS. 40 and 41. This embodiment is similar to the eighth embodiment, and in the description of the present embodiment, the same reference numerals as those used in the eighth embodiment are given to the same elements as those in the eighth embodiment, and description thereof will be omitted. Further, the drawings used in the eighth embodiment will be referred to as occasion demands.

Here, in the drawings, an arrow FR denotes a forward direction of the vehicle, an arrow UP denotes an upper direction of the vehicle and an arrow IN denotes an inner direction of the vehicle.

A pillar garnish 440 is not limited to a structure in which the base member 162 is covered by the outer skin 44 as shown in FIG. 15. For example, a soft resin pillar garnish which is not covered by an outer skin may be employed.

Figure 41:
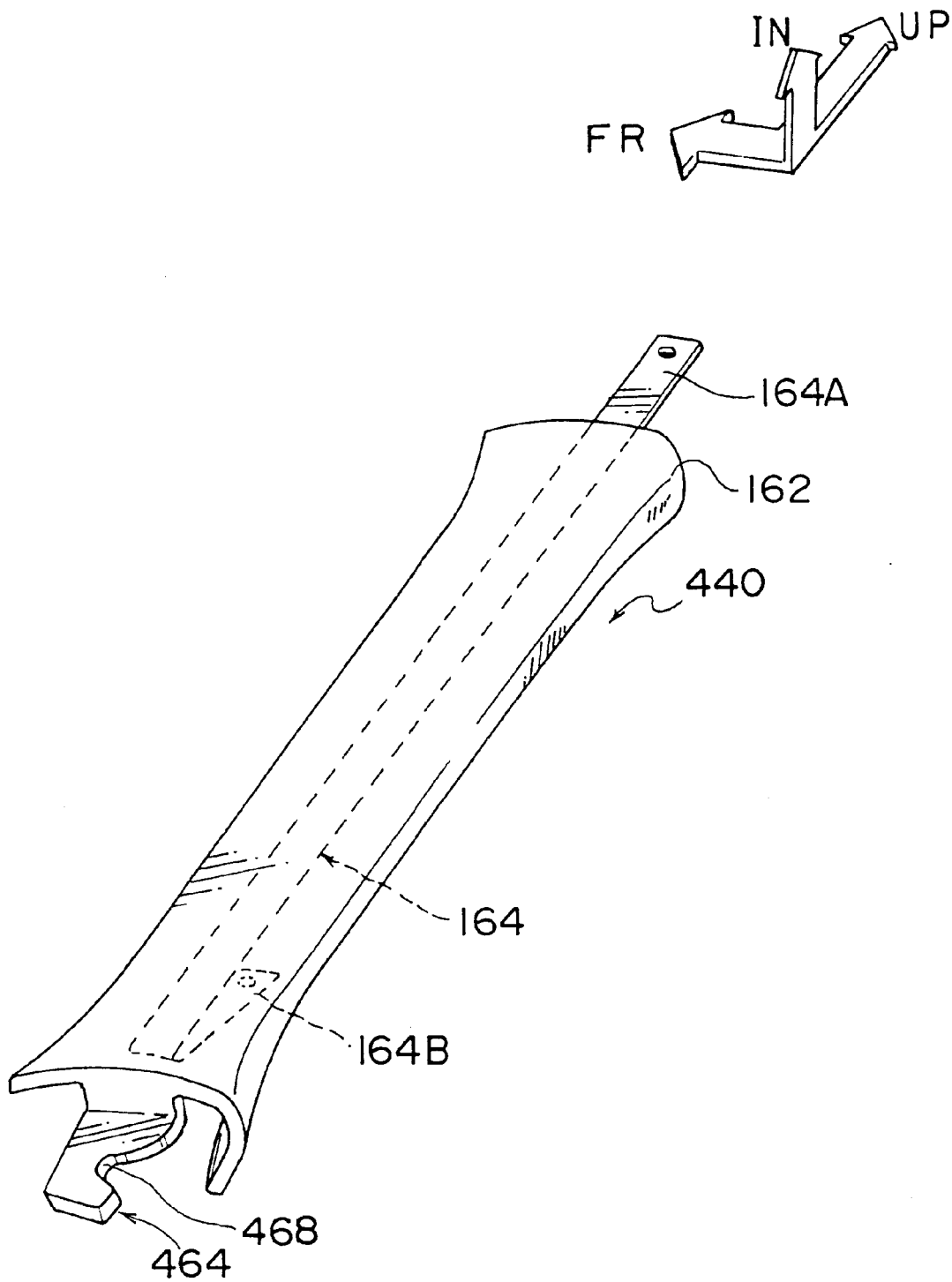
FIG. 41 is a perspective view which shows a pillar garnish in the structure of temporarily placing the pillar garnish which accommodates the head portion protecting air bag apparatus in accordance with the seventeenth embodiment.

As shown in FIG. 41, the band-like strap 164 is inserted into the base member 162 of the pillar garnish 440 by insert molding, and the strap 164 is inserted along the longitudinal direction of the pillar garnish 440.

As shown in FIG. 15, the strap 164 is inserted only within the base portion 162A in the base member 162 of the pillar garnish 440. The mounting seat 66 is integrally formed with the back surface of the base portion 162A, and the base member 162 is fixed to the pillar inner panel 34 through the mounting seat 66 by means of the clip 68.

As shown in FIG. 16, the upper end portion 164A of the strap 164 is extended from the upper end portion of the base member 162 and is fixed to the portion close to the upper end portion of the pillar inner panel 34 by means of the bolt 166 and the weld nut 168. Further, after the lower end portion 164B of the strap 164 is extended from the lower end portion of the base member 162 and folded, it is fixed to the portion close to the lower end portion of the pillar inner panel 34 by means of the bolt 166 and the weld nut 168. The strap 164 may be made of a metal, or a resin having a high hardness. The structure described above is the same as that of the eighth embodiment.

Figure 40:
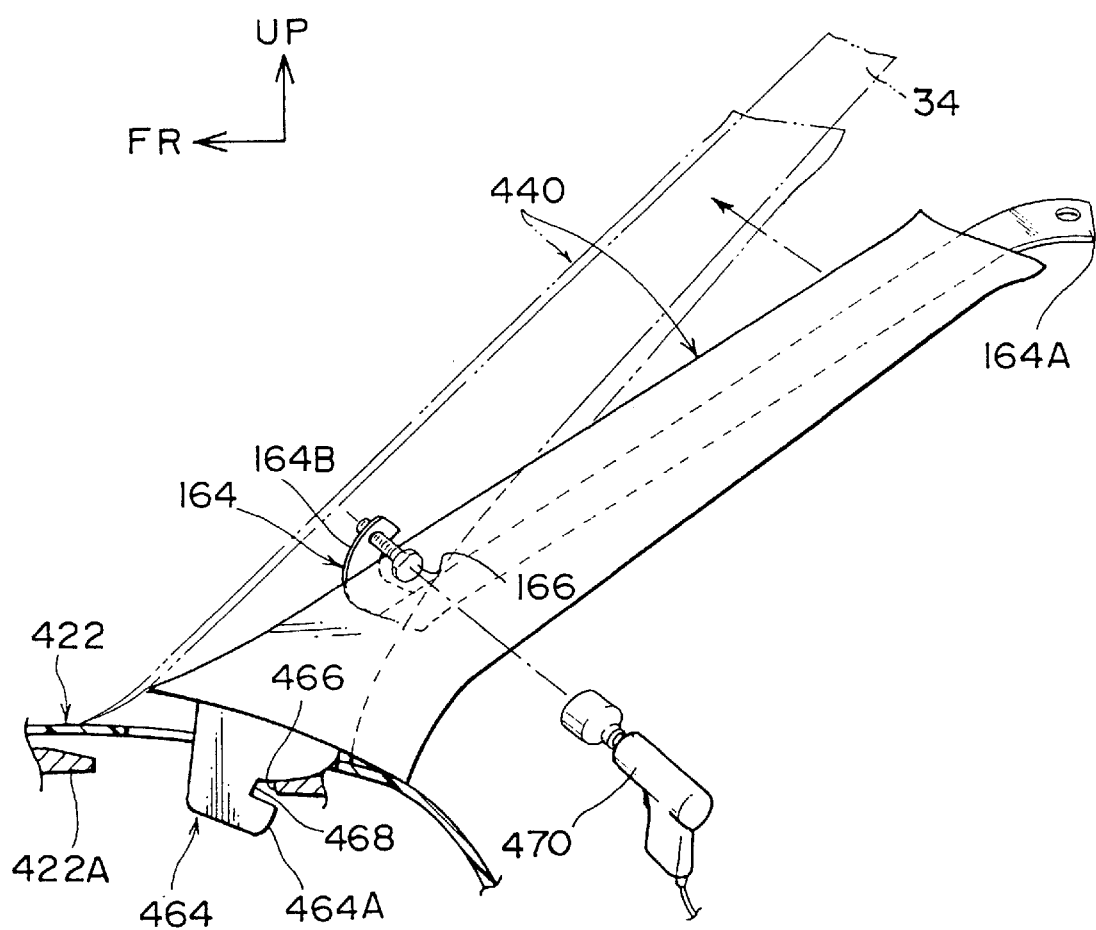
FIG. 40 is a side view which schematically shows a structure of temporarily placing a pillar garnish which accommodates a head portion protecting air bag apparatus in accordance with a seventeenth embodiment.

Next, as shown in FIG. 40, an insertion portion 464 is formed in the lower portion of the pillar garnish 440. An opening portion 466, into which the insertion portion 464 of the pillar garnish 440 is inserted, is formed in the insert 422A of the instrument panel 422.

Further, a notch 468 serving as an engaging portion is formed in a side wall portion close to the rear end of the vehicle in the insertion portion 464 of the pillar garnish 440. The pillar garnish 440 can be inclined at a predetermined angle substantially toward the rear portion of the vehicle from a normal assembly position (the position shown by the two-dot chain line in FIG. 40) by engaging the notch 468 with an edge portion of the opening portion 466, so that the lower end portion 164B of the strap 164 can be temporarily placed at the inclined position (the position shown by the solid line in FIG. 40) at which the lower end portion 164B can be fixed to the pillar inner panel 34.

Next, the operation of the present embodiment will be described below.

In accordance with the present embodiment, the notch 468, which is formed in the inserting portion 464 disposed in the lower portion of the pillar garnish 440, is hooked on the edge portion of the opening portion 466 in the insert 422A of the instrument panel 422. The pillar garnish 440 is temporarily placed at the inclined position (the position shown by the solid line in FIG. 40) at which it is inclined at a predetermined angle substantially toward the rear of the vehicle from the normal assembly position (the position shown by the two-dot chain line in FIG. 40). In this inclined state, for example, the lower end portion 164B of the strap 164 is fixed to the pillar inner panel 34 by means of the bolt 166.

As a result, because it is possible to temporarily place the pillar garnish as described above, by changing the shape of the simple pillar garnish 440 in which the insertion portion 464 having the notch is formed in the lower portion of the pillar garnish 440, at the time of assembly, a worker need not hold the pillar 440 with one hand in a vicinity of an assembly position of the front pillar portion 20 (see FIG. 2). The worker can position the lower end portion 164B of the strap 164 and the bolt 166 by one hand, and can easily fasten the bolt 166 by a tool 470 with the other hand. Therefore, the assembly workability of the pillar garnish 440 can be greatly improved.

In the above description, one embodiment has been described in detail. However, it is apparent for those skilled in the art that the present embodiment can be modified in various ways. For example, in accordance with the present embodiment, the notch 468 corresponding to the engaging portion is formed in the vehicle rear-side side wall portion of the inserting portion 464 of the pillar garnish 440. However, the position of forming the engaging portion in the inserting portion 464 is not limited to the vehicle rear-side side wall portion, and the engaging portion maybe formed at another portion such as the vehicle front-side side wall portion. Further, the engaging portion is not limited to the notch 468, and a bending portion, a convex portion or the like may be employed. Still further, in accordance with the present embodiment, the structure is such that the upper end portion 164A and the lower end portion 164B of the strap 164 are fixed to the pillar inner panel 34. However, the structure is not limited to this, and it suffices for the upper end portion 164A and the lower end portion 164B to be fixed to the body. For example, the lower end portion 164B of the strap 164 may be extended so as to be fixed to the cowl, or the upper end portion 164A may be further extended so as to be fixed to the roof.

[Eighteenth Embodiment]

A eighteenth embodiment of a structure of arranging an vehicle occupant protecting apparatus for an automotive vehicle in accordance with the present invention will be described below with reference to FIGS. 42 to 44. The same reference numerals as those used in the first embodiment are given to the same elements as those in the first embodiment, and description thereof will be omitted.

A pillar garnish 532 of the front pillar portion 20 is made of a resin or a fiber laminated member generally used for a roof base member for an automotive vehicle. The pillar garnish 532 is formed by a base member 544 formed by a non-breaking member such as TPO or the like, that is, a resin material which is easily elastically deformed and hard to be broken, and an outer skin 548 covering a surface of the base member 544 (a surface inside the vehicle cabin). The end portion of the garnish 532 is elastically engaged with the opening weather strip 39.

Further, a rear portion 532A of the garnish 532, which is unfolded toward an inward portion of the vehicle cabin at a time when the bag is unfolded, is disposed inside the vehicle cabin at a predetermined interval with respect to the pillar inner panel 34, whereby a predetermined rear space portion 550 is formed between the garnish 532 and the pillar inner panel 34. The front portion 16D (refer to FIG. 2) of the bag 16, which is folded in a rectangular cross sectional shape by a predetermined folding method, is housed within the rear space portion 550 together with the case 26 which is unfolded by a predetermined expanding pressure. The finlike bag fixing portion 16E and the case fixing portion 26A are integrally formed at the front portion 16D of the bag 16 and a suitable portion of the case 26, and the bag fixing portion 16E and the case fixing portion 26A are structured so as to be fixed to the pillar inner panel 34.

The front portion 532B of the garnish 532 is disposed inside the vehicle cabin at a predetermined interval with respect to the pillar inner panel 34, whereby a predetermined front space portion 556 is formed between the front portion 532B of the garnish 532 and the pillar inner panel 34. The front space portion 556 is used as a space for placing a drain hose or a wire harness. The thickness of the rear portion 532A of the pillar garnish 532 is made thinner than the thickness of the front portion 532B, so that the rear portion 532A of the pillar garnish 532 may be more easily unfolded.

Figure 43:
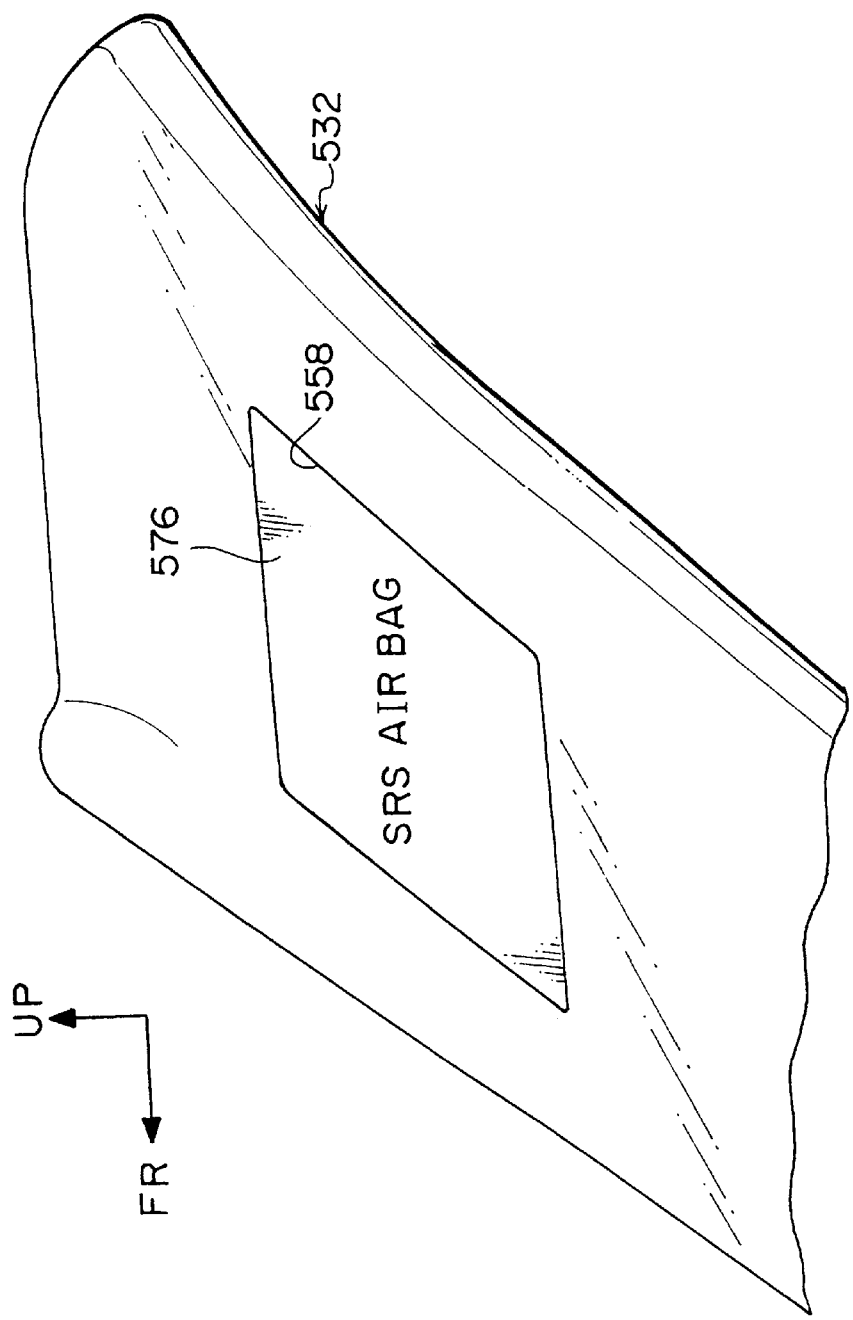
FIG. 43 is a side view as seen from an inner side of a vehicle cabin which shows a structure of arranging an vehicle occupant protecting apparatus for an automotive vehicle in accordance with the eighteenth embodiment.

As shown in FIG. 43, a rectangular concave portion 558 is formed on a design surface of the middle portion in the longitudinal direction of the garnish 532, and a cap 576 is fitted into the concave portion 558. In this case, a logo such as "SRS AIR BAG" or the like is expressed on the design surface of the cap 576.

The cap 576 and the concave portion 558 are respectively disposed in vicinities of both of the upper and lower end portions (both end portions in the longitudinal direction) of the garnish 532.

Figure 42:
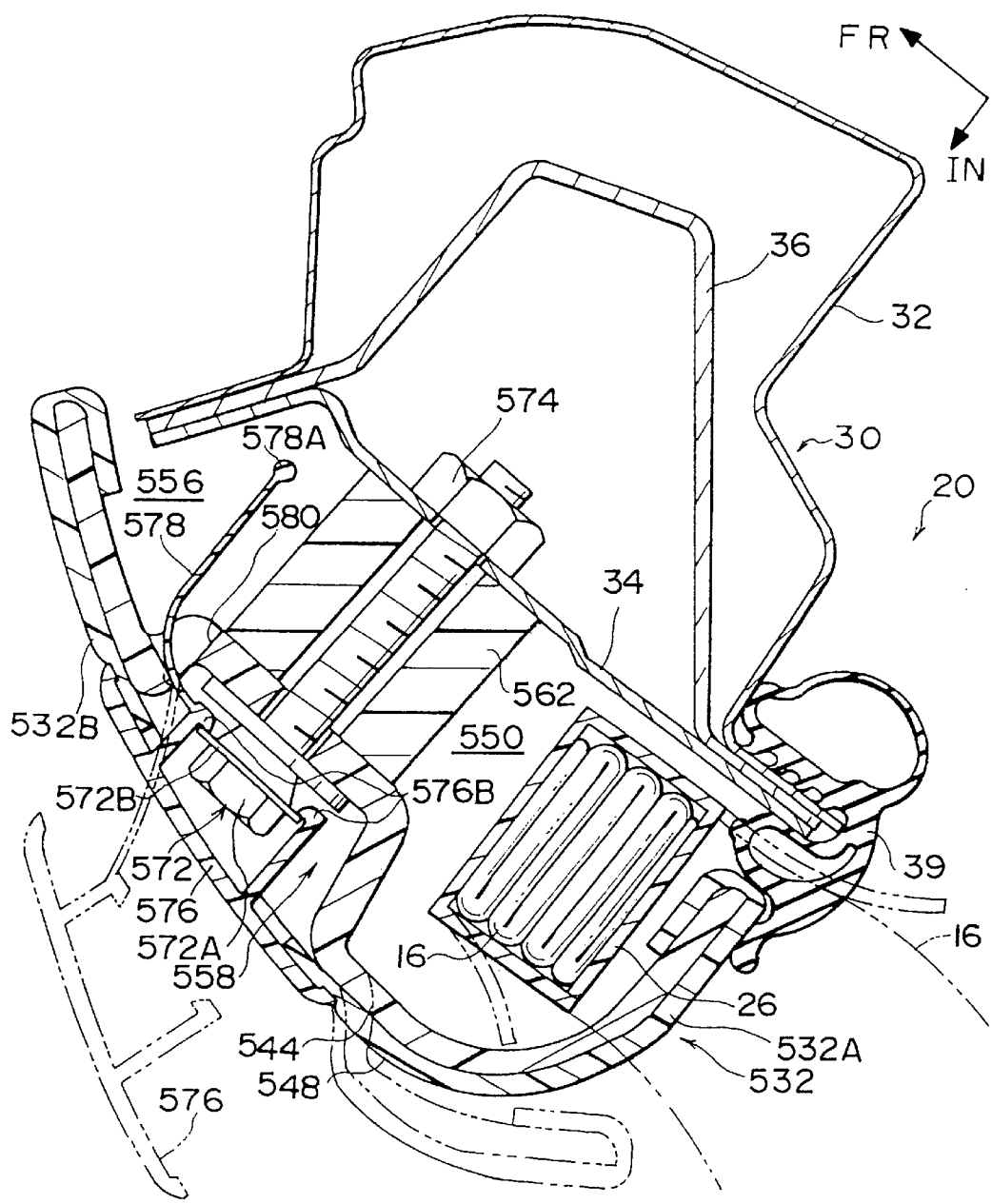
FIG. 42 is a cross sectional view, as seen substantially from an upper portion of a vehicle, which shows a structure of arranging an vehicle occupant protecting apparatus for an automotive vehicle in accordance with an eighteenth embodiment.

As shown in FIG. 42, the concave portion 558 of the garnish 532 is fixed to the pillar inner panel 34 through the cylindrical resin spacer 562 by means of a bolt 572 and a weld nut 574 serving as fixing members. Accordingly, the garnish 532 is directly fixed to the pillar inner panel 34 by means of the bolt 572 without the invention of the clip or the like, and a head portion 572A of the bolt 572 is housed within the concave portion 558. Further, a flange portion 572B is formed on the head portion 572A of the bolt 572, and the cap 576 is fixed by engaging an engaging hook 576B of the cap 576 with the flange portion 572B.

As shown in FIG. 44, a connecting portion 578 serving as a fall-out preventing means for connecting the cap 576 and the base member 544 of the pillar garnish 532 is integrally formed on the back surface of the cap 576. The connecting portion 578 is formed in a band shape, and a front end portion thereof is a T-shaped engaging portion 578A.

As shown in FIG. 42, the connecting portion 578 is inserted into a notch 580 formed in the concave portion 558 of the garnish 532, and the engaging portion 578A is set to have a dimension capable of engaging an outer peripheral portion of the notch 580. Accordingly, in the case of inserting the engaging portion 578A into the notch 580, it is necessary to elastically deform the connecting portion 578 and direct the engaging portion 578A disposed in the front end toward the notch 580. However, in the case in which the cap 576 is out of place from the concave portion 558, the engaging portion 578A engages with the outer peripheral portion of the notch 580, so that the cap 576 is prevented from falling out from the garnish 532.

Next, operation of the eighteenth embodiment will be described.

In accordance with this eighteenth embodiment, since the base member 544 of the pillar garnish 532 is formed by a non-break material such as TPO or the like, the pillar garnish 532 is not easily deformed and broken when the bag is unfolded. Further, since the base member 544 of the pillar garnish 532 is directly fixed to the pillar inner panel 34 through the spacer 562 by means of the bolt 572 and the nut 574, the pillar garnish 532 is prevented from being out of place from the pillar inner panel 34.

Further, in accordance with the eighteenth embodiment, even in the case that the cap 576 is out of place from the pillar garnish 532 when the bag is unfolded, the engaging portion 578A of the connecting portion 578 formed on the cap 576 is engaged with the outer peripheral portion of the notch 580, so that the cap 576 is prevented from falling out from the garnish 532 as shown by the two-dot chain line in FIG. 42. Further, due to the cap 576, the bolt 572 is not exposed so that the outer appearance can be improved.

[Nineteenth Embodiment]

Next, a nineteenth embodiment will be described below with reference to FIGS. 45 and 46.

The same reference numerals are given to the same elements as those in the eighteenth embodiment, and description thereof will be omitted.

Figure 45:
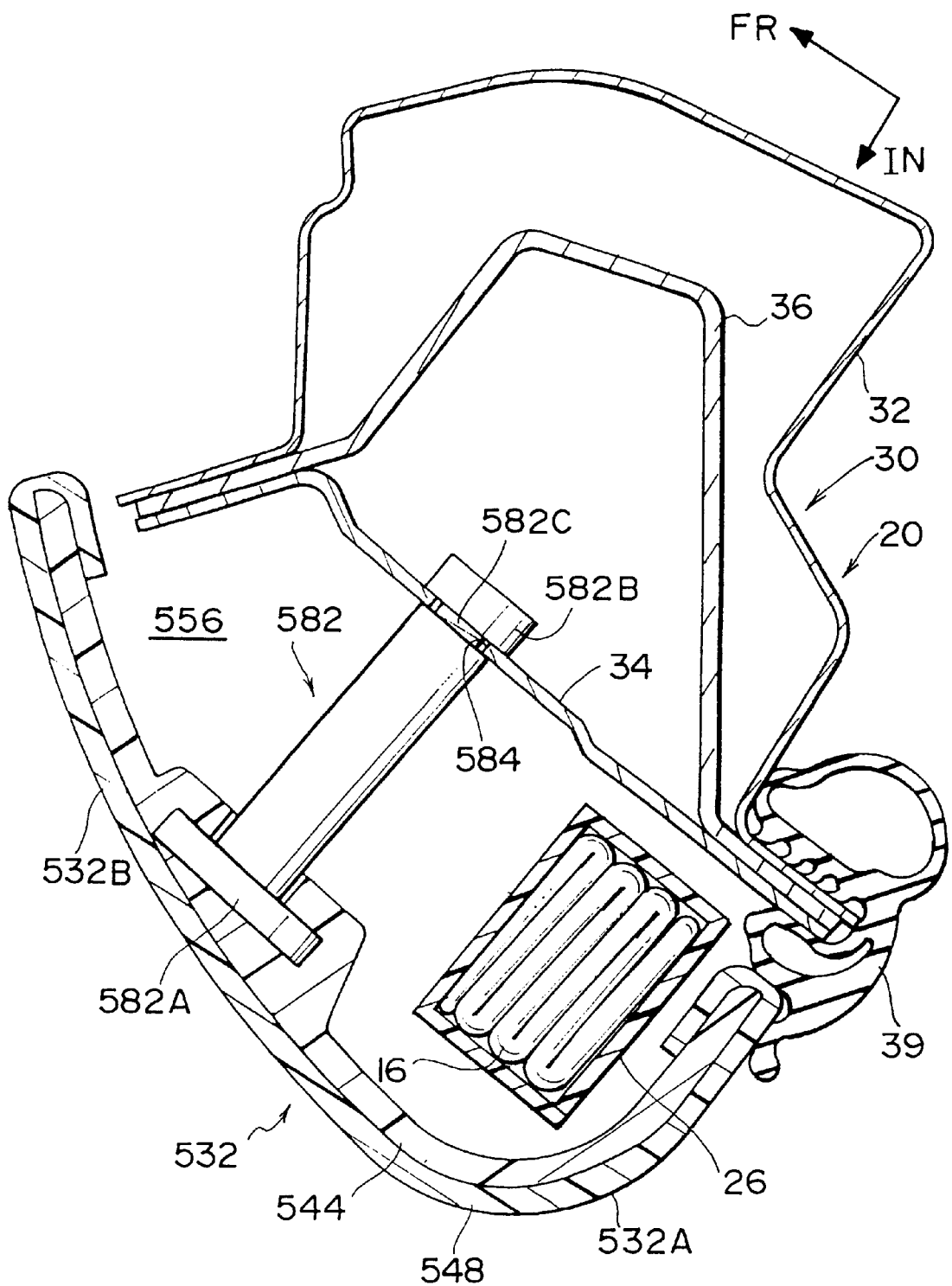
FIG. 45 is a cross sectional view, as seen substantially from an upper portion of a vehicle, which shows a structure of arranging an vehicle occupant protecting apparatus for an automotive vehicle in accordance with a nineteenth embodiment.

As shown in FIG. 45, in accordance with this nineteenth embodiment, an engaging pin 582 serving as engaging means is disposed at the pillar garnish 532 end. A large diameter portion 582A formed in one end portion of the engaging pin 582 is fixed by insert molding to a portion corresponding to the concave portion 558 of the eighteenth embodiment in the base member 544. A small diameter portion 582C is formed near the other end portion 582B of the engaging pin 582. The other end portion 582B is engaged with a peripheral edge portion of a mounting hole 584 which serves as an engaging means and is formed in the pillar inner panel 34.

Figure 46:
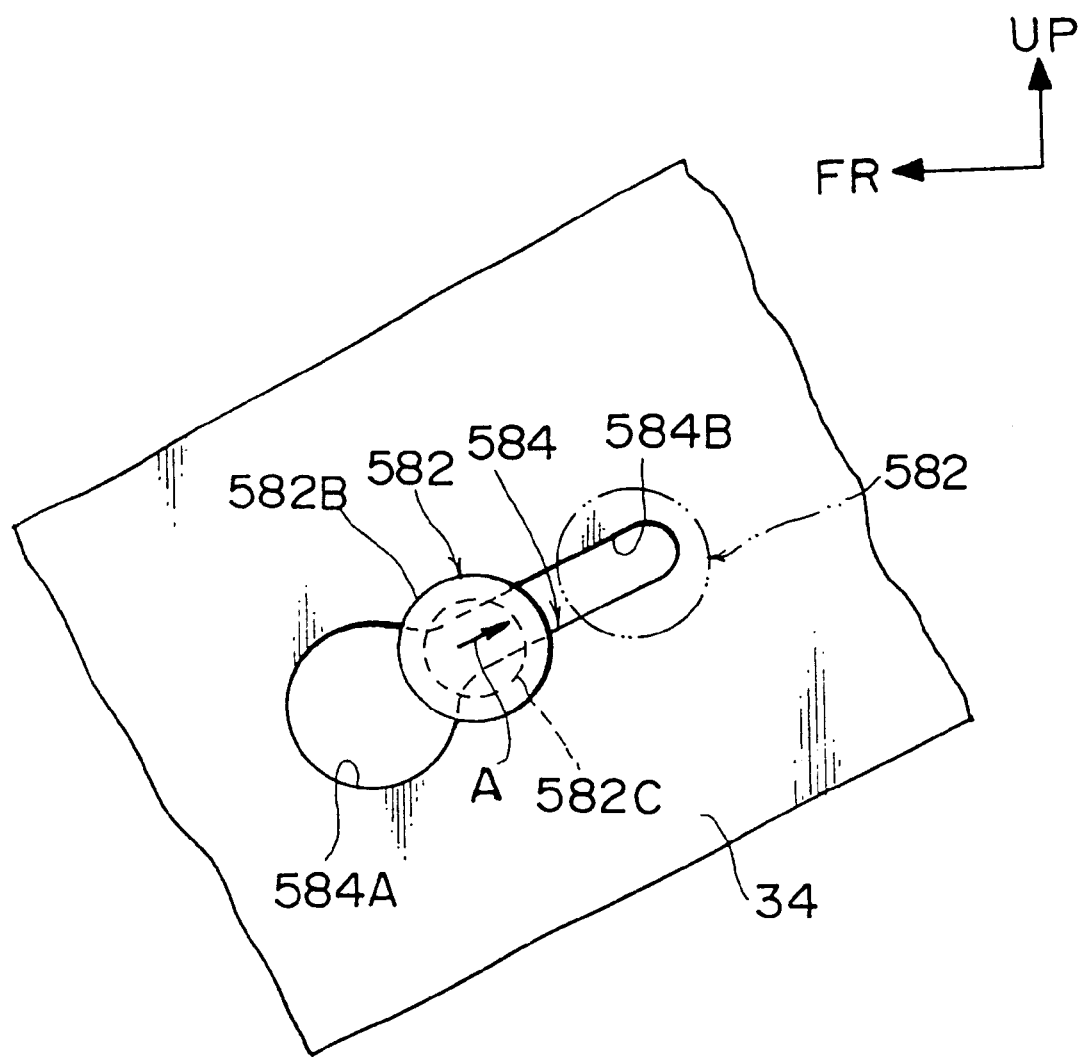
FIG. 46 is a side view of a main portion, as seen from an inner side of a vehicle cabin, which shows a mounting hole and an engaging pin in a structure of arranging an vehicle occupant protecting apparatus for an automotive vehicle in accordance with the nineteenth embodiment.

As shown in FIG. 46, the mounting hole 584 is formed by a large diameter portion 584A through which the other end portion 582B of the engaging pin 582 passes, and a small diameter portion 584B serving as an engaging force increasing portion and extending to a longitudinal center direction (an arrow A direction in FIG. 46) of the pillar inner panel 34 from the large diameter portion 584A. Accordingly, in the case that the pillar garnish 34 is bent at the longitudinal direction center portion so as to be formed in a substantial L shape when the bag is unfolded, the engaging pin 582 moves together with the pillar garnish 34 in the direction of an arrow A in FIG. 46 with respect to the pillar inner panel 34 so as to be disposed at the position shown by the two-dot chain line in FIG. 46, so that the engagement between the engaging pin 582 and the pillar inner panel 34 is further strengthened. FIG. 46 shows the lower end mounting portion of the pillar garnish 532. However, in the upper end mounting portion of the pillar garnish 532, the engaging pin 582 and the mounting hole 584 serving as the engaging means, and the small diameter portion 582C serving as the engaging means are similarly provided. However, the small diameter portion 582C extends to the longitudinal center direction (a downward diagonal direction) of the pillar inner panel 34, that is, in an direction opposite to the direction in FIG. 46 from the large diameter portion 584A.

Next, operation of the nineteenth embodiment will be described below.

In accordance with the nineteenth embodiment, the other end portion 582B of the engaging pin 582 provided in the pillar garnish 532 is inserted into the large diameter portion 584A of the mounting hole 584 formed in the pillar inner panel 34 so as to be engaged with the peripheral edge portion of the small diameter portion 582C in the mounting hole 584. The pillar garnish 532 can thereby easily be mounted to the pillar inner panel 536.

Further, the pillar garnish 532 is bent at the center portion in the longitudinal direction so as to be formed in a substantial L shape when the bag is unfolded. The unfolding space for the bag 16 can be ensured, and the bag 16 is smoothly unfolded along the side window glass. Then, in the case that the pillar garnish 532 is bent at the center portion in the longitudinal direction so as to be formed in a substantial L shape, the engaging pin 582 moves together with the pillar garnish 532 in direction of an arrow A in FIG. 46 with respect to the pillar inner panel 34 so as to be disposed at the position shown by a two-dot chain line in FIG. 46, so that engagement between the engaging pin 582 and the pillar inner panel 34 is made more strong. As a result, the pillar garnish 532 can be prevented from being out of place when the bag is unfolded.

Figure 47:
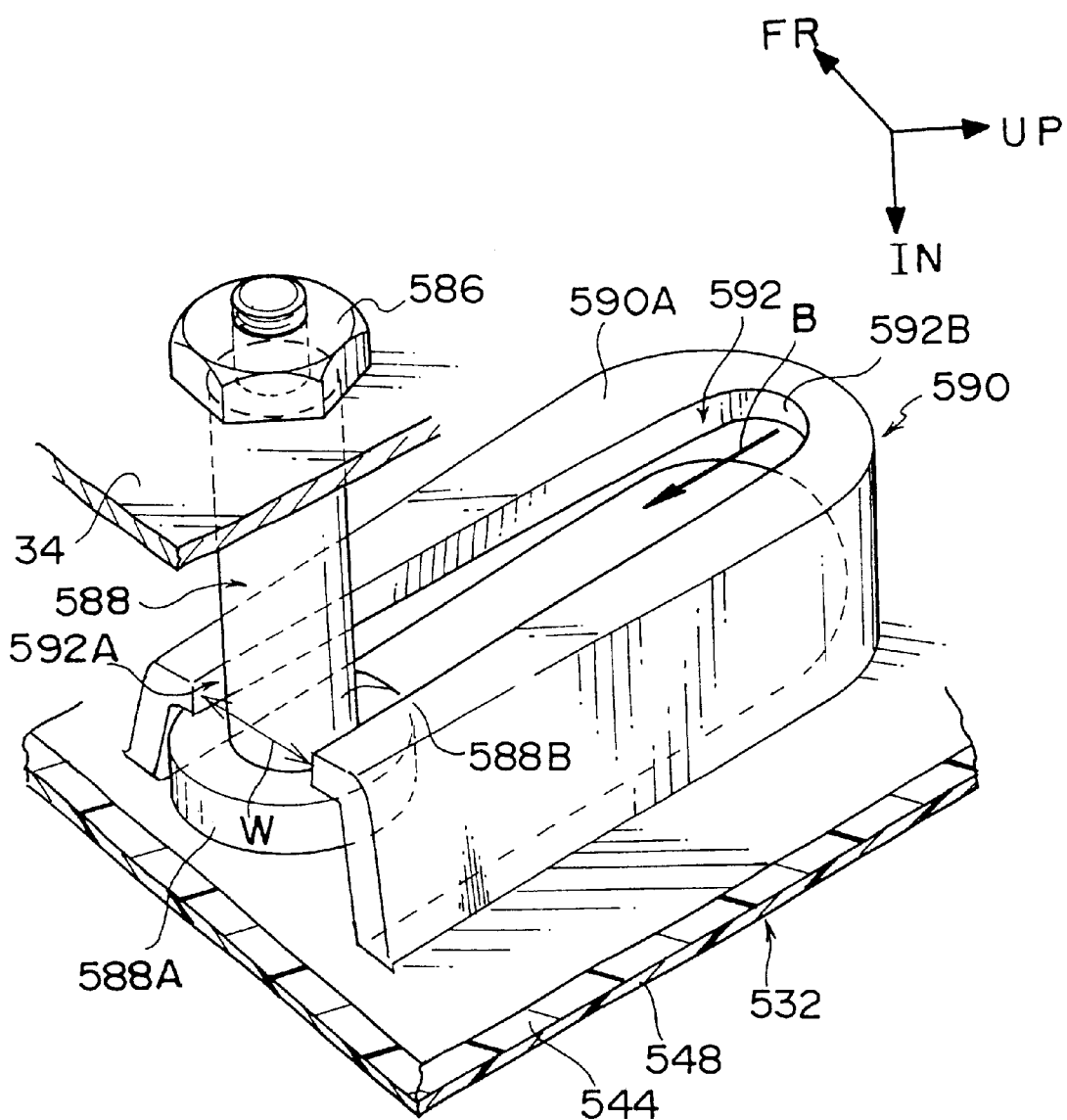
FIG. 47 is a perspective view which shows a main portion of a structure of arranging an vehicle occupant protecting apparatus for an automotive vehicle in accordance with a modified example of the nineteenth embodiment.

In accordance with the nineteenth embodiment, the engaging pin 582 serving as the engaging means is disposed in the pillar garnish 532, however, in place of this, as shown in FIG. 47, the structure can be made such that a large-diameter head portion 588A of the engaging pin 588, which serves as the engaging means and is fixed to the pillar inner panel 34 by means of the nut 586 or the like, is engaged with a slide projection 590 which servs as the engaging means and stands upright from the base member 544 of the pillar garnish 532. A slit 592, which corresponds to an engaging force increasing portion and into which a shaft portion 588B of the engaging pin 588 is inserted, is formed in an upper wall portion 590A of the slide projection 590. A width W of the slit 592 gradually narrows from an opening portion 592A into which the shaft portion 588B is inserted in a normal state toward a bottom portion 592B. As a result, in the case that the pillar garnish 532 is bent at the center portion in the longitudinal direction so as to be formed in a substantial L shape when the bag is unfolded, the slide projection 590 moves together with the pillar garnish 532 in the direction shown by arrow B in FIG. 47 with respect to the engaging pin 588, so that the engagement between the engaging pin 588 and the slide projection 590 is made strong. As a result, the pillar garnish 532 can be prevented from being out of place when the bag is unfolded. In FIG. 47, the upper end mounting portion of the pillar garnish 532 is shown.

Figure 48:
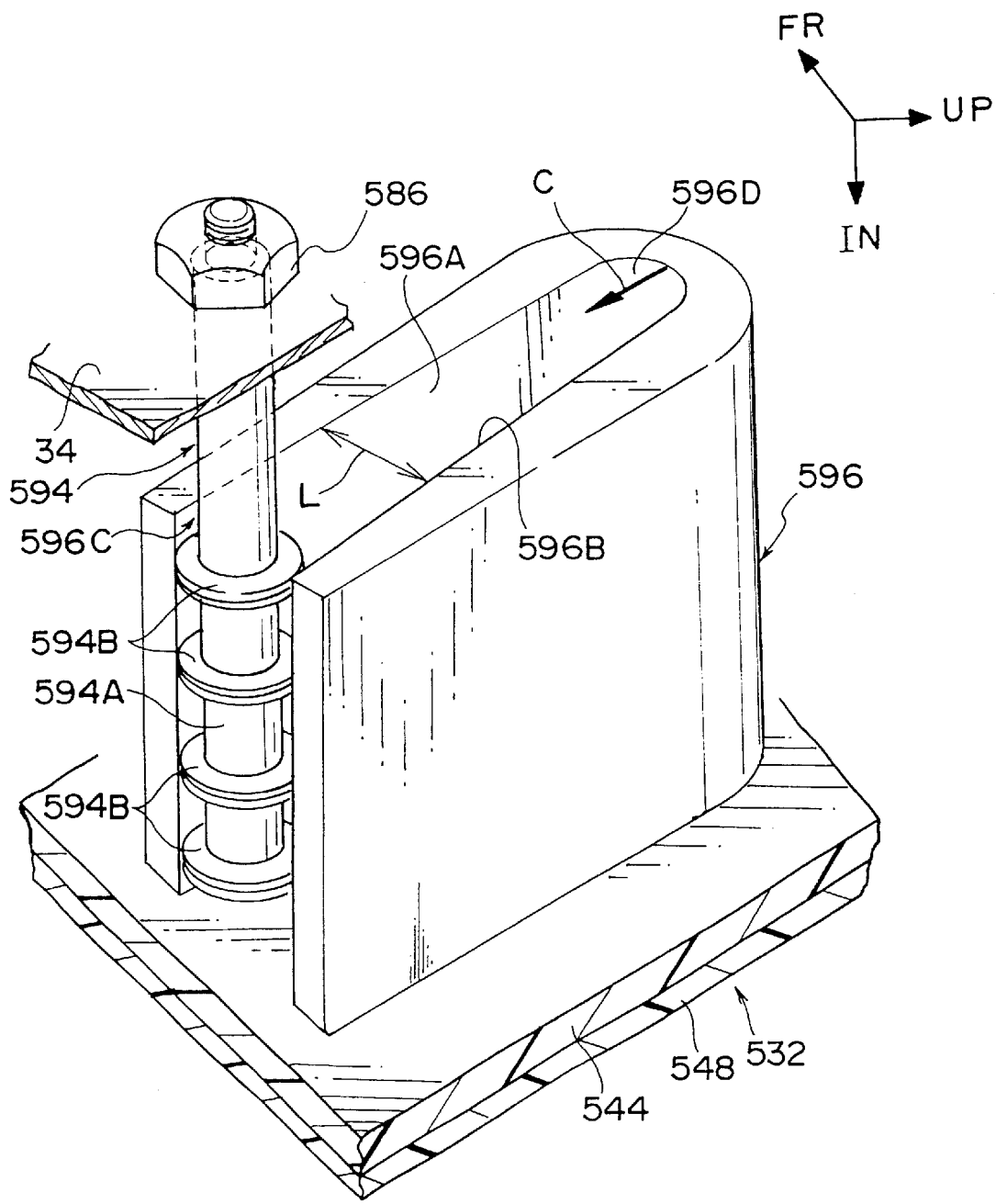
FIG. 48 is a perspective view which shows a main portion of a structure of arranging an vehicle occupant protecting apparatus for an automotive vehicle in accordance with another modified example of the nineteenth embodiment.

Further, as shown in FIG. 48, the structure can be made such that ring-like flange portions 594B are formed at a predetermined intervals in an axial direction on a shaft portion 594A of the engaging pin 594, which serves as the engaging means and is fixed to the pillar inner panel 34 by means of the nut 586 or the like. The flange portion 594B is engaged with a slide projection 596 which serves as the engaging means and stands upright on the base member 544 of the pillar garnish 532. The slide projection 596 is formed by a U-shaped standing wall portion. An interval L between opposing wall portions 596A and 596B, which serves as an engaging force increasing portions with which the flange portion 594B of the engaging pin 594 is engaged, is gradually made narrow from an opening portion 596C end, with which the flange portion 594B is engaged in a normal state, toward a bottom portion 596D end. Accordingly, in the case that the pillar garnish 532 is bent at a center portion in the longitudinal direction so as to be formed in a substantial L shape when the bag is unfolded, the slide projection 596 moves together with the pillar garnish 532 in the direction shown by arrow C in FIG. 48 with respect to the engaging pin 594, so that the engagement between the engaging pin 594 and the slide projection 596 is made more strong. As a result, the pillar garnish 532 is prevented from being out of place when the bag is unfolded.

Figure 49:
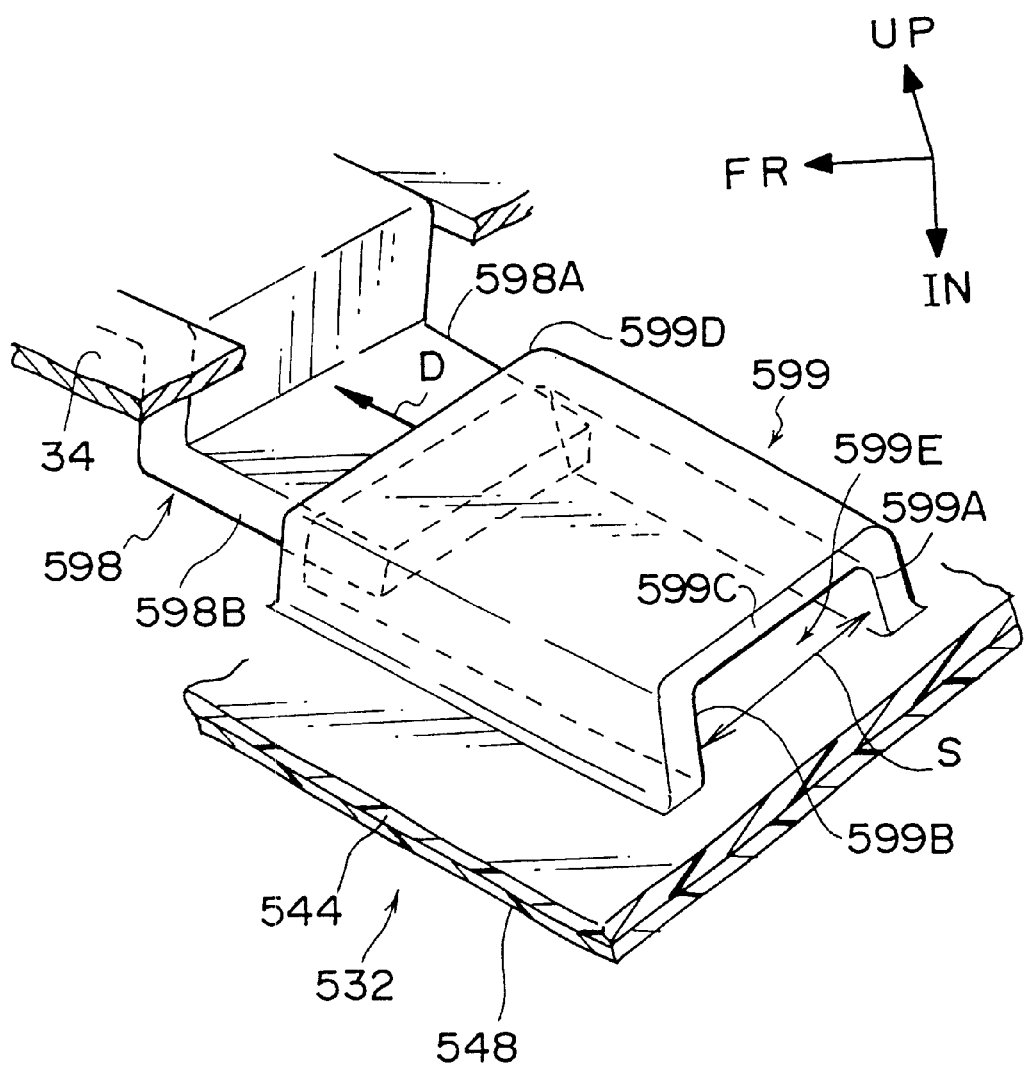
FIG. 49 is a perspective view which shows a main portion of a structure of arranging an vehicle occupant protecting apparatus for an automotive vehicle in accordance with another modified example of the nineteenth embodiment.

Still further, as shown in FIG. 49, the structure can be made such that a cut claw 598, which serves as the engaging means and is formed at the pillar inner panel 34, is engaged with a slide projection 599 which serves as the engaging means and stands upright on the base member 544 of the pillar garnish 532. The slide projection 599 is formed by opposing vertical wall portions 599A and 599B, which serves as an engaging force increasing portions, and an upper wall portion 599C. An interval S between the vertical wall portions 599A and 599B, which are abutted by both side surfaces 598A and 598B of the cut claw 598, is gradually made narrow from an opening portion 599D end, with which the cut claw 598 is engaged in a normal state, toward an opposite opening portion 599E. Accordingly, in the case that the pillar garnish 532 is bent at the center portion in the longitudinal direction so as to be formed in a substantial L shape when the bag is unfolded, the slide projection 599 moves together with the pillar garnish 532 in the direction shown by arrow D in FIG. 49 with respect to the cut claw 598, so that an engagement between the cut claw 598 and the slide projection 599 is made stronger. As a result, the pillar garnish 532 can be prevented from being out of place when the bag is unfolded. In this case, in place of the cut claw 598, a bracket may be used to form a claw which engages the slide projection 599.

Figure 50:
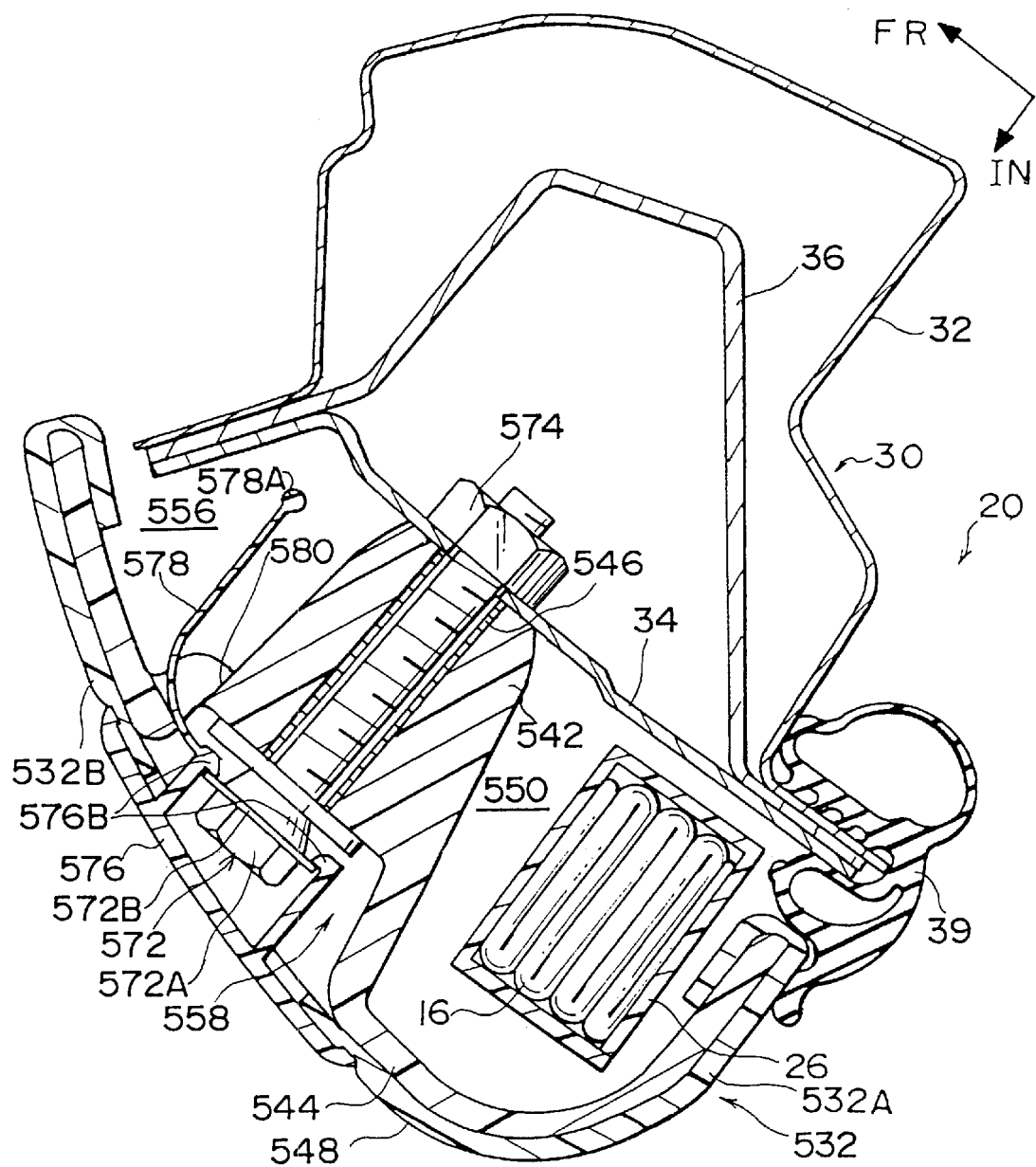
FIG. 50 is a cross sectional view, as seen substantially from an upper portion of a vehicle, which shows a structure of arranging an vehicle occupant protecting apparatus for an automotive vehicle in accordance with a modified example of the eighteenth embodiment.

In the above description, the eighteenth and nineteenth embodiments have been explained in detail. However, many other modified examples of these embodiments are possible. For example, as a modified example of the eighteenth embodiment, as shown in FIG. 50, the structure may be made such that a spacer portion 542 projects from the reverse surface of the base member 544 in the pillar garnish 532 by integral molding, an iron plate collar 546 is press-fitted into the spacer portion 542, and a bolt 572 is inserted into the iron plate collar 546. Further, the structure may be made such that a portion to which the weld nut 574 of the pillar inner panel 34 is connected is projected toward the pillar garnish 532, the projecting portion is brought into contact with the pillar inner panel 34, and the garnish 532 and the pillar inner panel 34 are directly fixed by the bolt 572. Still further, a structure of arranging an vehicle occupant protecting apparatus for an automotive vehicle in accordance with the present invention can be applied to the other pillars such as a quarter pillar or the like.

[Twentieth Embodiment]

Next, a twentieth embodiment will be described below with reference to the drawings.

Figure 51:
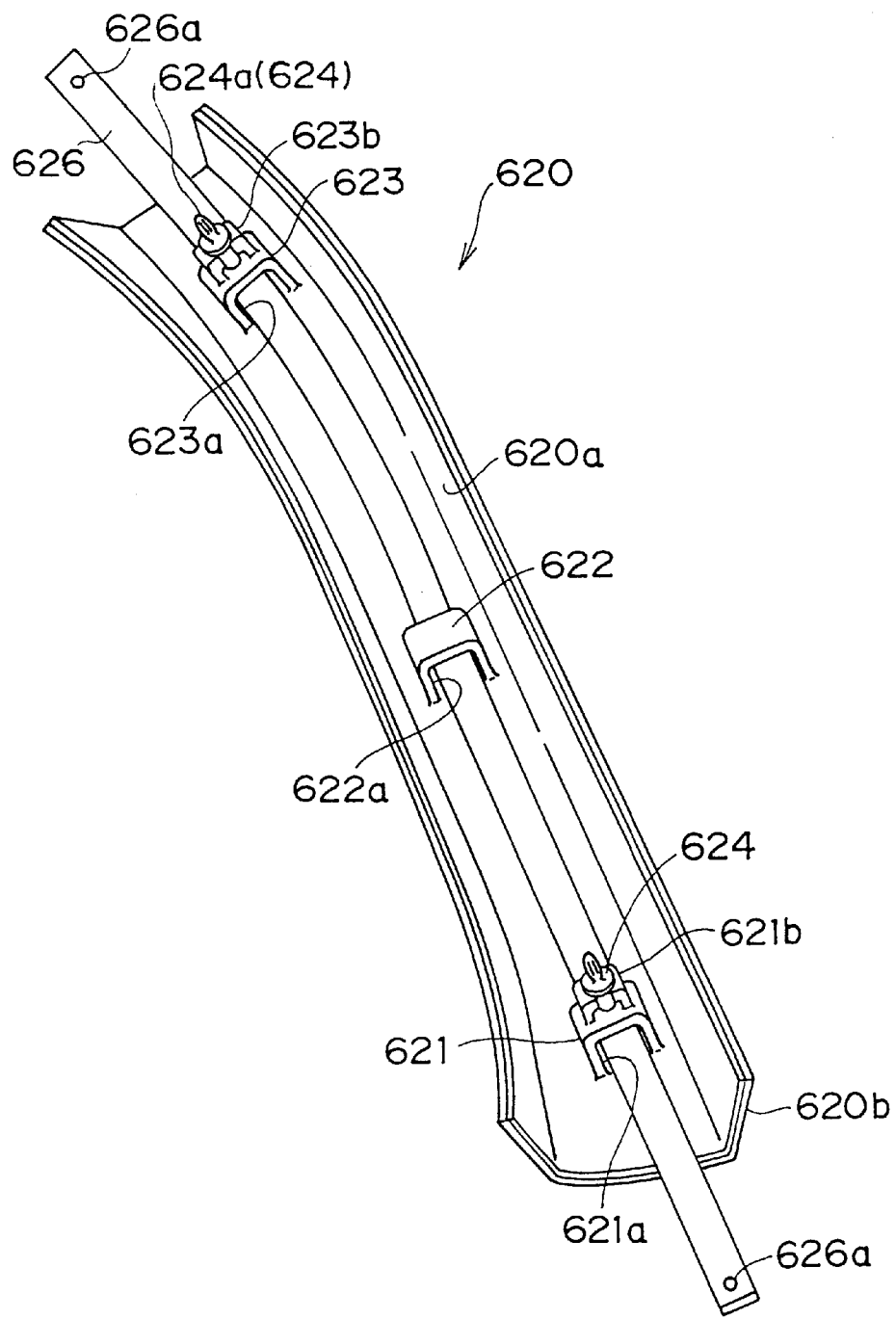
FIG. 51 is a perspective view of a back surface side of a pillar garnish in accordance with twentieth embodiment.

As shown in FIG. 51, a pillar garnish 620 is formed by a double-layered construction comprising a base member 620a and an outer skin 620b made of a synthetic resin such as ABS resin, polypropylene or the like, and is formed in a long shape along the front pillar. Then, bridges 621, 622 and 623 having guide holes 621a, 622a and 623a extending in a longitudinal direction of the pillar garnish 620 are formed in the base member 620a on the reverse surface end. The bridges 621, 622 and 623 are arranged near both ends and a center portion in the longitudinal direction of the reverse surface end of the pillar garnish 620. Further, clips 624 are mounted to the bridges 621 and 623 by using fitting and mounting portions 621b and 623b.

The clips 624 are provided at the pillar inner panel 34. Together with engaging holes 605 (refer to FIG. 52) into which the clips 424 are inserted and engaged, the clips 624 form an engaging and attaching means for detachably engaging and attaching the pillar garnish 620 to the pillar inner panel 34.

Further, a single strap 626 is inserted within the guide holes 621a, 622a and 623a of the respective bridges 621, 622 and 623. The strap 626 is formed by a fabric material having flexibility and high tensile strength and made of a polyamide fabric, an aramid fabric or the like. A mounting hole 626a is formed in both ends thereof. The strap 626 is fastened to the pillar inner panel 34 by means of a bolt 627 screwed with a mounting hole 603 (refer to FIGS. 52 and 53A) formed by a screw hole of the pillar inner panel 34 through the mounting hole 626a. The positions at which the mounting holes 603 are disposed are in vicinities of the both ends of the pillar garnish 620 at a time of engaging and attaching the pillar garnish 620 to the pillar inner panel 34 by using the clips 624. Further, a length of the strap 626 is set to be a length of forming an opening 629 (refer to FIG. 53B) through which the bag 16 can protrude an inside portion of the vehicle between the pillar garnish 620 and the pillar inner panel 34 when the clips 624 come out from the locking holes 605 by being pressed by the expanding bag 16 and the pillar garnish 620 separates from the pillar inner panel 34.

Next, mounting of the pillar garnish 620 to the pillar inner panel 34 will be described below.

Figure 52:
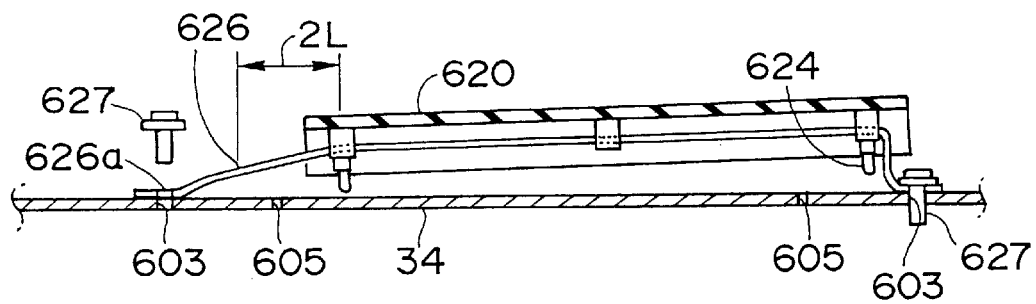
FIG. 52 is a schematic view which shows an adhering operation of a strap in accordance with the twentieth embodiment.

One end side of the strap 626, which is inserted through each of the guide holes 621a, 622a and 623a of the pillar garnish 620, is fastened to the pillar inner panel 34 by using the bolt 627. The other end side of the strap 626 is fastened to the pillar inner panel 34 by using the bolt 627. At this time, as shown in FIG. 52, the strap 626 has a length with leeway which allows formation of the opening 629 through which the air bag 16 protrudes, and has a length which is different from the length needed only for mounting the pillar garnish 620 to the pillar inner panel 34. Therefore, the pillar garnish 620 can be moved in such a manner as to shift from the mounting hole 603 (the left mounting hole in FIG. 52) so as not to interfere with a jig for fastening the bolt 627, so that the fastening operation can be performed simply. Particularly, since the distance for shifting is a distance 2L, which is about two times a distance L allowing formation of the opening 629 (refer to FIGS. 52 and 53B), the fastening operation for the strap 424 can be facilitated even more.

Thereafter, when the clips 624 are inserted in and engaged with the engaging holes 605, the pillar garnish 620 can be mounted to the pillar inner panel 34.

When the gas for expansion is discharged from the inflator 14 so that the bag 16 is expanded at a time of operating the air bag apparatus, the pillar garnish 620 is pressed by the bag 16, the clips 624 comes out from the engaging holes 605, the pillar garnish 620 separates from the pillar inner panel 34, and the bag 16 is projected downward from the separated opening 629.

The pillar garnish 620 is connected and held by means of the strap 626 which is inserted through the guide holes 621a, 622a and 623a. Therefore, even when the bag 16 protrudes out, unnecessary scattering can be prevented.

As mentioned above, in accordance with the structure of mounting the pillar garnish 620 of the present embodiment, even when the structure is out of place from the pillar inner panel 34 at a time when the bag 16 is expanded, as mentioned above, the pillar garnish 620 can be greatly shifted at the time of fastening the strap 626. Since the adhering jig or the like can be used freely and the fastening can be performed simply, the mounting of the pillar garnish 620 can be made easy.

Figure 53A:
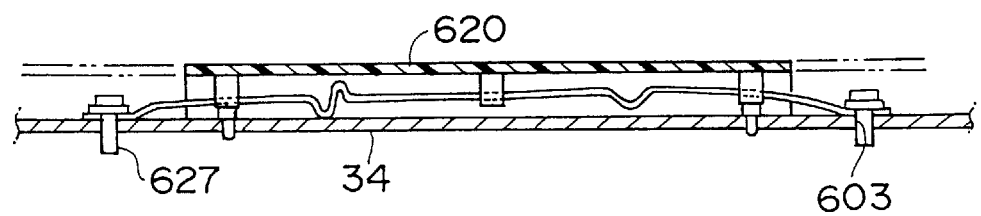
FIG. 53A is a schematic view which shows a mounting state for a pillar garnish before an air bag is expanded in accordance with the twentieth embodiment.
Figure 53B:
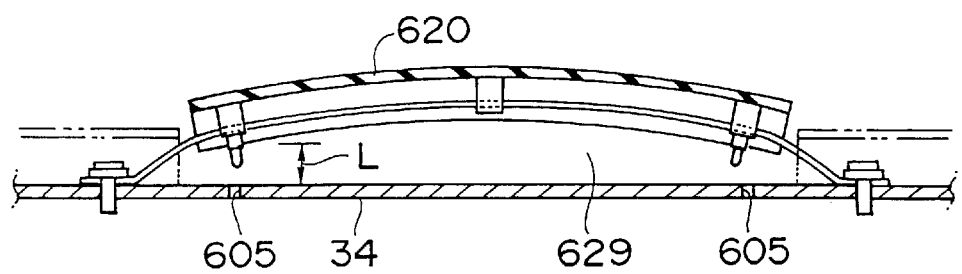
FIG. 53B is a schematic view which shows movement of a pillar garnish when the air bag is expanded in accordance with the twentieth embodiment.

The pillar garnish 620 in accordance with the present embodiment, the bridges 621, 622 and 623 through which the strap 626 is inserted are disposed near both ends and near the center portion at the reverse surface side of the pillar garnish 620. Therefore, as shown in FIGS. 53A to 53B, the stress can be dispersed when the pillar garnish 620 is pressed by the air bag 16 at a time when the bag 16 is expanded, so that the connecting strength between the strap 626 and the pillar garnish 620 can be improved.

Figure 54:
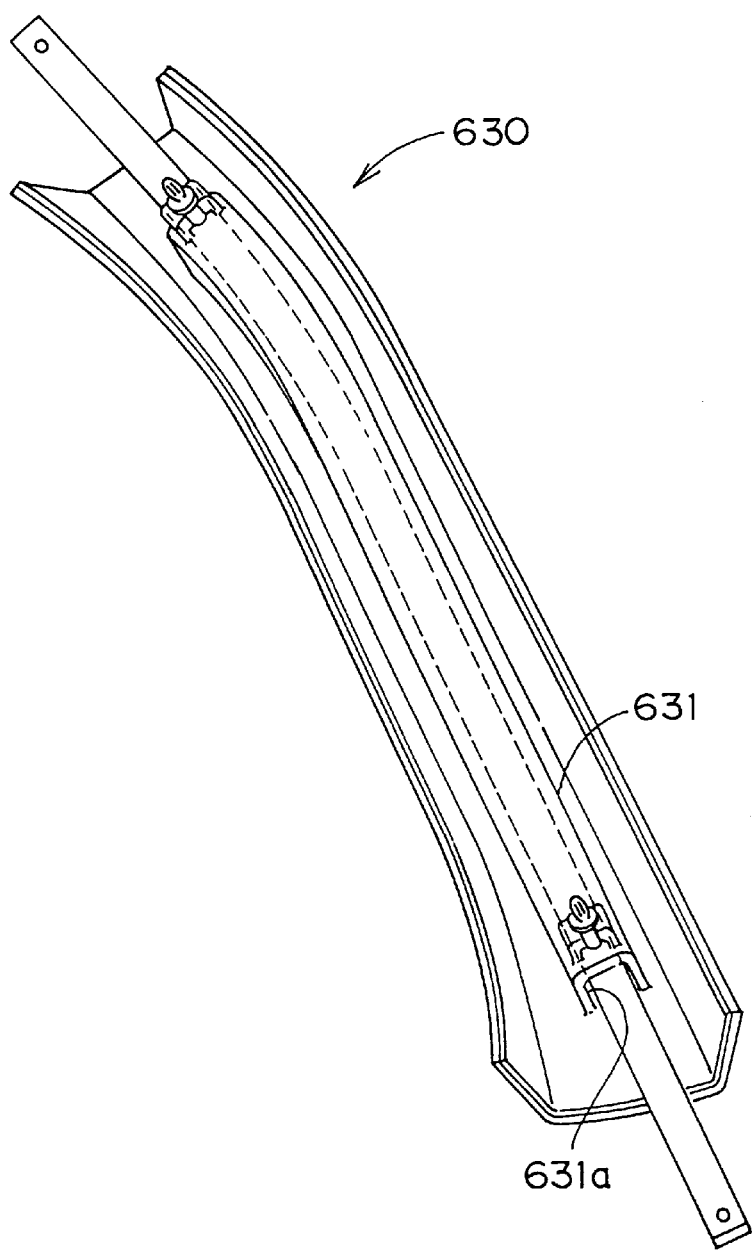
FIG. 54 is a perspective view at a back surface side which shows a pillar garnish in accordance with a modified example of the twentieth embodiment.
Figure 55:
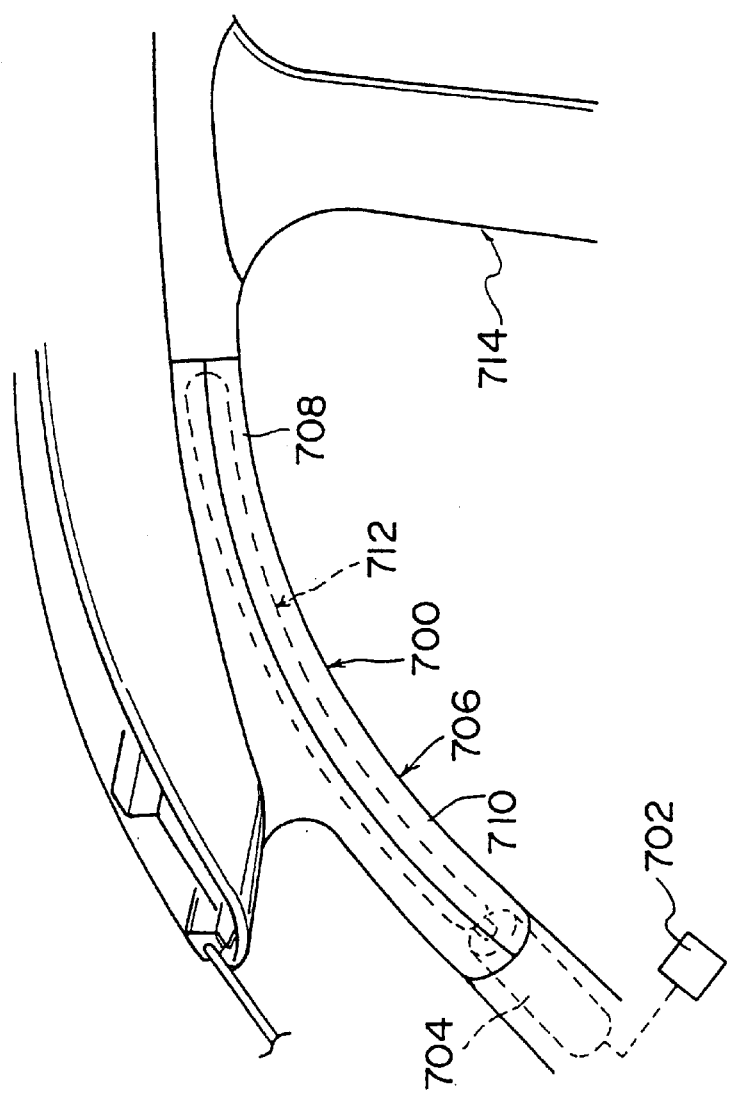
FIG. 55 is a schematic view which shows an vehicle occupant protecting apparatus for an automotive vehicle in accordance with a conventional embodiment.

In order to further obtain the operation and effects mentioned above, the number of the bridges may be further increased. On the contrary, as shown in FIG. 54, one bridge 631 having a guide hole 631a may be provided in such a manner as to extend from the portion close to the center portion of the reverse surface side of the pillar garnish 630 to the portion close to the both ends. Further, the bridge 631 may be separated at the portion close to the center portion so as to form two bridges such that the interval therebetween is not wide. In any case, the same effect as that of the present embodiment can be obtained. Accordingly, as long as the bridge is disposed at the portions close to the both ends and close to the center portion at the reverse surface side of the pillar garnish 620, the number thereof is not limited to the number of bridges used in the present embodiment. However, even when the bridges are provided only at two portions close to the both ends of the pillar garnish 620, or a bridge is provided only at one portion close to the center portion, the corresponding effect can be expected.

Further, in accordance with the present embodiment, there is shown a case in which the clips 624 are provided at the pillar garnish 620 side as the engaging and attaching means for releasably engaging and attaching the pillar garnish 620 to the pillar inner panel 34, and the engaging holes 605 into which the clips 424 are inserted and engaged are provided in the pillar inner panel 34. However, the structure may be made such that only an engaging leg 624a portion (refer to FIG. 51) of the clip 624 which can be inserted in and engaged with the engaging hole 605 is integrally formed at the pillar garnish 620. Further, conversely, the engaging hole may be provided in the pillar garnish 620, and the clip 624 and the locking leg portion thereof maybe provided at the pillar inner panel 34.

Still further, in accordance with the present embodiment, fastening by the bolt 627 is exemplified as the means for fastening the both ends of the strap 626 to the pillar inner panel 34. However, fastening by a rivet or the like may be employed.

In accordance with each of the embodiments described above, as shown in FIG. 2, the structure has been made such that the air bag apparatus 10 is arranged along the roof side rail portion 28 from the front pillar portion 20. However, the present invention is not limited to this. For example, the structure may be made such that the air bag apparatus is arranged so as to extend from the front pillar portion 20 via the roof side rail portion 28 and further extend to the quarter pillar portion 30 (that is, a structure for protecting the head portion of the vehicle occupant seated in the rear seat as well as protecting the head portion of the vehicle occupant seated in the front seat).

Further, in accordance with each of the embodiments descrived above, the bag 16 is housed in the case 26. However, the structure may be made such that the case 26 is omitted by wrapping the bag 16.

Industrial Applicability

As described above, the structure of arranging the vehicle occupant protecting apparatus for an automotive vehicle in accordance with the present invention is useful as a structure of arranging the vehicle occupant protecting apparatus for protecting the vehicle occupant in the automotive vehicle at a time when a predetermined high load is applied to the side portion of the vehicle body of the automotive vehicle, and more particularly, is suitable for use in a structure of arranging the air bag apparatus in a vehicle body.

What is claimed is:

1. An automotive vehicle occupant protection apparatus for an automotive vehicle having an interior compartment, a pillar portion, a vehicle body side portion, and a roof side rail, said apparatus comprising:
   an inflator for jetting gas upon an occurrence of a side collision;
   a bag operatively connected to said inflator so as to expand during jetting of the gas, said bag being housed in a folded state and constructed and arranged to permit placement thereof between the pillar portion and the roof side rail so that expansion occurs beneath the roof side rail and within the interior compartment;
   a pillar garnish including a trim member disposable at an inner side of the pillar portion and extending in a longitudinal direction by a sufficient length to cover at least a portion of said bag in the folded state; and
   a deformable member hingedly connected to said pillar garnish and provided in the vicinity of said bag, said deformable member being (i) formed of a portion of said pillar garnish and (ii) configured to form an opening for expansion of said bag without breaking or scattering said pillar garnish;
   wherein the deformable member includes an unhinged end portion positioned in the vicinity of the vehicle body side portion, the unhinged end portion moving away from the vehicle body side portion when the bag starts to expand.

2. A structure of arranging an vehicle occupant protecting apparatus for an automotive vehicle according to claim 1, wherein said scatter preventing means is a non-expanding portion of said bag which is positioned at a region corresponding to said pillar garnish at a time when said bag expands.

3. An automotive vehicle occupant protection apparatus according to claim 1, wherein said deformable member has an unfolding portion configured to unfold during expansion of said bag in order to form the opening, the unfolding portion including the unhinged end portion.

4. A structure of arranging an vehicle occupant protecting apparatus for an automotive vehicle according to claim 3, wherein the intermediate portion in the widthwise direction of said pillar garnish is a weakened portion.

5. An automotive vehicle occupant protection apparatus according to claim 3, wherein the unfolding portion is made thinner than the other portions of said pillar garnish.

6. A structure of arranging an vehicle occupant protecting apparatus for an automotive vehicle according to claim 3, wherein said pillar garnish is formed so as to include a base member, which is positioned at a vehicle cabin outer side, and an outer skin, which is positioned at a vehicle cabin inner side of the base member, and the base member is formed by a resin which is softer at one widthwise direction side of the pillar garnish widthwise direction intermediate portion than at the other widthwise direction side, the one widthwise direction side is the unfolding portion.

7. A structure of arranging an vehicle occupant protecting apparatus for an automotive vehicle according to claim 3, wherein said pillar garnish is formed so as to include a base member, which is positioned at a vehicle cabin outer side, and an outer skin, which is positioned at a vehicle cabin inner side of the base member, and the base member is separated into a first portion fixed to a pillar main body of the pillar portion and a second portion forming the opening for expansion of said bag at a time when said bag expands, the first portion and the second portion are connected by a intermediate member interposed between the outer skins or the outer skin and the base member, and the second portion is made the unfolding portion.

8. A structure of arranging an vehicle occupant protecting apparatus for an automotive vehicle according to claim 3, wherein said pillar garnish is formed so as to include a base member, said pillar garnish is separated into a base portion, which is fixed to a pillar main body of the pillar portion, and a bag housing portion, which houses said bag, and
   a front end portion of the bag housing portion is fixed to the pillar main body, a bag unfolding starting point region provided at the bag housing portion is a weakened portion, and a portion between said weakened portion and a widthwise direction end portion of the housing portion in which the opening for expansion of said bag is formed is the unfolding portion.

9. A structure of arranging an vehicle occupant protecting apparatus for an automotive vehicle according to claim 3, wherein said pillar garnish is formed so as to include a base member, which is positioned at a vehicle cabin outer side, and an outer skin, which is positioned at a vehicle cabin inner side of the base member, and a whole of the base member is formed by a soft material, whereby the unfolding portion is formed.

10. A structure of arranging an vehicle occupant protecting apparatus for an automotive vehicle according to claim 1, wherein said scatter preventing means is mounted to said pillar garnish along the longitudinal direction thereof, and is provided with extending portions respectively extending from both longitudinal direction end portions of said pillar garnish, and the extending portions are formed by a band-like strap fixed to a pillar main body of the pillar portion.

11. A structure of arranging an vehicle occupant protecting apparatus for an automotive vehicle according to claim 1, wherein said scatter preventing means has a predetermined strength, and is mounted to said pillar garnish along a surface thereof, and is provided with extending portions respectively extending from both longitudinal direction end portions of said pillar garnish, and the extending portions are formed by a net fixed to a pillar main body of the pillar portion.

12. A structure of arranging an vehicle occupant protecting apparatus for an automotive vehicle according to claim 1, wherein said scatter preventing means has an extending portion provided at said pillar garnish and extending toward a window shield glass and fixed to a body of a pillar main body of the pillar portion, and said scatter preventing means has a hinge portion provided at said pillar garnish so as to form the opening for expansion of said bag.

13. A structure of arranging an vehicle occupant protecting apparatus for an automotive vehicle according to claim 1, wherein said pillar garnish is disposed so as to be separated from a pillar main body of the pillar portion by a predetermined distance toward a vehicle cabin inner side, and
said scatter preventing means is provided with bridges, which are provided in vicinities of both longitudinal direction end portions at the reverse surface of said pillar garnish, and a strap, which connects said bridges and a predetermined region of said pillar main body and which has a distance longer than a distance between each of said bridges and the predetermined region.

14. A structure of arranging an vehicle occupant protecting apparatus for an automotive vehicle according to claim 13, wherein the strap is wound around the bridge, and a recess portion for centering a wound portion of the strap around the bridge is provided at an end portion of the bridge which is a region from to which a load is directly applied to the bridge from the wound portion of the strap around the bridge when said bag expands.

15. A structure of arranging an vehicle occupant protecting apparatus for an automotive vehicle according to claim 13, wherein the strap is wound around the bridge, and at least one opening for absorbing an energy is provided in a vicinity of an end portion of the bridge which is a region to which a load is directly applied to the bridge from a wound portion of the strap around the bridge when said bag expands.

16. A structure of arranging an vehicle occupant protecting apparatus for an automotive vehicle according to claim 13, wherein in the structure in which the strap is wound around the bridge, the bridge is layered in plural stages, the wound portion of the strap is divided into plural portions in accordance with the number of the plural stages, and the respective divisional portions of the wound portion are wound around the respective stages of the bridge.

17. A structure of arranging an vehicle occupant protecting apparatus for an automotive vehicle according to claim 13, wherein a mounting seat of a temporarily fixing means, for temporarily fixing said pillar garnish to a pillar main body of the pillar portion, is integrally provided at a region of the bridge opposing the opposing pillar main body of the pillar portion.

18. A structure of arranging an vehicle occupant protecting apparatus for an automotive vehicle according to claim 13, wherein an engaging member capable of engaging with the bridge is mounted to an end portion of the strap, and the engaging member is engaged with the bridge so that the one end portion of the strap and said pillar garnish are connected to each other.

19. A structure of arranging an vehicle occupant protecting apparatus for an automotive vehicle according to claim 1, wherein said pillar garnish includes at least a base member, and said scatter preventing means is the base member which is formed by a non-break material, and
said structure of arranging a vehicle occupant protecting apparatus further comprises:
a fixing member for directly fixing the base member to a pillar main body of the pillar portion; and
a cap mounted to a recess portion formed on a design surface of said pillar garnish, and covering a head portion of said fixing member.

20. A structure of arranging an vehicle occupant protecting apparatus for an automotive vehicle according to claim 19 further comprising fall-out preventing means for connecting the cap to said the member.

21. A structure of arranging an vehicle occupant protecting apparatus for an automotive vehicle according to claim 1, wherein said pillar garnish includes at least a base member, and said scatter preventing means is formed by the base member which is formed by a non-break material, engaging means for engaging the base member with a pillar main body of the pillar portion, and an engagement force increasing portion provided at the engaging means and enabling deformation of said pillar garnish in a direction in which engagement between the base member and the pillar main body of the pillar portion strengthened when said bag expand.

22. A structure of arranging an vehicle occupant protecting apparatus for an automotive vehicle according to claim 1, wherein said scatter preventing means comprises:
engaging and attaching means for engaging and attaching said pillar garnish and a pillar main body of the pillar portion in such a manner that said pillar garnish can come out of place from the pillar main body of the pillar portion;
a bridge provided on at a reverse surface of said pillar garnish and having a guide hole extending through in a longitudinal direction of the pillar portion; and
a strap inserted through the guide hole so as to be supported by said pillar garnish, both longitudinal direction end portions of the strap being fixed to the pillar main body of the pillar portion, and the strap being set to a length of forming said bag projecting opening when said bag is expands and the engagement and attachment between the pillar garnish and the pillar main body of the pillar portion is released.

23. A structure of arranging an vehicle occupant protecting apparatus for an automotive vehicle according to claim 22, wherein the bridge is provided in vicinities of both end portions and in a vicinity of a longitudinal direction center portion along the longitudinal direction of said pillar garnish.

24. A structure of arranging an vehicle occupant protecting apparatus for an automotive vehicle according to claim 1, wherein said scatter preventing means is provided with a strap whose longitudinal direction center portion is integrally formed with said pillar garnish along a longitudinal direction of said pillar garnish and whose both longitudinal direction end portions are apart from said pillar garnish and are fixed to a pillar main body of a pillar portion, and
the structure of arranging a vehicle occupant protecting apparatus for an automotive vehicle further comprises:
an inserting portion formed in a vehicle front side end portion of said pillar garnish;
an opening portion formed in an insert of an instrument panel and into which said inserting portion is inserted; and an engaging portion formed at said inserting portion, and due to said engaging portion engaging with an edge portion of said opening portion, said pillar garnish can be temporarily placed at a tilted position at which said pillar garnish is tilted at a predetermined angle from a normal assembly position and an extending portion of the strap can be fixed to the pillar main body of the front portion.

25. A structure of arranging an vehicle occupant protecting apparatus for an automotive vehicle according to claim 1, wherein said pillar garnish covers a vehicle front side of said pillar portion and is formed by a vehicle front side support portion, which is disposed at a vehicle front side and is supported by the pillar portion, and an unfolding portion, which is disposed at a vehicle rear side and covers said bag and has one end continuous with said support portion and another end which is a free end, and a boundary portion between the support portion and the unfolding portion becomes a hinge for the unfolding portion when the bag expends, and the bag expands from a portion between the free end and the pillar portion.

26. A structure of arranging an vehicle occupant protecting apparatus for an automotive vehicle according to claim 25, wherein said bag is disposed in a space substantially defined by the unfolding portion and the pillar portion.

27. A structure of arranging an vehicle occupant protecting apparatus for an automotive vehicle according to claim 25, wherein the support portion is fixed to the pillar portion with a space there between, and the free end of the unfolding portion is adjacent to the pillar portion.

28. A structure of arranging an vehicle occupant protecting apparatus for an automotive vehicle according to claim 25, wherein a rigidity of at least one of the unfolding portion and the boundary portion is set to be lower than a rigidity of the support portion.

29. A structure of arranging an vehicle occupant protecting apparatus for an automotive vehicle according to claim 25, wherein a thin portion having a recessed groove shape is formed in the boundary portion.

30. The automotive vehicle occupant protection apparatus of claim 1, wherein the pillar garnish includes a fixing portion attached to the vehicle body side portion;

wherein the vehicle body side portion is positioned in the vicinity of a vehicle door opening;

wherein the deformable member includes a hinged end portion, the hinged end portion (i) being connected to the fixing portion and (ii) positioned at a greater distance from the vehicle door opening than the unhinged end portion;

wherein the fixing portion, the vehicle body side portion, and the deformable member form a space; and wherein the bag is disposed in the space.

* * * * *